US012207433B2

(12) United States Patent
Barbour

(10) Patent No.: US 12,207,433 B2
(45) Date of Patent: Jan. 21, 2025

(54) PORTABLE BLOCKCHAIN MINING SYSTEM AND METHODS OF USE

(71) Applicant: Upstream Data Inc., Lloydminster (CA)

(72) Inventor: Stephen Barbour, Lloydminster (CA)

(73) Assignee: Upstream Data Inc., Lloydminster (CA)

( * ) Notice: Subject to any disclaimer, the term of this patent is extended or adjusted under 35 U.S.C. 154(b) by 0 days.

(21) Appl. No.: 17/100,746

(22) Filed: Nov. 20, 2020

(65) Prior Publication Data

US 2021/0296963 A1 Sep. 23, 2021

Related U.S. Application Data

(63) Continuation of application No. 17/100,744, filed on Nov. 20, 2020, now Pat. No. 11,659,682.

(30) Foreign Application Priority Data

Mar. 21, 2020 (CA) .................................. CA 3076653

(51) Int. Cl.
*H02K 9/06* (2006.01)
*F02B 63/04* (2006.01)
(Continued)

(52) U.S. Cl.
CPC ......... *H05K 7/1497* (2013.01); *F02B 63/044* (2013.01); *G06F 1/181* (2013.01);
(Continued)

(58) Field of Classification Search
CPC .. H05K 7/1497; H05K 7/20181; G06F 1/181; G06F 15/161; G06F 2200/1635; G06F 1/16
See application file for complete search history.

(56) References Cited

U.S. PATENT DOCUMENTS 3,486,530 A 12/1969 Mercier
3,941,144 A 3/1976 Cornil
(Continued)

FOREIGN PATENT DOCUMENTS

AU 2009203009 A1 2/2010
AU 2014101324 A4 12/2014
(Continued)

OTHER PUBLICATIONS

"Horizontal Container Twist Lock/Connector", Aug. 11, 2018, Mytee Products, Entire Document (https://www.myteeproducts.com/container-connector-not-certified.html). (Year: 2018).*
(Continued)

*Primary Examiner* — Stephen S Sul
(74) *Attorney, Agent, or Firm* — Robert A. Nissen

(57) ABSTRACT

Portable blockchain mining systems and methods of use are discussed here. Systems include a portable building; a plurality of blockchain mining processors mounted within, or a plurality of blockchain mining processor mounts located within, an interior of the portable building; an air inlet defined in the portable building; and an air outlet defined in the portable building. Air outlets may be above the air inlet and oriented to direct exhaust air in an upward direction out of the portable building. A cooling fan may be connected to convey air through the air inlet, across the plurality of blockchain mining processors and out the air outlet. The cooling fan may simultaneously cool a genset and processors 72. Compact, stackable mining modules are discussed.

25 Claims, 15 Drawing Sheets

(51) Int. Cl.
*G06F 1/18* (2006.01)
*G06F 1/20* (2006.01)
*G06F 15/16* (2006.01)
*H04L 9/06* (2006.01)
*H05K 7/14* (2006.01)
*H05K 7/20* (2006.01)
*F01P 1/00* (2006.01)
*H04L 9/00* (2022.01)

(52) U.S. Cl.
CPC ............... *G06F 1/20* (2013.01); *G06F 1/206* (2013.01); *G06F 15/161* (2013.01); *H02K 9/06* (2013.01); *H04L 9/0643* (2013.01); *H05K 7/20181* (2013.01); *H05K 7/20745* (2013.01); *F01P 2001/005* (2013.01); *H04L 9/50* (2022.05)

(56) References Cited

U.S. PATENT DOCUMENTS

| | | | |
|---|---|---|---|
| 4,088,154 | A | 5/1978 | Patton |
| 4,106,097 | A | 8/1978 | Fox |
| 4,245,319 | A | 1/1981 | Hedges |
| 4,247,786 | A | 1/1981 | Hedges |
| 4,333,496 | A | 6/1982 | Chow |
| 4,371,779 | A | 2/1983 | Maynard |
| 4,551,812 | A | 11/1985 | Gurr |
| 4,574,959 | A * | 3/1986 | Hollett ............... H05K 13/0069 211/26.2 |
| 5,142,672 | A | 8/1992 | Johnson |
| 5,209,317 | A | 5/1993 | Schnelle |
| 5,355,676 | A | 10/1994 | Inokuchi |
| 5,367,669 | A | 11/1994 | Holland |
| 5,396,923 | A | 3/1995 | Allen |
| 5,509,434 | A | 4/1996 | Boyd |
| 5,544,012 | A | 8/1996 | Koike |
| 5,544,046 | A | 8/1996 | Niwa |
| 5,586,574 | A | 12/1996 | Smith |
| 5,653,070 | A | 8/1997 | Seguin |
| 5,748,914 | A | 5/1998 | Barth |
| 5,761,083 | A | 6/1998 | Brown |
| 5,913,046 | A | 6/1999 | Barth |
| 5,943,221 | A | 8/1999 | Asai |
| 6,042,791 | A | 3/2000 | Johnson |
| 6,115,698 | A | 9/2000 | Tuck |
| 6,161,386 | A | 12/2000 | Lokhandwala |
| 6,244,516 | B1 | 6/2001 | Langervik |
| 6,288,456 | B1 | 9/2001 | Cratty |
| 6,304,459 | B1 | 10/2001 | Toyosato |
| 6,437,692 | B1 | 8/2002 | Petite |
| 6,473,744 | B1 | 10/2002 | Tuck |
| 6,519,509 | B1 | 2/2003 | Nierlich |
| 6,521,020 | B2 | 2/2003 | Butwell |
| 6,585,784 | B1 | 7/2003 | Mittricker |
| 6,618,709 | B1 | 9/2003 | Sneeringer |
| 6,633,823 | B2 | 10/2003 | Bartone |
| 6,643,567 | B2 | 11/2003 | Kolk |
| 6,665,582 | B1 | 12/2003 | Moritz |
| 6,672,955 | B2 | 1/2004 | Charron |
| 6,681,154 | B2 | 1/2004 | Nierlich |
| 6,745,105 | B1 | 6/2004 | Fairlie |
| 6,748,932 | B1 | 6/2004 | Sorter |
| 6,775,595 | B1 | 8/2004 | Yabutani |
| 6,785,592 | B1 | 8/2004 | Smith |
| 6,853,930 | B2 | 2/2005 | Hayashi |
| 6,868,293 | B1 | 3/2005 | Schurr |
| 6,912,450 | B2 | 6/2005 | Fairlie |
| 6,930,410 | B2 | 8/2005 | Ikeda |
| 6,990,593 | B2 | 1/2006 | Nakagawa |
| 7,010,363 | B2 | 3/2006 | Donnelly |
| 7,027,992 | B2 | 4/2006 | Zaccaria |
| 7,035,179 | B2 | 4/2006 | Chen |
| 7,042,726 | B2 | 5/2006 | Cader |
| 7,053,767 | B2 | 5/2006 | Petite |
| 7,054,271 | B2 | 5/2006 | Brownrigg |
| 7,062,360 | B2 | 6/2006 | Fairlie |
| 7,076,339 | B2 | 7/2006 | Yabutani |
| 7,085,133 | B2 | 8/2006 | Hall |
| 7,088,014 | B2 | 8/2006 | Nierlich |
| 7,093,256 | B2 | 8/2006 | Bloks |
| 7,127,328 | B2 | 10/2006 | Ransom |
| 7,130,832 | B2 | 10/2006 | Bannai |
| 7,135,956 | B2 | 11/2006 | Bartone |
| 7,143,300 | B2 | 11/2006 | Potter |
| 7,149,605 | B2 | 12/2006 | Chassin |
| 7,181,316 | B2 | 2/2007 | Fairlie |
| 7,188,003 | B2 | 3/2007 | Ransom |
| 7,196,900 | B2 | 3/2007 | Ewing |
| 7,206,670 | B2 | 4/2007 | Pimputkar |
| 7,269,723 | B2 | 9/2007 | Cromer |
| 7,278,273 | B1 | 10/2007 | Whitted |
| 7,305,282 | B2 | 12/2007 | Chen |
| 7,333,880 | B2 | 2/2008 | Brewster |
| 7,369,968 | B2 | 5/2008 | Johnson |
| 7,370,666 | B2 | 5/2008 | Willets |
| 7,376,851 | B2 | 5/2008 | Kim |
| 7,386,744 | B2 | 6/2008 | Barr |
| 7,396,388 | B2 | 7/2008 | Mitariten |
| 7,420,293 | B2 | 9/2008 | Donnelly |
| 7,460,930 | B1 | 12/2008 | Howell |
| 7,468,661 | B2 | 12/2008 | Petite |
| 7,484,521 | B2 | 2/2009 | Kimbara |
| 7,500,911 | B2 | 3/2009 | Johnson |
| 7,508,663 | B2 | 3/2009 | Coglitore |
| 7,516,106 | B2 | 4/2009 | Ehlers |
| 7,519,453 | B2 | 4/2009 | Fairlie |
| 7,525,207 | B2 | 4/2009 | Clidaras |
| 7,542,947 | B2 | 6/2009 | Guyon et al. |
| 7,560,831 | B2 | 7/2009 | Whitted |
| 7,561,977 | B2 | 7/2009 | Horst |
| 7,565,224 | B2 | 7/2009 | Fairlie |
| 7,633,955 | B1 | 12/2009 | Saraiya |
| 7,647,516 | B2 | 1/2010 | Ranganathan |
| 7,702,931 | B2 | 4/2010 | Goodrum |
| 7,724,513 | B2 | 5/2010 | Coglitore |
| 7,738,251 | B2 | 6/2010 | Clidaras |
| 7,779,276 | B2 | 8/2010 | Bolan |
| 7,783,907 | B2 | 8/2010 | Dubinsky |
| 7,800,900 | B1 | 9/2010 | Noteboom |
| 7,854,652 | B2 | 12/2010 | Yates |
| 7,861,102 | B1 | 12/2010 | Ranganathan |
| 7,862,410 | B2 | 1/2011 | McMahan |
| 7,921,315 | B2 | 4/2011 | Langgood |
| 7,925,911 | B2 | 4/2011 | Brey |
| 7,944,692 | B2 | 5/2011 | Grantham |
| 7,957,142 | B2 | 6/2011 | Noteboom |
| 7,961,463 | B2 | 6/2011 | Belady |
| 7,970,561 | B2 | 6/2011 | Pfeiffer |
| 7,971,446 | B2 | 7/2011 | Clidaras |
| 7,990,710 | B2 | 8/2011 | Hellriegel |
| 7,998,227 | B2 | 8/2011 | Mittricker |
| 8,001,403 | B2 | 8/2011 | Hamilton |
| 8,006,108 | B2 | 8/2011 | Brey |
| 8,031,468 | B2 | 10/2011 | Bean |
| 8,047,904 | B2 | 11/2011 | Yates |
| 8,051,672 | B2 | 11/2011 | Mallia |
| 8,070,863 | B2 | 12/2011 | Tsangaris |
| 8,080,900 | B2 | 12/2011 | Corhodzic |
| 8,094,436 | B2 | 1/2012 | Mills |
| 8,113,010 | B2 | 2/2012 | Carlson |
| 8,156,206 | B2 | 4/2012 | Kiley et al. |
| 8,180,501 | B2 | 5/2012 | Lewis |
| 8,184,435 | B2 | 5/2012 | Bean |
| 8,203,837 | B2 | 6/2012 | Zeighami |
| 8,203,841 | B2 | 6/2012 | Chang |
| 8,214,843 | B2 | 7/2012 | Boss |
| 8,233,270 | B2 | 7/2012 | Pierson |
| 8,248,795 | B2 | 8/2012 | Chang |
| 8,248,799 | B2 | 8/2012 | Chang |
| 8,250,382 | B2 | 8/2012 | Maglione |
| 8,251,785 | B2 | 8/2012 | Schmitt |
| 8,254,122 | B2 | 8/2012 | Chang |
| 8,254,124 | B2 | 8/2012 | Keisling |

(56) References Cited

U.S. PATENT DOCUMENTS

| | | |
|---|---|---|
| 8,260,913 B2 | 9/2012 | Knapp |
| 8,261,275 B2 | 9/2012 | Johnson |
| 8,264,840 B2 | 9/2012 | Bergthold |
| 8,286,442 B2 | 10/2012 | Carlson |
| 8,297,067 B2 | 10/2012 | Keisling |
| 8,300,402 B2 | 10/2012 | Wei |
| 8,305,737 B2 | 11/2012 | Ewing |
| 8,305,757 B2 | 11/2012 | Keisling |
| 8,312,229 B2 | 11/2012 | Bloks |
| 8,315,054 B2 | 11/2012 | Chen |
| 8,320,128 B2 | 11/2012 | Wei |
| 8,322,155 B2 | 12/2012 | Tutunoglu |
| 8,327,123 B2 | 12/2012 | Juffa |
| 8,331,086 B1 | 12/2012 | Meissner |
| 8,331,087 B2 | 12/2012 | Wei |
| 8,332,670 B2 | 12/2012 | Kato |
| 8,360,833 B2 | 1/2013 | Grantham |
| 8,370,517 B2 | 2/2013 | Bohrer |
| 8,374,928 B2 | 2/2013 | Gopisetty |
| 8,405,977 B2 | 3/2013 | Lin |
| 8,422,223 B2 | 4/2013 | Su |
| 8,432,700 B2 | 4/2013 | Katakura |
| 8,447,993 B2 | 5/2013 | Greene |
| 8,457,796 B2 | 6/2013 | Thind |
| 8,462,496 B2 | 6/2013 | Schmitt |
| 8,467,050 B2 | 6/2013 | Dutel |
| 8,483,715 B2 | 7/2013 | Chen |
| 8,498,110 B2 | 7/2013 | Wei |
| 8,498,114 B2 | 7/2013 | Martini |
| 8,571,820 B2 | 10/2013 | Pfeiffer |
| 8,577,509 B2 | 11/2013 | Ong |
| 8,595,094 B1 | 11/2013 | Forbes |
| 8,595,515 B1 | 11/2013 | Weber |
| 8,600,556 B2 | 12/2013 | Nesler |
| 8,601,287 B1 | 12/2013 | Weber |
| 8,601,827 B2 | 12/2013 | Keisling |
| 8,627,123 B2 | 1/2014 | Jain |
| 8,639,392 B2 | 1/2014 | Chassin |
| 8,659,895 B1 | 2/2014 | Carlson |
| 8,665,591 B2 | 3/2014 | Bourgeois |
| 8,683,823 B1 | 4/2014 | Shivers |
| 8,694,810 B2 | 4/2014 | Ahluwalia |
| 8,700,929 B1 | 4/2014 | Weber |
| 8,706,914 B2 | 4/2014 | Duchesneau |
| 8,706,915 B2 | 4/2014 | Duchesneau |
| 8,719,223 B2 | 5/2014 | Knapp |
| 8,734,212 B2 | 5/2014 | Peng |
| 8,755,184 B2 | 6/2014 | Peng |
| 8,768,799 B1 | 7/2014 | Forbes |
| 8,789,061 B2 | 7/2014 | Pavel |
| 8,799,690 B2 | 8/2014 | Dawson |
| 8,812,674 B2 | 8/2014 | Guenter |
| 8,839,254 B2 | 9/2014 | Horvitz |
| 8,839,551 B2 | 9/2014 | Swann |
| 8,848,727 B2 | 9/2014 | Saraiya |
| 8,849,469 B2 | 9/2014 | Belady |
| 8,849,715 B2 | 9/2014 | Forbes |
| 8,887,498 B2 | 11/2014 | Frerichs |
| 8,917,502 B1 | 12/2014 | Gardner |
| 8,924,781 B2 | 12/2014 | Shaw |
| 8,930,299 B2 | 1/2015 | Pyle |
| 8,931,221 B2 | 1/2015 | Somani |
| 8,941,256 B1 | 1/2015 | Czamara |
| 8,964,374 B1 | 2/2015 | Sheng |
| 8,965,594 B2 | 2/2015 | Marcus |
| 9,003,211 B2 | 4/2015 | Pfeiffer |
| 9,003,216 B2 | 4/2015 | Sankar |
| 9,026,814 B2 | 5/2015 | Aasheim |
| 9,027,024 B2 | 5/2015 | Mick |
| 9,041,235 B1 | 5/2015 | Hunter |
| 9,059,604 B2 | 6/2015 | Johnson |
| 9,063,738 B2 | 6/2015 | Jain |
| 9,065,582 B2 | 6/2015 | Barry |
| 9,072,200 B2 | 6/2015 | Dersch |
| 9,089,078 B2 | 7/2015 | Branton |
| 9,091,496 B2 | 7/2015 | Imwalle |
| 9,110,641 B2 | 8/2015 | Wu |
| 9,124,099 B2 | 9/2015 | Kuriyama |
| 9,141,155 B2 | 9/2015 | Wiley |
| 9,143,392 B2 | 9/2015 | Duchesneau |
| 9,144,181 B2 | 9/2015 | Wiley |
| 9,155,230 B2 | 10/2015 | Eriksen |
| 9,207,993 B2 | 12/2015 | Jain |
| 9,218,035 B2 | 12/2015 | Li |
| 9,232,024 B2 | 1/2016 | Suffling |
| 9,252,598 B2 | 2/2016 | Belady |
| 9,268,613 B2 | 2/2016 | Barham |
| 9,271,429 B2 | 2/2016 | Mashiko |
| 9,282,022 B2 | 3/2016 | Matthews |
| 9,282,684 B2 | 3/2016 | Keisling |
| 9,284,850 B1 | 3/2016 | Gardner |
| 9,320,177 B2 | 4/2016 | Levesque |
| 9,337,704 B1 | 5/2016 | Leslie |
| 9,342,375 B2 | 5/2016 | Hyser |
| 9,345,167 B2 | 5/2016 | Hwang |
| 9,348,381 B2 | 5/2016 | Khoo |
| 9,357,681 B2 | 5/2016 | Ross |
| 9,363,928 B2 | 6/2016 | Kondo |
| 9,365,127 B2 | 6/2016 | Olsson |
| 9,380,734 B2 | 6/2016 | Chang |
| 9,389,632 B2 | 7/2016 | Km |
| 9,394,770 B2 | 7/2016 | Boot |
| 9,395,208 B2 | 7/2016 | Sobotka |
| 9,414,531 B1 * | 8/2016 | Towner ............. H05K 7/20709 |
| 9,416,904 B2 | 8/2016 | Belady |
| 9,444,367 B2 | 9/2016 | Fornage |
| 9,447,992 B2 | 9/2016 | Johnson |
| 9,450,838 B2 | 9/2016 | Jain |
| 9,477,279 B1 | 10/2016 | Piszczek |
| 9,493,216 B2 | 11/2016 | Scott |
| 9,495,668 B1 | 11/2016 | Juels |
| 9,497,892 B2 | 11/2016 | Klaba |
| 9,542,231 B2 | 1/2017 | Khan |
| 9,552,234 B2 | 1/2017 | Boldyrev |
| 9,557,792 B1 | 1/2017 | Potlapally |
| 9,559,520 B2 | 1/2017 | Shelton |
| 9,568,975 B2 | 2/2017 | Sehgal |
| 9,585,291 B2 | 2/2017 | Belady |
| 9,588,558 B2 | 3/2017 | McKnight |
| 9,595,054 B2 | 3/2017 | Jain |
| 9,606,571 B2 | 3/2017 | Shows |
| 9,618,991 B1 * | 4/2017 | Clidaras ................. H02J 9/062 |
| 9,622,387 B2 | 4/2017 | Czamara |
| 9,630,614 B1 | 4/2017 | Hill |
| 9,634,508 B2 | 4/2017 | Kearns |
| 9,637,433 B2 | 5/2017 | Zubrin |
| 9,645,596 B1 | 5/2017 | Lee |
| 9,654,414 B2 | 5/2017 | Chatterjee |
| 9,673,632 B1 | 6/2017 | Ramesh |
| 9,692,259 B2 | 6/2017 | Boss |
| 9,719,024 B2 | 8/2017 | Young |
| 9,763,366 B2 | 9/2017 | Keisling |
| 9,769,948 B2 | 9/2017 | Welch |
| 9,769,953 B2 | 9/2017 | Malone |
| 9,769,960 B2 | 9/2017 | LeFebvre |
| 9,774,190 B2 | 9/2017 | Mondal |
| 9,778,718 B2 | 10/2017 | Zacho |
| 9,795,062 B1 | 10/2017 | Ross |
| 9,800,052 B2 | 10/2017 | Li |
| 9,800,167 B2 | 10/2017 | Aeloiza |
| 9,839,163 B2 | 12/2017 | Keisling |
| 9,843,470 B1 | 12/2017 | Gartrell |
| 9,886,316 B2 | 2/2018 | Belady |
| 9,929,591 B2 | 3/2018 | Cheng |
| 9,933,804 B2 | 4/2018 | Janous |
| 9,939,834 B2 | 4/2018 | Bodas |
| 9,946,815 B2 | 4/2018 | Weber |
| 9,967,333 B2 | 5/2018 | Chen |
| 9,982,516 B2 | 5/2018 | Ricotta |
| 9,985,842 B2 | 5/2018 | White |
| 9,994,118 B2 | 6/2018 | Williams |
| 9,995,218 B2 | 6/2018 | Oehring |
| 10,003,200 B2 | 6/2018 | Budde |
| 10,009,232 B2 | 6/2018 | Duncan |

(56) References Cited

U.S. PATENT DOCUMENTS

| | | |
|---|---|---|
| 10,013,037 B1 | 7/2018 | Clidaras |
| 10,033,210 B2 | 7/2018 | Peterson |
| 10,037,061 B1 | 7/2018 | Panchapakesan |
| 10,039,211 B2 | 7/2018 | Crawford |
| 10,063,629 B2 | 8/2018 | Duncan |
| 10,067,547 B2 | 9/2018 | Castro-Leon |
| 10,078,353 B2 | 9/2018 | Klaba |
| 10,101,731 B2 | 10/2018 | Asmus |
| 10,103,574 B2 | 10/2018 | Siegler |
| 10,111,275 B2 | 10/2018 | Norton |
| 10,128,684 B2 | 11/2018 | Ramamurthy |
| 10,199,669 B2 | 2/2019 | Wang |
| 10,234,835 B2 | 3/2019 | Liu |
| 10,250,039 B2 | 4/2019 | Wenzel |
| 10,257,268 B2 | 4/2019 | Cencini |
| 10,271,486 B2 | 4/2019 | McNamara |
| 10,275,842 B2 | 4/2019 | Lee |
| 10,283,968 B2 | 5/2019 | ElBsat |
| 10,289,190 B2 | 5/2019 | Boss |
| 10,291,627 B2 | 5/2019 | Gleichauf |
| 10,299,412 B1 | 5/2019 | Papen |
| 10,326,661 B2 | 6/2019 | Munjal |
| 10,339,227 B1 | 7/2019 | Carlson |
| 10,340,696 B2 | 7/2019 | Paine |
| 10,356,954 B2 | 7/2019 | Bao |
| 10,360,077 B2 | 7/2019 | Mahindru |
| 10,367,335 B2 | 7/2019 | Kawashima |
| 10,367,353 B1 | 7/2019 | McNamara |
| 10,367,535 B2 | 7/2019 | Corse |
| 10,368,467 B2 | 7/2019 | Gold |
| 10,404,523 B2 | 9/2019 | Cencini |
| 10,444,818 B1 | 10/2019 | McNamara |
| 10,452,041 B2 | 10/2019 | Menon |
| 10,452,127 B1 | 10/2019 | McNamara |
| 10,452,532 B2 | 10/2019 | McVay |
| 10,454,772 B2 | 10/2019 | White |
| 10,465,492 B2 | 11/2019 | Ricotta |
| 10,476,386 B2 | 11/2019 | Goto |
| 10,488,061 B2 | 11/2019 | Costakis |
| 10,497,072 B2 | 12/2019 | Hooshmand |
| 10,511,175 B2 | 12/2019 | Kogo |
| 10,523,449 B2 | 12/2019 | Montalvo |
| 10,545,560 B2 | 1/2020 | Mahindru |
| 10,545,796 B2 | 1/2020 | Bahramshahry |
| 10,582,635 B1 | 3/2020 | Ross |
| 10,608,433 B1 | 3/2020 | McNamara |
| 10,618,427 B1 | 4/2020 | McNamara |
| 10,637,250 B2 | 4/2020 | Paine |
| 10,637,353 B2 | 4/2020 | Ohyama |
| 10,709,076 B2 | 7/2020 | Pham |
| 10,721,240 B2 | 7/2020 | Gleichauf |
| 10,739,042 B2 | 8/2020 | Zhang |
| 10,754,494 B2 | 8/2020 | Duncan |
| 10,756,546 B2 | 8/2020 | Pmsvvsv |
| 10,756,570 B2 | 8/2020 | Lundstrom |
| 10,757,840 B2 | 8/2020 | Johnson |
| 10,762,476 B2 | 9/2020 | Son |
| 10,779,441 B2 | 9/2020 | Martini |
| 10,795,428 B2 | 10/2020 | Walsh |
| 10,819,599 B2 | 10/2020 | Mahindru |
| 10,822,992 B2 | 11/2020 | Spears |
| 10,831,555 B2 | 11/2020 | Krishnan |
| 10,833,940 B2 | 11/2020 | Cencini |
| 10,834,838 B1 | 11/2020 | Ross |
| 10,838,482 B2 | 11/2020 | Mahindru |
| 10,857,299 B2 | 12/2020 | Creaturo |
| 10,857,899 B1 | 12/2020 | McNamara |
| 10,861,112 B2 | 12/2020 | Forbes |
| 10,862,307 B2 | 12/2020 | Cavness |
| 10,862,309 B2 | 12/2020 | Cavness |
| 10,873,211 B2 | 12/2020 | McNamara |
| 10,882,412 B2 | 1/2021 | Mrlik |
| 10,892,622 B2 | 1/2021 | Guruprasad |
| 10,916,967 B2 | 2/2021 | Peloso |
| 10,931,117 B2 | 2/2021 | Shoemaker |
| 10,974,194 B2 | 4/2021 | Al Muhsen |
| 10,993,353 B2 | 4/2021 | Rau |
| 11,009,836 B2 | 5/2021 | Hoffmann |
| 11,016,456 B2 | 5/2021 | Henson |
| 11,016,458 B2 | 5/2021 | McNamara |
| 11,016,553 B2 | 5/2021 | McNamara |
| 11,025,060 B2 | 6/2021 | McNamara |
| 11,031,783 B2 | 6/2021 | McNamara |
| 11,031,787 B2 | 6/2021 | McNamara |
| 11,031,813 B2 | 6/2021 | McNamara |
| 11,042,948 B1 | 6/2021 | McNamara |
| 11,056,913 B2 | 7/2021 | Matan |
| 11,076,509 B2 | 7/2021 | Alissa |
| 11,108,237 B2 | 8/2021 | Clifton |
| 11,126,242 B2 | 9/2021 | Shaikh |
| 11,128,165 B2 | 9/2021 | McNamara |
| 11,162,696 B2 | 11/2021 | Klaba |
| 11,163,280 B2 | 11/2021 | Henson |
| 11,169,592 B2 | 11/2021 | Mahindru |
| 11,182,781 B2 | 11/2021 | Castinado |
| 11,194,150 B2 | 12/2021 | Baba |
| 11,196,255 B2 | 12/2021 | Torvund |
| 11,256,320 B2 | 2/2022 | McNamara |
| 11,268,715 B2 * | 3/2022 | Park ................... G06F 21/602 |
| 11,275,427 B2 | 3/2022 | McNamara |
| 11,283,261 B2 | 3/2022 | McNamara |
| 11,289,914 B2 | 3/2022 | Walsh |
| 11,306,970 B2 | 4/2022 | Klaba |
| 11,310,944 B2 | 4/2022 | Martini |
| 11,327,473 B2 | 5/2022 | Sayyarrodsari |
| 11,337,339 B2 | 5/2022 | Pichai |
| 11,342,746 B2 | 5/2022 | McNamara |
| 11,359,865 B2 | 6/2022 | Stone |
| 11,397,999 B2 | 7/2022 | McNamara |
| 11,418,037 B2 | 8/2022 | Cavness |
| 11,431,195 B2 | 8/2022 | McNamara et al. |
| 11,451,059 B2 | 9/2022 | Cavness |
| 11,537,183 B2 | 12/2022 | Lewis |
| 11,647,605 B2 | 5/2023 | Johnson |
| 11,650,639 B2 | 5/2023 | McNamara |
| 11,669,144 B2 | 6/2023 | McNamara |
| 11,669,920 B2 | 6/2023 | McNamara |
| 2002/0072868 A1 | 6/2002 | Bartone |
| 2002/0120412 A1 | 8/2002 | Hayashi |
| 2002/0158749 A1 | 10/2002 | Ikeda |
| 2002/0196124 A1 | 12/2002 | Howard |
| 2003/0023885 A1 | 1/2003 | Potter |
| 2003/0037150 A1 | 2/2003 | Nakagawa |
| 2003/0050003 A1 | 3/2003 | Charron |
| 2003/0056839 A1 | 3/2003 | Kroupa |
| 2003/0074464 A1 | 4/2003 | Bohrer |
| 2003/0171851 A1 | 9/2003 | Brickfield |
| 2003/0196798 A1 | 10/2003 | Newman |
| 2004/0000815 A1 | 1/2004 | Pereira |
| 2004/0027004 A1 | 2/2004 | Bayoumi |
| 2004/0117330 A1 | 6/2004 | Ehlers |
| 2004/0239499 A1 | 12/2004 | Crook |
| 2005/0005528 A1 | 1/2005 | Brault |
| 2005/0022967 A1 | 2/2005 | Hall |
| 2005/0034128 A1 | 2/2005 | Nagashima |
| 2005/0102068 A1 | 5/2005 | Pimputkar |
| 2005/0102539 A1 | 5/2005 | Hepner |
| 2005/0154499 A1 | 7/2005 | Aldridge |
| 2005/0165512 A1 | 7/2005 | Peljto |
| 2005/0168945 A1 | 8/2005 | Coglitore |
| 2005/0179263 A1 | 8/2005 | Johansen et al. |
| 2005/0200205 A1 | 9/2005 | Winn |
| 2005/0203761 A1 | 9/2005 | Barr |
| 2005/0259383 A1 | 11/2005 | Ewing |
| 2006/0031180 A1 | 2/2006 | Tamarkin |
| 2006/0059772 A1 | 3/2006 | Brault |
| 2006/0140747 A1 | 6/2006 | Vandervort |
| 2006/0161765 A1 | 7/2006 | Cromer |
| 2006/0253675 A1 | 11/2006 | Johannes Bloks |
| 2007/0067657 A1 | 3/2007 | Ranganathan |
| 2007/0171613 A1 | 7/2007 | McMahan |
| 2007/0228837 A1 | 10/2007 | Nielsen |
| 2007/0278860 A1 | 12/2007 | Krieger |
| 2008/0000151 A1 | 1/2008 | Houweling |

(56) References Cited

U.S. PATENT DOCUMENTS

| | | |
|---|---|---|
| 2008/0013596 A1 | 1/2008 | Dunne |
| 2008/0030078 A1 | 2/2008 | Whitted |
| 2008/0064317 A1 | 3/2008 | Yates |
| 2008/0082844 A1 | 4/2008 | Ghiasi |
| 2008/0094797 A1 | 4/2008 | Coglitore |
| 2008/0135238 A1 | 6/2008 | Cugnet et al. |
| 2008/0238195 A1 | 10/2008 | Shaver |
| 2008/0244052 A1 | 10/2008 | Bradicich |
| 2008/0245083 A1 | 10/2008 | Tutunoglu |
| 2008/0276628 A1 | 11/2008 | Lee |
| 2009/0012523 A1 | 1/2009 | Ruuttu |
| 2009/0055665 A1 | 2/2009 | Maglione |
| 2009/0070611 A1 | 3/2009 | Bower |
| 2009/0078401 A1 | 3/2009 | Cichanowicz |
| 2009/0089595 A1 | 4/2009 | Brey |
| 2009/0107671 A1 | 4/2009 | Waters et al. |
| 2009/0144566 A1 | 6/2009 | Bletsch |
| 2009/0216910 A1 | 8/2009 | Duchesneau |
| 2009/0235097 A1 | 9/2009 | Hamilton |
| 2009/0251860 A1 | 10/2009 | Belady |
| 2009/0254660 A1 | 10/2009 | Hanson |
| 2009/0255653 A1 | 10/2009 | Mills |
| 2009/0282274 A1 | 11/2009 | Langgood |
| 2010/0024445 A1 | 2/2010 | Cichanowicz |
| 2010/0038907 A1 | 2/2010 | Hunt et al. |
| 2010/0057271 A1 | 3/2010 | Lewis |
| 2010/0058350 A1 | 3/2010 | Boss |
| 2010/0088261 A1 | 4/2010 | Montalvo |
| 2010/0130117 A1 | 5/2010 | Larsen |
| 2010/0170277 A1 | 7/2010 | Schmitt |
| 2010/0211810 A1 | 8/2010 | Zacho |
| 2010/0235004 A1 | 9/2010 | Thind |
| 2010/0280675 A1 | 11/2010 | Tate |
| 2010/0290197 A1 | 11/2010 | Bergthold |
| 2010/0313203 A1 | 12/2010 | Dawson |
| 2010/0319747 A1 | 12/2010 | Wong |
| 2010/0324962 A1 | 12/2010 | Nesler |
| 2010/0328849 A1 | 12/2010 | Ewing |
| 2010/0332272 A1 | 12/2010 | Ong |
| 2010/0333113 A1 | 12/2010 | Johnson |
| 2011/0009047 A1 | 1/2011 | Noteboom |
| 2011/0072289 A1 | 3/2011 | Kato |
| 2011/0099043 A1 | 4/2011 | Sharma |
| 2011/0115425 A1 | 5/2011 | Olsson |
| 2011/0123036 A1 | 5/2011 | Barath |
| 2011/0189936 A1 | 8/2011 | Haspers |
| 2011/0199862 A1 | 8/2011 | Pop |
| 2011/0235244 A1 | 9/2011 | Mills |
| 2011/0238342 A1 | 9/2011 | Pfeiffer |
| 2011/0239015 A1 | 9/2011 | Boyd |
| 2011/0242755 A1 | 10/2011 | Zeighami |
| 2011/0247348 A1 | 10/2011 | Mashiko |
| 2011/0273835 A1 | 11/2011 | Katakura |
| 2011/0276194 A1 | 11/2011 | Emalfarb |
| 2011/0278928 A1 | 11/2011 | Burger |
| 2011/0282982 A1 | 11/2011 | Jain |
| 2011/0316337 A1 | 12/2011 | Pelio |
| 2012/0000121 A1 | 1/2012 | Swann |
| 2012/0006507 A1 | 1/2012 | Su |
| 2012/0020014 A1 | 1/2012 | Chang |
| 2012/0024515 A1 | 2/2012 | Wei |
| 2012/0026679 A1 | 2/2012 | Chang |
| 2012/0032665 A1 | 2/2012 | Shaver |
| 2012/0044631 A1 | 2/2012 | Wei |
| 2012/0044632 A1 | 2/2012 | Wei |
| 2012/0063082 A1 | 3/2012 | Chang |
| 2012/0072745 A1 | 3/2012 | Ahluwalia |
| 2012/0075794 A1 | 3/2012 | Wei |
| 2012/0077427 A1 | 3/2012 | Wei |
| 2012/0078430 A1 | 3/2012 | Fan |
| 2012/0103558 A1 | 5/2012 | Fernandez |
| 2012/0103843 A1 | 5/2012 | Wei |
| 2012/0108157 A1 | 5/2012 | Chan |
| 2012/0109705 A1 | 5/2012 | Belady |
| 2012/0127653 A1 | 5/2012 | Keisling |
| 2012/0129442 A1 | 5/2012 | Wei |
| 2012/0132554 A1 | 5/2012 | Wei |
| 2012/0134105 A1 | 5/2012 | Chang |
| 2012/0134107 A1 | 5/2012 | Peng |
| 2012/0142265 A1 | 6/2012 | Wei |
| 2012/0150679 A1 | 6/2012 | Lazaris |
| 2012/0162886 A1 | 6/2012 | Chen |
| 2012/0168141 A1 | 7/2012 | Lin |
| 2012/0185414 A1 | 7/2012 | Pyle |
| 2012/0201003 A1 | 8/2012 | Shimasaki |
| 2012/0212901 A1 | 8/2012 | Schmitt |
| 2012/0244793 A1 | 9/2012 | Lin |
| 2012/0276834 A1 | 11/2012 | Peng |
| 2012/0290865 A1 | 11/2012 | Kansal |
| 2012/0300291 A1 | 11/2012 | Abbott |
| 2012/0300391 A1 | 11/2012 | Kiesling |
| 2012/0300524 A1 | 11/2012 | Fornage |
| 2012/0306271 A1 | 12/2012 | Kuriyama |
| 2012/0321309 A1 | 12/2012 | Barry |
| 2012/0323382 A1 | 12/2012 | Kamel |
| 2012/0323396 A1 | 12/2012 | Shelton |
| 2012/0324245 A1 | 12/2012 | Sinha |
| 2012/0324259 A1 | 12/2012 | Aasheim |
| 2012/0326511 A1 | 12/2012 | Johnson |
| 2013/0002443 A1 | 1/2013 | Breed et al. |
| 2013/0006401 A1 | 1/2013 | Shan |
| 2013/0007515 A1 | 1/2013 | Shaw |
| 2013/0050923 A1 | 2/2013 | Wei |
| 2013/0054987 A1 | 2/2013 | Pfeiffer |
| 2013/0063991 A1 | 3/2013 | Xiao |
| 2013/0065669 A1 | 3/2013 | Michaelson et al. |
| 2013/0078901 A1 | 3/2013 | Curtin |
| 2013/0086404 A1 | 4/2013 | Sankar |
| 2013/0110296 A1 | 5/2013 | Khoo |
| 2013/0111494 A1 | 5/2013 | Hyser |
| 2013/0112419 A1 | 5/2013 | DeFosse et al. |
| 2013/0117621 A1 | 5/2013 | Saraiya |
| 2013/0138468 A1 | 5/2013 | Oe |
| 2013/0148291 A1* | 6/2013 | Slessman ............ H05K 7/1497 361/679.02 |
| 2013/0166455 A1 | 6/2013 | Feigelson |
| 2013/0187464 A1 | 7/2013 | Smith |
| 2013/0190936 A1 | 7/2013 | Belady |
| 2013/0199629 A1 | 8/2013 | Hemsley |
| 2013/0213038 A1 | 8/2013 | Lazaris |
| 2013/0227139 A1 | 8/2013 | Suffling |
| 2013/0245947 A1 | 9/2013 | Samsom et al. |
| 2013/0252536 A1 | 9/2013 | Chang |
| 2013/0304903 A1 | 11/2013 | Mick |
| 2013/0306276 A1 | 11/2013 | Duchesneau |
| 2013/0328395 A1 | 12/2013 | Krizman |
| 2013/0333405 A1 | 12/2013 | Belady |
| 2013/0340994 A1 | 12/2013 | David |
| 2013/0344794 A1 | 12/2013 | Shaw |
| 2014/0016256 A1 | 1/2014 | Lin |
| 2014/0036442 A1 | 2/2014 | Giannoglou |
| 2014/0049898 A1 | 2/2014 | Wu |
| 2014/0070756 A1 | 3/2014 | Kearns |
| 2014/0096837 A1 | 4/2014 | Belady |
| 2014/0101462 A1 | 4/2014 | Rose |
| 2014/0114829 A1 | 4/2014 | Forbes |
| 2014/0137468 A1 | 5/2014 | Ching |
| 2014/0149761 A1 | 5/2014 | Allen-Ware |
| 2014/0150336 A1 | 6/2014 | Houweling |
| 2014/0167504 A1 | 6/2014 | Harris |
| 2014/0180886 A1 | 6/2014 | Forbes |
| 2014/0185225 A1 | 7/2014 | Wineland |
| 2014/0202678 A1 | 7/2014 | Goth |
| 2014/0222225 A1 | 8/2014 | Rouse |
| 2014/0230401 A1 | 8/2014 | Dunn |
| 2014/0237611 A1 | 8/2014 | Dent |
| 2014/0237614 A1 | 8/2014 | Irvine |
| 2014/0316984 A1 | 10/2014 | Schwartz |
| 2014/0324237 A1 | 10/2014 | Oe |
| 2014/0331582 A1 | 11/2014 | Klaba |
| 2014/0332088 A1 | 11/2014 | Senesh |
| 2014/0365402 A1 | 12/2014 | Belady |
| 2014/0365795 A1 | 12/2014 | Nielsen |
| 2014/0366577 A1 | 12/2014 | Zubrin |

(56) References Cited

U.S. PATENT DOCUMENTS

| | | |
|---|---|---|
| 2014/0372772 A1 | 12/2014 | McKnight |
| 2014/0379156 A1 | 12/2014 | Kamel |
| 2015/0006940 A1 | 1/2015 | Kim |
| 2015/0012113 A1 | 1/2015 | Celebi |
| 2015/0012622 A1 | 1/2015 | Omatsu |
| 2015/0058845 A1 | 2/2015 | Song |
| 2015/0106811 A1 | 4/2015 | Holler |
| 2015/0121113 A1 | 4/2015 | Ramamurthy |
| 2015/0155712 A1 | 6/2015 | Mondal |
| 2015/0167550 A1 | 6/2015 | Vandervort |
| 2015/0212122 A1 | 7/2015 | Sobotka |
| 2015/0229227 A1 | 8/2015 | Aeloiza |
| 2015/0261269 A1 | 9/2015 | Bruscoe |
| 2015/0262139 A1 | 9/2015 | Shtylman |
| 2015/0276253 A1 | 10/2015 | Montalvo |
| 2015/0277410 A1 | 10/2015 | Gupta |
| 2015/0278968 A1 | 10/2015 | Steven |
| 2015/0278969 A1 | 10/2015 | Benoy |
| 2015/0280492 A1 | 10/2015 | Narita |
| 2015/0288183 A1 | 10/2015 | Villanueva |
| 2015/0292303 A1 | 10/2015 | Dusseault et al. |
| 2015/0294308 A1 | 10/2015 | Pauker et al. |
| 2015/0310424 A1 | 10/2015 | Myers |
| 2015/0310476 A1 | 10/2015 | Gadwa |
| 2015/0316903 A1 | 11/2015 | Asmus |
| 2015/0321739 A1 | 11/2015 | Dehlsen |
| 2015/0327406 A1 | 11/2015 | Gallefoss |
| 2015/0334879 A1* | 11/2015 | Fricker .............. H05K 7/20809 |
| | | 361/679.47 |
| 2015/0337218 A1 | 11/2015 | Ricotta |
| 2015/0356524 A1 | 12/2015 | Pennanen |
| 2015/0358943 A1 | 12/2015 | Zawodniok et al. |
| 2015/0363132 A1 | 12/2015 | Uehara |
| 2015/0368566 A1 | 12/2015 | Young |
| 2015/0369013 A1 | 12/2015 | Weatherhead et al. |
| 2015/0372538 A1 | 12/2015 | Siegler |
| 2016/0006066 A1 | 1/2016 | Robertson |
| 2016/0010445 A1 | 1/2016 | Harrison et al. |
| 2016/0011617 A1 | 1/2016 | Liu |
| 2016/0013652 A1 | 1/2016 | Li |
| 2016/0021793 A1* | 1/2016 | Chen .................. H05K 7/202 |
| | | 361/679.02 |
| 2016/0043552 A1 | 2/2016 | Villanueva |
| 2016/0052814 A1 | 2/2016 | Leyendecker et al. |
| 2016/0054774 A1 | 2/2016 | Song |
| 2016/0087909 A1 | 3/2016 | Chatterjee |
| 2016/0091948 A1 | 3/2016 | Mitchell |
| 2016/0109122 A1 | 4/2016 | Malm et al. |
| 2016/0109916 A1 | 4/2016 | Li |
| 2016/0112200 A1 | 4/2016 | Kheterpal et al. |
| 2016/0113157 A1 | 4/2016 | Bao |
| 2016/0125040 A1 | 5/2016 | Kheterpal et al. |
| 2016/0126783 A1 | 5/2016 | Cheng |
| 2016/0128238 A1 | 5/2016 | Shedd |
| 2016/0149484 A1 | 5/2016 | Wu |
| 2016/0164672 A1 | 6/2016 | Karighattam et al. |
| 2016/0170469 A1 | 6/2016 | Sehgal |
| 2016/0172900 A1 | 6/2016 | Welch |
| 2016/0187906 A1 | 6/2016 | Bodas |
| 2016/0198656 A1 | 7/2016 | McNamara |
| 2016/0202744 A1 | 7/2016 | Castro-Leon |
| 2016/0212954 A1 | 7/2016 | Argento |
| 2016/0214715 A1 | 7/2016 | Meffert |
| 2016/0218879 A1 | 7/2016 | Ferrin |
| 2016/0248631 A1 | 8/2016 | Duchesneau |
| 2016/0249484 A1* | 8/2016 | Parizeau ............ H05K 7/20745 |
| 2016/0261226 A1 | 9/2016 | Hamilton |
| 2016/0261404 A1 | 9/2016 | Ford et al. |
| 2016/0261685 A1 | 9/2016 | Chen et al. |
| 2016/0283920 A1 | 9/2016 | Fisher et al. |
| 2016/0300234 A1 | 10/2016 | Moss-Pultz et al. |
| 2016/0319653 A1 | 11/2016 | Reeves et al. |
| 2016/0324077 A1 | 11/2016 | Frantzen |
| 2016/0328713 A1 | 11/2016 | Ebrahimi |
| 2016/0330031 A1 | 11/2016 | Drego et al. |
| 2016/0330035 A1 | 11/2016 | Ebrahimi et al. |
| 2016/0342977 A1 | 11/2016 | Lam |
| 2016/0362954 A1 | 12/2016 | Hansen et al. |
| 2016/0377306 A1 | 12/2016 | Drees |
| 2017/0013746 A1 | 1/2017 | Campbell |
| 2017/0018467 A1 | 1/2017 | Walker |
| 2017/0023969 A1 | 1/2017 | Shows |
| 2017/0027086 A1 | 1/2017 | Noteboom |
| 2017/0104332 A1 | 4/2017 | Wenzel |
| 2017/0104336 A1 | 4/2017 | ElBsat |
| 2017/0104337 A1 | 4/2017 | Drees |
| 2017/0104342 A1 | 4/2017 | ElBsat |
| 2017/0104343 A1 | 4/2017 | ElBsat |
| 2017/0112023 A1 | 4/2017 | Mao |
| 2017/0169344 A1 | 6/2017 | Mangharam |
| 2017/0185132 A1 | 6/2017 | Bodas |
| 2017/0192483 A1 | 7/2017 | Boss |
| 2017/0194791 A1 | 7/2017 | Budde |
| 2017/0201098 A1 | 7/2017 | Carpenter |
| 2017/0207629 A1 | 7/2017 | Seki |
| 2017/0209822 A1 | 7/2017 | Lopez |
| 2017/0214070 A1 | 7/2017 | Wang |
| 2017/0218843 A1 | 8/2017 | Oehring |
| 2017/0237261 A1 | 8/2017 | Maug |
| 2017/0243290 A1 | 8/2017 | Brown |
| 2017/0249606 A1 | 8/2017 | Pirooz |
| 2017/0261949 A1 | 9/2017 | Hoffmann |
| 2017/0265326 A1 | 9/2017 | Totani |
| 2017/0271701 A1 | 9/2017 | Berlowitz |
| 2017/0280594 A1 | 9/2017 | Sato |
| 2017/0300359 A1 | 10/2017 | Kollur |
| 2017/0302077 A1 | 10/2017 | Yabe |
| 2017/0302171 A1 | 10/2017 | Goto |
| 2017/0311487 A1 | 10/2017 | Rau |
| 2017/0329908 A1 | 11/2017 | Braswell |
| 2017/0349058 A1 | 12/2017 | Bernier |
| 2017/0352010 A1 | 12/2017 | Son |
| 2017/0358041 A1 | 12/2017 | Forbes |
| 2017/0366412 A1 | 12/2017 | Piga |
| 2017/0373500 A1 | 12/2017 | Shafi |
| 2018/0026478 A1 | 1/2018 | Peloso |
| 2018/0042064 A1 | 2/2018 | Norton |
| 2018/0052431 A1 | 2/2018 | Shaikh |
| 2018/0101220 A1 | 4/2018 | Mahindru |
| 2018/0109112 A1 | 4/2018 | Paine |
| 2018/0109162 A1* | 4/2018 | Paine .................. B65D 88/121 |
| 2018/0109163 A1 | 4/2018 | Paine |
| 2018/0109541 A1 | 4/2018 | Gleichauf |
| 2018/0116070 A1 | 4/2018 | Broadbent |
| 2018/0124955 A1 | 5/2018 | Rogers |
| 2018/0144414 A1 | 5/2018 | Lee |
| 2018/0152023 A1 | 5/2018 | Guruprasad |
| 2018/0175666 A1 | 6/2018 | Ayer |
| 2018/0181153 A1 | 6/2018 | Takahashi |
| 2018/0192538 A1* | 7/2018 | Sakalkar ............. H05K 7/1497 |
| 2018/0202825 A1 | 7/2018 | You |
| 2018/0240112 A1 | 8/2018 | Castinado |
| 2018/0267839 A1 | 9/2018 | Maisuria |
| 2018/0284707 A1 | 10/2018 | Menon |
| 2018/0294649 A1 | 10/2018 | Bright |
| 2018/0351367 A1 | 12/2018 | Kogo |
| 2018/0366978 A1 | 12/2018 | Matan |
| 2018/0367320 A1 | 12/2018 | Montalvo |
| 2019/0018394 A1 | 1/2019 | Sayyarrodsari |
| 2019/0022580 A1 | 1/2019 | Al Muhsen |
| 2019/0042990 A1 | 2/2019 | Paul |
| 2019/0044412 A1 | 2/2019 | Halbert |
| 2019/0052094 A1 | 2/2019 | Pmsvvsv |
| 2019/0063252 A1 | 2/2019 | Spears |
| 2019/0082618 A1 | 3/2019 | Lopez |
| 2019/0122132 A1 | 4/2019 | Rimini |
| 2019/0148819 A1* | 5/2019 | Dominguez ......... H05K 5/0247 |
| | | 455/562.1 |
| 2019/0168630 A1 | 6/2019 | Mrlik |
| 2019/0173283 A1 | 6/2019 | Epel |
| 2019/0258307 A1 | 8/2019 | Shaikh |
| 2019/0261589 A1 | 8/2019 | Pham |
| 2019/0267644 A1 | 8/2019 | Berntsen |
| 2019/0280521 A1 | 9/2019 | Lundstrom |

(56) References Cited

U.S. PATENT DOCUMENTS

| | | |
|---|---|---|
| 2019/0306176 A1 | 10/2019 | Gleichauf |
| 2019/0318327 A1 | 10/2019 | Sowell |
| 2019/0324820 A1 | 10/2019 | Krishnan |
| 2019/0332149 A1 | 10/2019 | Shelnutt |
| 2019/0335625 A1 | 10/2019 | Shelnutt |
| 2019/0335626 A1 | 10/2019 | Shelnutt |
| 2019/0339756 A1 | 11/2019 | Lewis |
| 2019/0354076 A1 | 11/2019 | Henson |
| 2019/0357390 A1 | 11/2019 | Preuss |
| 2020/0006938 A1 | 1/2020 | Torvund |
| 2020/0008320 A1* | 1/2020 | Yu ............ H04L 9/3239 |
| 2020/0033837 A1* | 1/2020 | Simmons ...... H05K 7/20745 |
| 2020/0040272 A1 | 2/2020 | Cavness |
| 2020/0051184 A1 | 2/2020 | Barbour |
| 2020/0073466 A1 | 3/2020 | Walsh |
| 2020/0089307 A1 | 3/2020 | McNamara |
| 2020/0091717 A1 | 3/2020 | McNamara |
| 2020/0091727 A1 | 3/2020 | McNamara |
| 2020/0091766 A1 | 3/2020 | McNamara |
| 2020/0103958 A1* | 4/2020 | Chen ............ G06F 1/3296 |
| 2020/0107475 A1 | 4/2020 | Keisling |
| 2020/0136387 A1 | 4/2020 | McNamara |
| 2020/0136388 A1 | 4/2020 | McNamara |
| 2020/0154596 A1* | 5/2020 | Roy ............. H05K 7/1497 |
| 2020/0161865 A1 | 5/2020 | Clifton |
| 2020/0167197 A1 | 5/2020 | Bahramshahry |
| 2020/0177100 A1 | 6/2020 | Wang |
| 2020/0318843 A1 | 10/2020 | Wenzel |
| 2020/0319700 A1* | 10/2020 | Wu ............. G06F 1/3243 |
| 2020/0321776 A1 | 10/2020 | Shaver |
| 2020/0341439 A1 | 10/2020 | Valin |
| 2020/0359572 A1 | 11/2020 | Henson |
| 2020/0379537 A1 | 12/2020 | Henson |
| 2020/0392952 A1* | 12/2020 | Khachaturov ...... H05K 7/206 |
| 2020/0395761 A1 | 12/2020 | Walsh |
| 2021/0014997 A1* | 1/2021 | Johnson ....... H05K 7/20736 |
| 2021/0021135 A1 | 1/2021 | ElBsat |
| 2021/0035242 A1 | 2/2021 | McNamara |
| 2021/0036547 A1 | 2/2021 | McNamara |
| 2021/0057913 A1 | 2/2021 | Cavness |
| 2021/0092875 A1* | 3/2021 | Hellmann-Regen ......... H05K 7/20745 |
| 2021/0101499 A1 | 4/2021 | McNamara |
| 2021/0111585 A1 | 4/2021 | McNamara |
| 2021/0124322 A1 | 4/2021 | McNamara |
| 2021/0126456 A1 | 4/2021 | McNamara |
| 2021/0175710 A1 | 6/2021 | Campbell |
| 2021/0287309 A1 | 9/2021 | Gebhardt |
| 2021/0288495 A1 | 9/2021 | McNamara |
| 2021/0288496 A1 | 9/2021 | McNamara |
| 2021/0294267 A1 | 9/2021 | Constancias |
| 2021/0294287 A1 | 9/2021 | Valin |
| 2021/0294405 A1 | 9/2021 | McNamara |
| 2021/0296893 A1 | 9/2021 | McNamara |
| 2021/0296928 A1 | 9/2021 | McNamara |
| 2021/0298195 A1 | 9/2021 | Barbour |
| 2021/0312574 A1 | 10/2021 | McNamara |
| 2021/0325955 A1 | 10/2021 | McNamara |
| 2021/0345526 A1 | 11/2021 | Thornton |
| 2021/0378131 A1 | 12/2021 | Johnson |
| 2022/0033517 A1 | 2/2022 | Hendry |
| 2022/0039333 A1 | 2/2022 | Avila |
| 2022/0085603 A1 | 3/2022 | McNamara |
| 2022/0197363 A1 | 6/2022 | McNamara |
| 2022/0294219 A1 | 9/2022 | McNamara |
| 2022/0352720 A1 | 11/2022 | Cavness |
| 2022/0366517 A1 | 11/2022 | McNamara |
| 2022/0407350 A1 | 12/2022 | McNamara |
| 2023/0121669 A1 | 4/2023 | McNamara |

FOREIGN PATENT DOCUMENTS

| | | | |
|---|---|---|---|
| AU | 2016100178 A4 | 3/2016 | |
| AU | 2016100394 A4 | 5/2016 | |
| CA | 2332840 A1 | 11/1999 | |
| CA | 2522428 A1 | 4/2007 | |
| CA | 2653778 A1 | 12/2007 | |
| CA | 2793537 A1 | 10/2011 | |
| CA | 2758681 A1 | 5/2012 | |
| CA | 2758725 A1 | 5/2012 | |
| CA | 2752594 A1 | 12/2012 | |
| CA | 2914797 A1 | 11/2014 | |
| CA | 3090944 A1 | 8/2018 | |
| CA | 3105380 A1 | 2/2020 | |
| CA | 3111583 A1 | 3/2020 | |
| CA | 3111830 A1 | 3/2020 | |
| CA | 3112037 A1 | 3/2020 | |
| CA | 3118128 A1 | 5/2020 | |
| CA | 3126390 A1 | 7/2020 | |
| CA | 3048706 A1 | 8/2020 | |
| CA | 3128478 A1 | 9/2020 | |
| CA | 3139776 A1 | 11/2020 | |
| CA | 3050389 A1 | 1/2021 | |
| CA | 3076653 A1 | 9/2021 | |
| CN | 1656661 A | 8/2005 | |
| CN | 1847626 A | 10/2006 | |
| CN | 101501596 A | 8/2009 | |
| CN | 101803148 A | 8/2010 | |
| CN | 102185382 A | 9/2011 | |
| CN | 102541219 A | 7/2012 | |
| CN | 102591921 A | 7/2012 | |
| CN | 102762409 A | 10/2012 | |
| CN | 202503827 U | 10/2012 | |
| CN | 103163904 A | 6/2013 | |
| CN | 103327785 A | 9/2013 | |
| CN | 103440028 A | 12/2013 | |
| CN | 103443550 A | 12/2013 | |
| CN | 103562817 A | 2/2014 | |
| CN | 103748757 A | 4/2014 | |
| CN | 104144183 A | 11/2014 | |
| CN | 104715340 A | 6/2015 | |
| CN | 104969434 A | 10/2015 | |
| CN | 105451504 A | 3/2016 | |
| CN | 105814543 A | 7/2016 | |
| CN | 106226718 A | 12/2016 | |
| CN | 106659054 A | 5/2017 | |
| CN | 107257608 A | 10/2017 | |
| CN | 107967536 A | 4/2018 | |
| CN | 110083212 A | 8/2019 | |
| CN | 111522652 A | 8/2020 | |
| CN | 112106051 A | 12/2020 | |
| CN | 112438006 A | 3/2021 | |
| DE | 738523 C | 8/1943 | |
| EP | 1167861 A1 | 1/2002 | |
| EP | 1490941 A1 | 12/2004 | |
| EP | 1993774 A2 | 11/2008 | |
| EP | 2036189 A2 | 3/2009 | |
| EP | 2074337 A2 | 7/2009 | |
| EP | 2354378 A1 | 8/2011 | |
| EP | 2446516 A2 | 5/2012 | |
| EP | 2634956 A2 | 9/2013 | |
| EP | 2721710 A2 | 4/2014 | |
| EP | 2900045 A1 | 7/2015 | |
| EP | 3035480 A1 | 6/2016 | |
| EP | 3054405 | 10/2016 | |
| EP | 2721710 B1 | 1/2018 | |
| EP | 3266087 A1 | 1/2018 | |
| EP | 3465865 A1 | 4/2019 | |
| EP | 2648496 B1 | 5/2019 | |
| EP | 3807972 A1 | 4/2021 | |
| EP | 3850462 A1 | 7/2021 | |
| ES | 2765100 T3 | 6/2020 | |
| FR | 2954670 A1 | 6/2011 | |
| FR | 2954671 A1 | 6/2011 | |
| FR | 2957163 A1 | 9/2011 | |
| FR | 2960662 A1 | 12/2011 | |
| FR | 2999819 A1 | 6/2014 | |
| FR | 3017024 A1 | 7/2015 | |
| GB | 2500196 A * | 9/2013 | ............ H02S 10/00 |
| GB | 2560378 A | 9/2018 | |
| JP | 2005056196 A | 3/2005 | |
| JP | 3717420 B2 | 11/2005 | |
| JP | 2005353497 A | 12/2005 | |

(56) References Cited

FOREIGN PATENT DOCUMENTS

| | | | |
|---|---|---|---|
| JP | 2011123873 A | 6/2011 | |
| JP | 2012032107 A | 2/2012 | |
| JP | 2013524317 A | 6/2013 | |
| JP | 2014518060 A | 7/2014 | |
| JP | 5662877 B2 | 2/2015 | |
| JP | 2015528266 A | 9/2015 | |
| JP | 2017530449 A | 10/2017 | |
| KR | 20090012523 A | 2/2009 | |
| KR | 100907946 B1 | 7/2009 | |
| KR | 101399235 B1 | 5/2014 | |
| KR | 20180084285 A | 7/2018 | |
| NL | 2004277 C2 | 8/2011 | |
| RU | 2012138911 A | 5/2014 | |
| RU | 2642422 C2 | 1/2018 | |
| TW | 201214093 A | 4/2012 | |
| TW | 201526774 A | 7/2015 | |
| WO | 99/60687 A1 | 11/1999 | |
| WO | 02/07365 A2 | 1/2002 | |
| WO | 2006/058341 A2 | 6/2006 | |
| WO | 2008/039773 A2 | 4/2008 | |
| WO | 2009/113824 A2 | 9/2009 | |
| WO | 2010/050249 A1 | 5/2010 | |
| WO | 2011/130406 A1 | 10/2011 | |
| WO | 2012/014093 A1 | 2/2012 | |
| WO | 2012/177769 A1 | 12/2012 | |
| WO | 2013/022501 A1 | 2/2013 | |
| WO | 2013/066602 A1 | 5/2013 | |
| WO | 2013/066604 A1 | 5/2013 | |
| WO | 2014/005156 A2 | 1/2014 | |
| WO | 2014/130972 A1 | 8/2014 | |
| WO | 2014/185311 A1 | 11/2014 | |
| WO | 2015/039122 A1 | 3/2015 | |
| WO | 2015/072989 A1 | 5/2015 | |
| WO | 2015077378 | 5/2015 | |
| WO | 2015/123257 A1 | 8/2015 | |
| WO | 2015/175693 A1 | 11/2015 | |
| WO | 2015199629 A1 | 12/2015 | |
| WO | 2016/064342 A1 | 4/2016 | |
| WO | 2016/067295 A1 | 5/2016 | |
| WO | 2016/106373 A1 | 6/2016 | |
| WO | 2016/145052 A1 | 9/2016 | |
| WO | 2017/074513 A1 | 5/2017 | |
| WO | 2017/163126 A1 | 9/2017 | |
| WO | 2017/214210 A1 | 12/2017 | |
| WO | WO-2017213445 A1 * | 12/2017 | ............... H05K 7/20 |
| WO | 2018/068042 A1 | 4/2018 | |
| WO | 2018145201 A1 | 8/2018 | |
| WO | 2019/060180 A2 | 3/2019 | |
| WO | 2019/113136 A1 | 6/2019 | |
| WO | 2019/116375 A1 | 6/2019 | |
| WO | 2019/139632 A1 | 7/2019 | |
| WO | 2019/139633 A1 | 7/2019 | |
| WO | 2020/007435 A1 | 1/2020 | |
| WO | 2020/056322 A1 | 3/2020 | |
| WO | 2020/163939 A1 | 8/2020 | |
| WO | 2020/163968 A2 | 8/2020 | |
| WO | 2020/176486 A1 | 9/2020 | |
| WO | 2020/227811 A1 | 11/2020 | |
| WO | 2021/022174 A1 | 2/2021 | |
| WO | 2021/022175 A1 | 2/2021 | |
| WO | 2021/086930 A1 | 5/2021 | |
| WO | 2021/129692 A1 | 7/2021 | |
| WO | 2021/173973 A1 | 9/2021 | |
| WO | 2022/031836 A1 | 2/2022 | |

OTHER PUBLICATIONS

Ko, Jeong Beom; Kim, Jae Pil; Lee, Eun Ho; Park, Weon Gi; Koo, Ji Hyun; Im, Byung Sool; Roh, Sang Min, "Server Room Cooling Device and Method for Operating Data Center Using Same", Dec. 14, 2017, Naver Business Platform Corp, Entire Document (Translation of WO 2017213445). (Year: 2017).*

Wiki, Mining, accessed Jan. 19, 2017, 4 pages, URL=https://en.bitcoin.it/wiki/Mining.

Wiki, Google Modular Data Center, accessed Oct. 5, 2019 but available at least as early as Feb. 8, 2017, 2 pages, URL=https://en.wikipedia.org/wiki/Google_Modular_Data_Center.

Bitfury, Block Box AC Mobile Datacenter, available at least as early as Feb. 8, 2017, 3 pages, screenshots taken from Wayback machine Internet archive, URL=https://web.archive.org/web/20170130043612/http:/bitfury.com/ products#blockbox-ac.

Wiki, Intermodal Container, accessed Oct. 5, 2019 but available at least as early as Feb. 8, 2017, 24 pages, URL=https://en.wikipedia.org/wiki/Intermodal_container 6/.

Wiki, Sun Modular Datacenter, accessed Oct. 5, 2019 but available at least as early as Feb. 8, 2017, 3 pages, URL=https://en.wikipedia.org/wiki/Sun_Modular_Datacenter.

Bitcoin Container, 10ft Bitcoin Mining Container, accessed Sep. 5, 2019 available at least as early as May 14, 2019, 5 pages, URL=https://bitcoincontainer.com/products/10ft-bitcoin-mining-container.

Bitfury, BlockBox AC, available at least as early as May 9, 2019, 7 pages, URL=https://bitfury.com/content/downloads/blockboxacbrochure176v2.pdf.

Iwando Blockchain, Crypto Mining Container, available at least as early as May 9, 2019, 9 pages, URL=https://blockchain.iwando.com/en/crypto-mining-container/.

EZ Blockchain, EZ Smartbox, available at least as May 9, 2019, 5 pages, URL=https://www.ezblockchain.net/smart-box.html.

Miningstore, BitCave, accessed May 9, 2019 but available at least as early as Mar. 27, 2019, 4 pages, URL=https://miningstore.com/bitcoin-mining-containers/bitcave/.

SOLminer, SOLminer Cube, accessed May 9, 2019 but available at least as early as Sep. 16, 2018, 7 pages, URL=https://solminer.io/mobile-mining-system/.

Nordcoin Mining, Mobile Mining Container, accessed May 9, 2019 but available as early as Feb. 6, 2019, 7 pages, URL=https://www.nordcoinmining.com/.

Power Mining, Mobile Mining Unit ASIC-184, accessed May 9, 2019 but available as early as Dec. 27, 2018, 8 pages, URL=https://www.powerminingshop.com/pdf/Power_Mining_Crpyo_Container_ASIC_184.pdf.

Bitmain, Antminer T9+, accessed Apr. 24, 2019 but available as early as Feb. 3, 2018, 3 pages, Screenshots taken from Wayback machine Internet archive, URL=https://web.archive.org/web/20180217221522/http://shop.bitmain.com/productDetail.htm?pid=00020180130312285066gKlcpoR06AA.

Sea-Can Containers Ltd, Shipping Containers, accessed Jan. 17, 2020 but available as early as Jul. 3, 2018, 3 pages, Screenshots taken from Wayback machine Internet archive, URL=https://web.archive.org/web/20180703184711/http://seacan.com/shipping-containers/.

An Innovative Solution to Flaring, Crusoe Energy, available as early as Dec. 9, 2019, 2 pgs, screenshots taken from Wayback Machine internet archive, URL=https://web.archive.org/web/20191209224205/https://www.crusoeenergy.com/.

Albert Szmigielski, Bitcoin Essentials, published Feb. 2016, 130 pages.

Alex Lielacher, Crypto you can mine from a home computer in 2023, Jul. 18, 2023, obtained Jul. 20, 2023, 11 pages.

Amanda Stephenson, Genalta Power earns carbon offsets for turning flare gas into electricity, Calgary Herald, posted Sep. 30, 2014, 6 pages.

Aprice44, Mining with Free Natural Gas, Reddit posting, allegedly available as early as Jul. 3, 2016, 1 page.

Complaint for Patent Infringement, *Upstream Data Inc.* v. *Crusoe Energy Systems LLC*, Case No. 1:23-cv-01252, D. Colo. May 18, 2023, 13 pages.

Cryptocurrency investors eye provinces with low electricity rates, The Fraser Institute Blog, posted Jan. 31, 2018, 3 pages.

CryptoKube, CryptoKube Brochure, obtained Jul. 17, 2023 from the WaybackMachine dated Mar. 5, 2016, 5 pages.

CryptoKube, Screenshots and transcript from CryptoKube, available as early as 2014.

Gerald Sanders and Johnson Space Center, Gas Conversion Systems Reclaim Fuel for Industry, published in 2015, 4 pages.

(56) References Cited

OTHER PUBLICATIONS

International Search report and written opinion for PCT/CA2020/050426, dated Jun. 25, 2020, 14 pages.
International Search Report and written opinion issued on PCT application No. PCT/CA2018/050135, 9 pages.
JCHI2210, Free natural gas, is it worth it to use a Natural gas generator?, Bitcoin Forum, posted Aug. 27, 2017, 7 pages.
June Ann Munford, Declaration of June Ann Munford, Jul. 19, 2023, 225 pages.
Kenyn, Saving the environment through bitcoin; one transaction equals 117 recycled bottles, Reddit, posted Feb. 26, 2017, 17 pages.
Kinolva, Shower Thought: Mining Bitcoin for Heat / Hot Water?, Reddit, posted Jan. 28, 2017, 14 pages.
Mia Bennett, Blog—Bitcoin mining: The next rush to hit the Arctic?, posted Feb. 6, 2018, 14 pages.
Michael Nikolaou, Declaration of Michael Nikolaou, Jul. 20, 2023, 157 pages.
Youtube, Horizontal Container Twist Lock/Connector, Aug. 10, 2020, Mytee Products, retrieved online Nov. 22, 2022, https://www.youtube.com/watch?v=c1unwiisykc.
Office Action issued on Canadian patent application 3090944, Jan. 28, 2022, 3 pages.
Polivka GmbH, Mining Container ~100kW by Polivka GmbH, ontained Jun. 29, 2023 from the WaybackMachine dated May 20, 2015, 36 pages.
Polivka GmbH, Screenshots of Mining Container Setup on Vimeo, available as early as Feb. 9, 2015, 1 page.
Pymnts, China Moves To Squeeze Out Bitcoin Mining, posted Jan. 10, 2018, 7 pages.
The Best Places in The World to Mine Bitcoin, PRNewswire, posted Jan. 18, 2018, 8 pages.
Theselfgoverned, Electricity Consumption: Bitcoin mining vs The current global financial system, Reddit, posted Jun. 5, 2014, 15 pages.
Vernon Kasdorf, Declaration of Vernon Kasdorf, Jul. 20, 2023, 116 pages.
WayBack Machine, New Century Exploration (2022) Retrieved online Apr. 16, 2022, https://web.archive.org/web/20220401000000*/https://www.newcenturyexp.com/.
WayBack Machine, New Century Exploration—What We Do (2022) Retrieved online Apr. 16, 2022, https://web.archive.org/web/20220330234542/https://www.newcenturyexp.com/.
Machine generated transcript, Using Natural Gas To Mine Bitcoin With Matthew Lohstroh, Sep. 18, 2018, retrieved online Aug. 18, 2023, https://www.youtube.com/watch?v=TYpsZzlevow, 17 pages.
Youtube, Why is natural gas flared? What is the solution?, Jun. 23, 2015, Retrieved online Aug. 18, 2023, https://www.youtube.com/watch?v=4_vEUnlOAs8, 3 pages.
Machine generated translation of Foreign Patent submission #25 (CN101501596), retrieved online Aug. 11, 2023, 20 pages.
Machine generated translation of Foreign Patent submission #26 (CN101803148), retrieved online Aug. 11, 2023, 29 pages.
Machine generated translation of Foreign Patent submission #27 (CN102185382), retrieved online Aug. 11, 2023, 14 pages.
Machine generated translation of Foreign Patent submission #28 (CN102541219), retrieved online Aug. 11, 2023, 7 pages.
Machine generated translation of Foreign Patent submission #29 (CN102591921), retrieved online Aug. 11, 2023, 15 pages.
Machine generated translation of Foreign Patent submission #30 (CN102762409), retrieved online Aug. 11, 2023, 24 pages.
Machine generated translation of Foreign Patent submission #31 (CN103163904), retrieved online Aug. 11, 2023, 33 pages.
Machine generated translation of Foreign Patent submission #32 (CN103327785), retrieved online Aug. 11, 2023, 6 pages.
Machine generated translation of Foreign Patent submission #33 (CN103440028), retrieved online Aug. 11, 2023, 19 pages.
Machine generated translation of Foreign Patent submission #34 (CN103443550), retrieved online Aug. 11, 2023, 11 pages.
Machine generated translation of Foreign Patent submission #35 (CN103562817), retrieved online Aug. 11, 2023, 15 pages.
Machine generated translation of Foreign Patent submission #36 (CN103748757), retrieved online Aug. 11, 2023, 26 pages.
Machine generated translation of Foreign Patent submission #37 (CN104144183), retrieved online Aug. 11, 2023, 52 pages.
Machine generated translation of Foreign Patent submission #38 (CN104715340), retrieved online Aug. 11, 2023, 8 pages.
Machine generated translation of Foreign Patent submission #39 (CN104969434), retrieved online Aug. 11, 2023, 27 pages.
Machine generated translation of Foreign Patent submission #40 (CN105451504), retrieved online Aug. 11, 2023, 16 pages.
Machine generated translation of Foreign Patent submission #41 (CN105814543), retrieved online Aug. 11, 2023, 19 pages.
Machine generated translation of Foreign Patent submission #42 (CN106226718), retrieved online Aug. 11, 2023, 13 pages.
Machine generated translation of Foreign Patent submission #43 (CN106659054), retrieved online Aug. 11, 2023, 4 pages.
Machine generated translation of Foreign Patent submission #44 (CN107257608), retrieved online Aug. 11, 2023, 11 pages.
Machine generated translation of Foreign Patent submission #45 (CN107967536), retrieved online Aug. 11, 2023, 20 pages.
Machine generated translation of Foreign Patent submission #46 (CN110083212), retrieved online Aug. 11, 2023, 19 pages.
Machine generated translation of Foreign Patent submission #47 (CN111522652), retrieved online Aug. 11, 2023, 16 pages.
Machine generated translation of Foreign Patent submission #48 (CN112106051), retrieved online Aug. 11, 2023, 22 pages.
Machine generated translation of Foreign Patent submission #49 (CN112438006), retrieved online Aug. 11, 2023, 34 pages.
Machine generated translation of Foreign Patent submission #50 (CN1656661), retrieved online Aug. 11, 2023, 56 pages.
Machine generated translation of Foreign Patent submission #51 (CN1847626), retrieved online Aug. 11, 2023, 11 pages.
Machine generated translation of Foreign Patent submission #52 (CN202503827), retrieved online Aug. 11, 2023, 7 pages.
Machine generated translation of Foreign Patent submission #53 (DE738523), retrieved online Aug. 11, 2023, 5 pages.
Machine generated translation of Foreign Patent submission #64 (EP2900045), retrieved online Aug. 11, 2023, 10 pages.
Machine generated translation of Foreign Patent submission #70 (ES2765100), retrieved online Aug. 11, 2023, 15 pages.
Machine generated translation of Foreign Patent submission #71 (FR2954670), retrieved online Aug. 11, 2023, 27 pages.
Machine generated translation of Foreign Patent submission #72 (FR2954671), retrieved online Aug. 11, 2023, 20 pages.
Machine generated translation of Foreign Patent submission #73 (FR2957163), retrieved online Aug. 11, 2023, 8 pages.
Machine generated translation of Foreign Patent submission #74 (FR2960662), retrieved online Aug. 11, 2023, 10 pages.
Machine generated translation of Foreign Patent submission #75 (FR2999819), retrieved online Aug. 11, 2023, 10 pages.
Machine generated translation of Foreign Patent submission #76 (FR3017024), retrieved online Aug. 11, 2023, 8 pages.
Machine generated translation of Foreign Patent submission #78 (JP2005056196), retrieved online Aug. 11, 2023, 10 pages.
Machine generated translation of Foreign Patent submission #79 (JP2005353497), retrieved online Aug. 11, 2023, 14 pages.
Machine generated translation of Foreign Patent submission #80 (JP2011123873), retrieved online Aug. 11, 2023, 10 pages.
Machine generated translation of Foreign Patent submission #81 (JP2012032107), retrieved online Aug. 11, 2023, 7 pages.
Machine generated translation of Foreign Patent submission #82 (JP2013524317), retrieved online Aug. 11, 2023, 10 pages.
Machine generated translation of Foreign Patent submission #83 (JP2014518060), retrieved online Aug. 11, 2023, 18 pages.
Machine generated translation of Foreign Patent submission #84 (JP2015528266), retrieved online Aug. 11, 2023, 9 pages.
Machine generated translation of Foreign Patent submission #85 (JP2017530449), retrieved online Aug. 11, 2023, 23 pages.
Machine generated translation of Foreign Patent submission #86 (JP3717420), retrieved online Aug. 11, 2023, 22 pages.
Machine generated translation of Foreign Patent submission #87 (JP5662877), retrieved online Aug. 11, 2023, 13 pages.

(56) References Cited

OTHER PUBLICATIONS

Machine generated translation of Foreign Patent submission #88 (KR100907946), retrieved online Aug. 11, 2023, 15 pages.
Machine generated translation of Foreign Patent submission #89 (KR101399235), retrieved online Aug. 11, 2023, 19 pages.
Machine generated translation of Foreign Patent submission #90 (KR20090012523), retrieved online Aug. 11, 2023, 16 pages.
Machine generated translation of Foreign Patent submission #91 (KR20180084285), retrieved online Aug. 11, 2023, 19 pages.
Machine generated translation of Foreign Patent submission #94 (RU2642422), retrieved online Aug. 11, 2023, 27 pages.
Machine generated translation of Foreign Patent submission #96 (TW201214093), retrieved online Aug. 11, 2023, 6 pages.
Machine generated translation of Foreign Patent submission #97 (TW201526774), retrieved online Aug. 11, 2023, 6 pages.
Machine generated translation of Foreign Patent submission #102 (WO2010050249), retrieved online Aug. 11, 2023, 23 pages.
Machine generated translation of Foreign Patent submission #111 (WO2014185311), retrieved online Aug. 11, 2023, 13 pages.

* cited by examiner

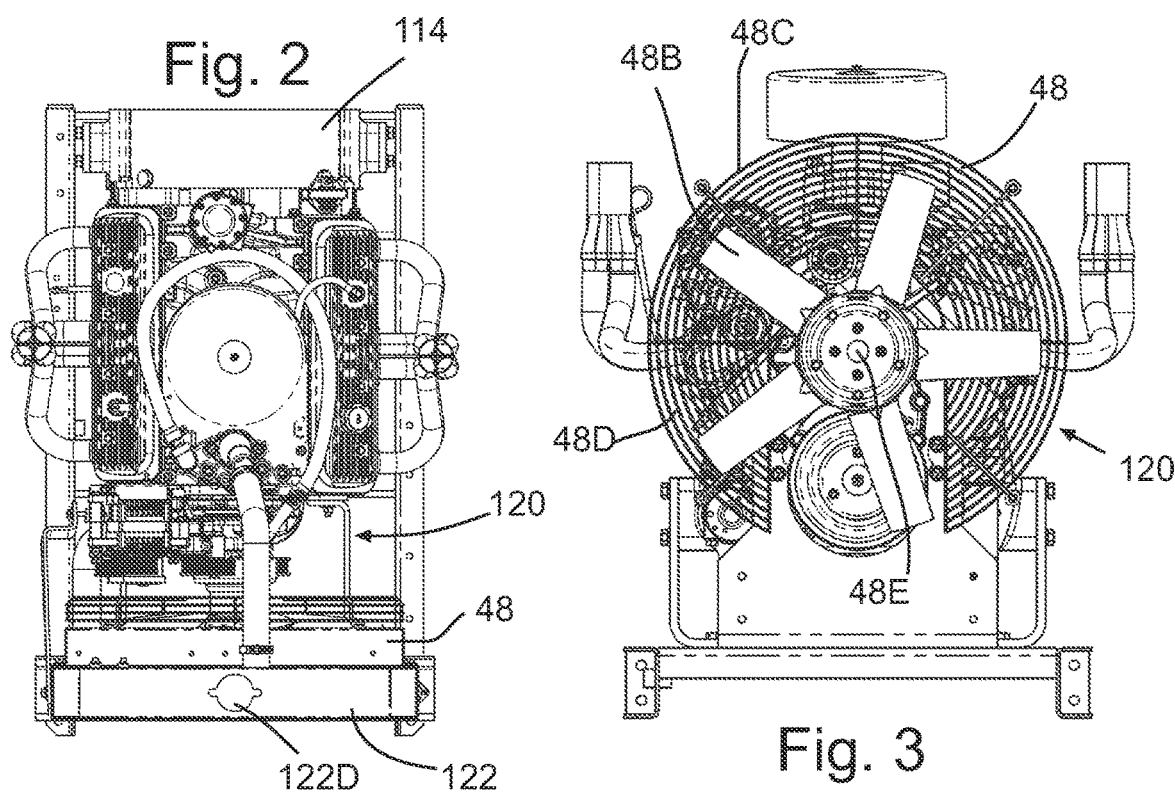
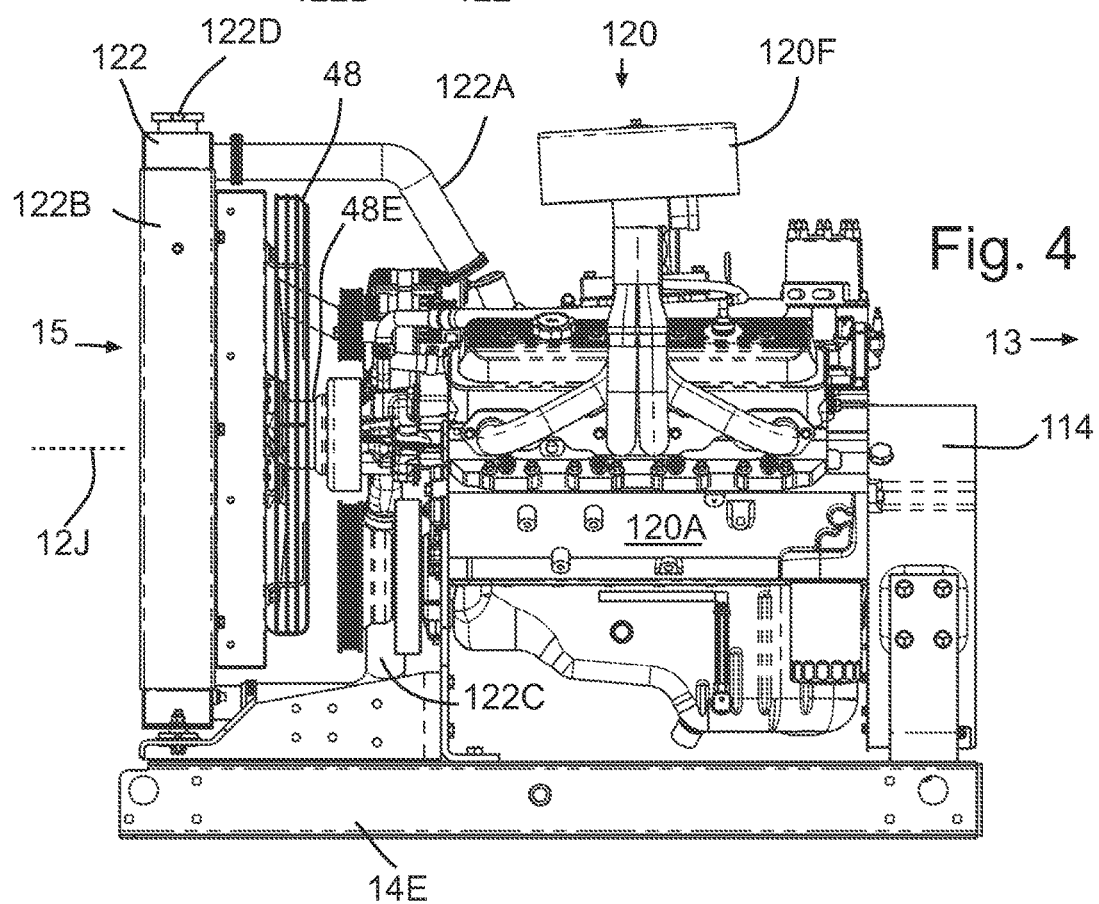

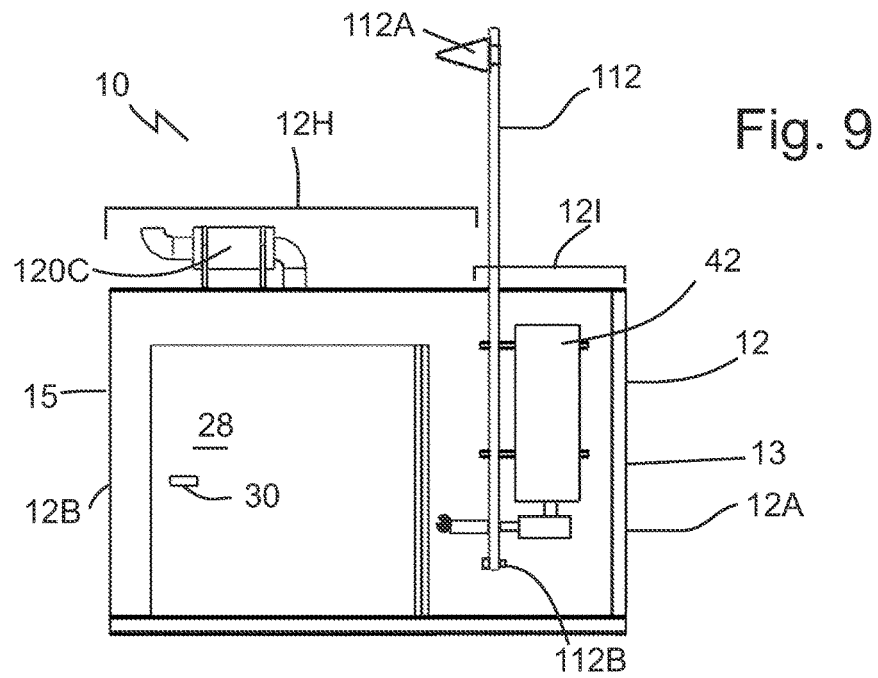
Fig. 9
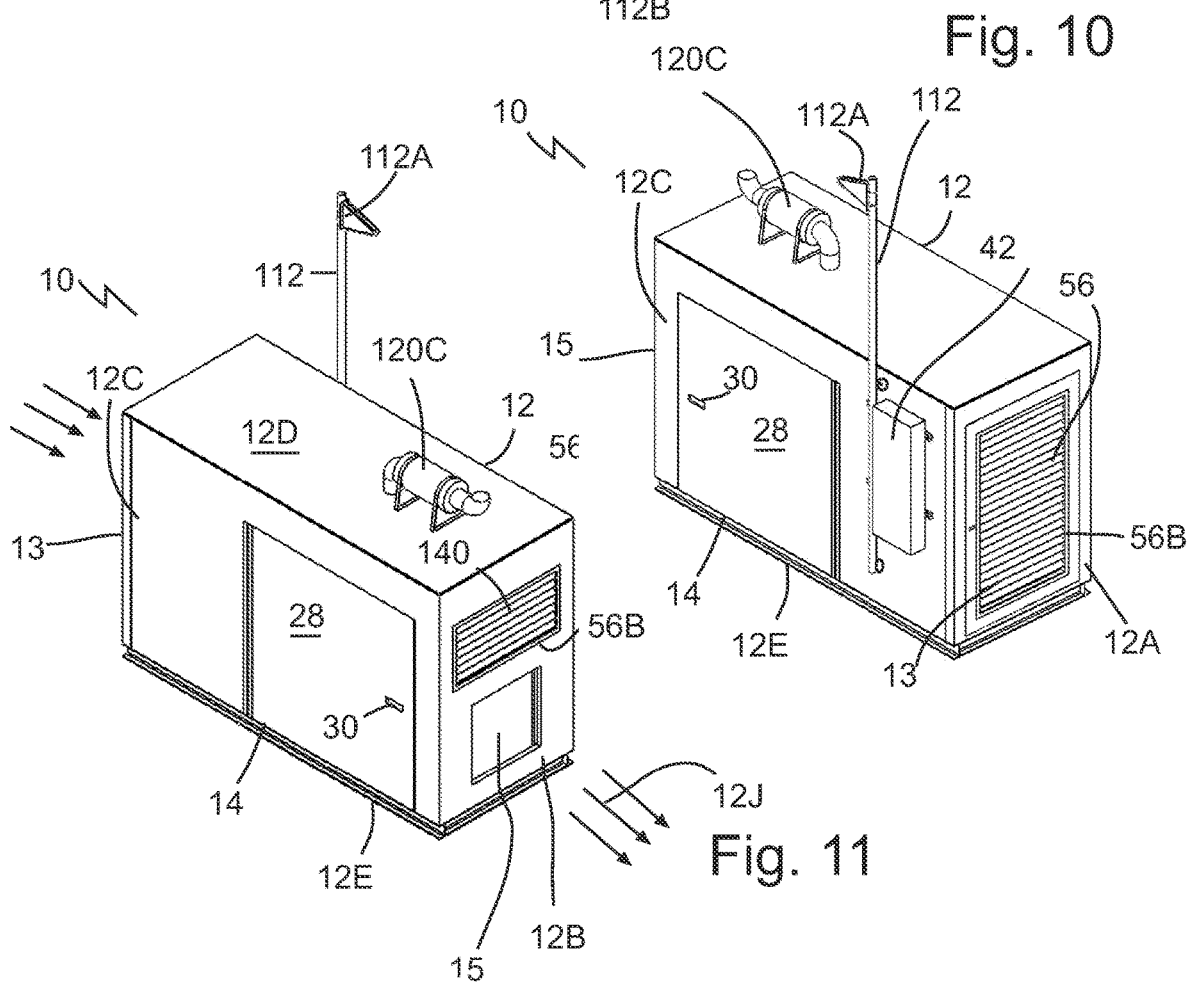
Fig. 10
Fig. 11

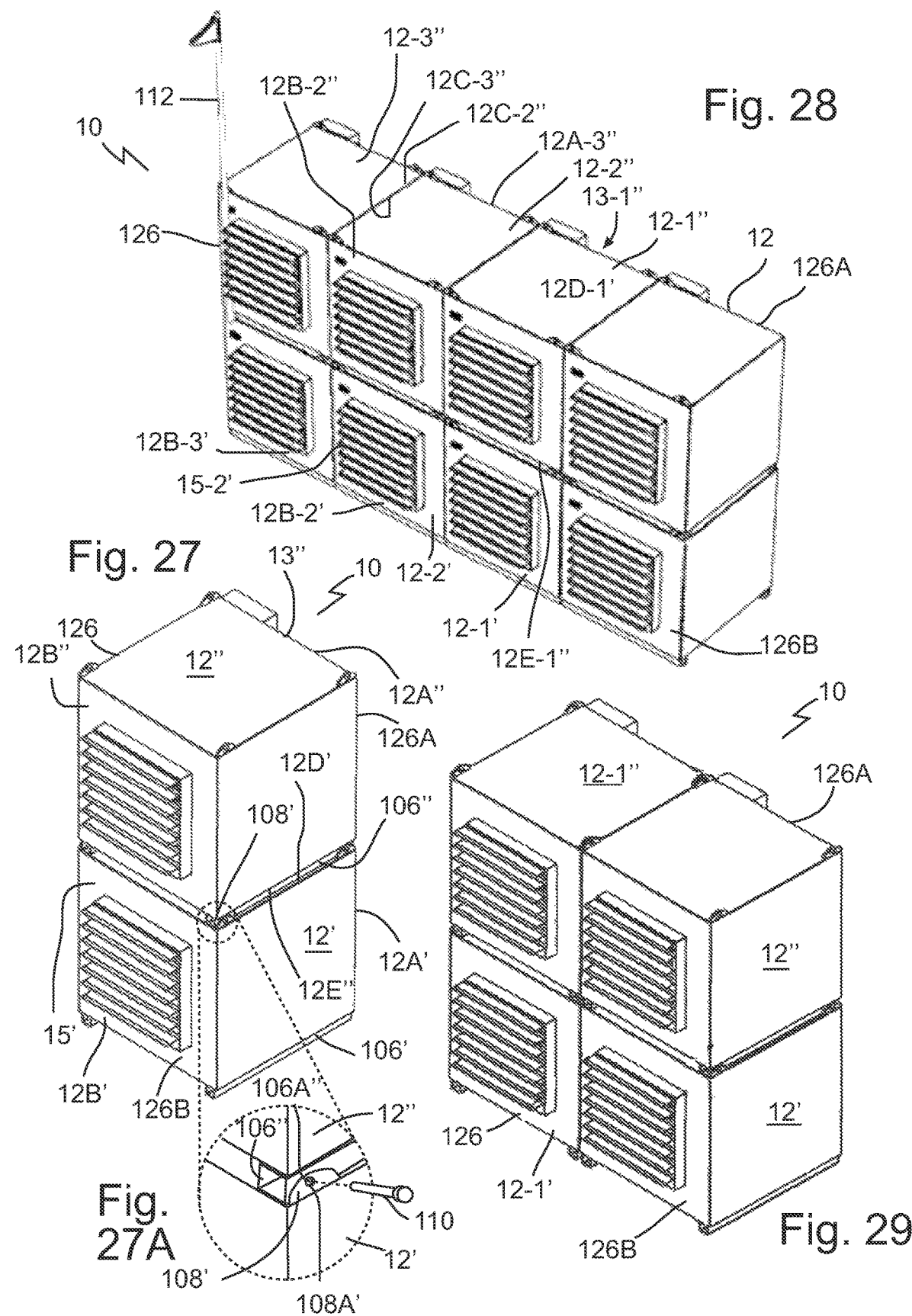

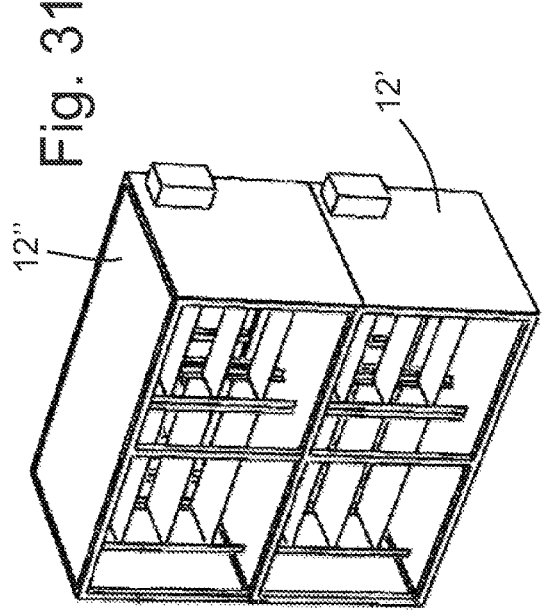
Fig. 31
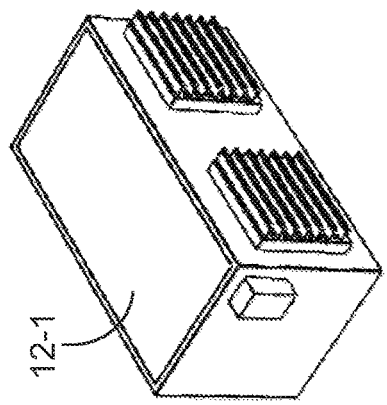
Fig. 33
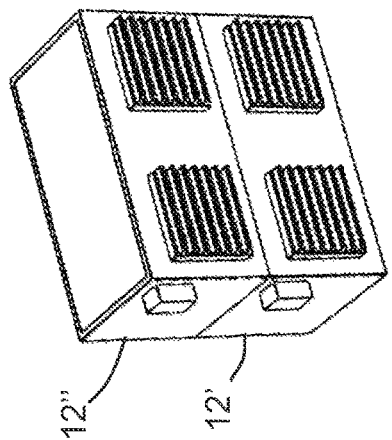
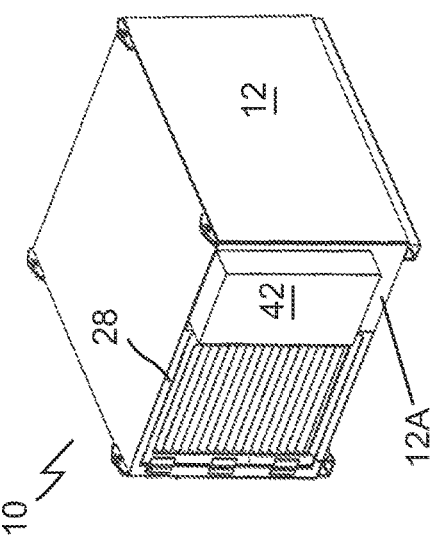
Fig. 30
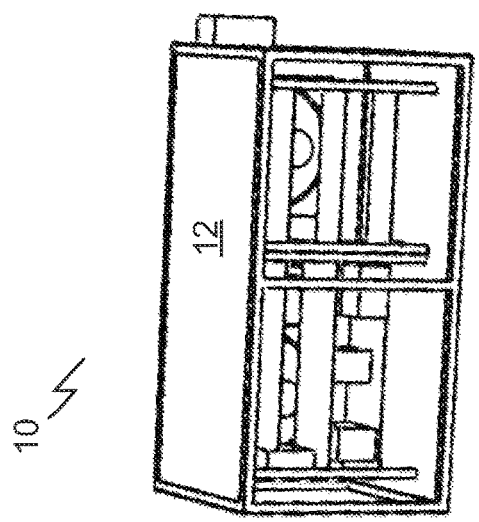
Fig. 32

PORTABLE BLOCKCHAIN MINING SYSTEM AND METHODS OF USE

TECHNICAL FIELD

This document relates to portable blockchain mining systems and methods of use.

BACKGROUND

Intermodal transport container units are known to be used to house plural cryptocurrency mining processors connected through the internet to verify cryptocurrency transactions. Such units consume enormous amounts of electricity and generate excessive heat as a result.

SUMMARY

A system is disclosed comprising a portable blockchain mining system and a power source connected to supply power to the portable blockchain mining system.

A portable blockchain mining system is disclosed comprising: a portable building; an engine; a plurality of blockchain mining processors; a generator connected to be driven by the engine and connected to power the plurality of blockchain mining processors; and a cooling fan oriented to draw air through the portable building to cool and maintain, in use, the engine and the plurality of blockchain mining processors within respective operating ranges of temperature.

A method is disclosed comprising operating an engine in a portable building to power a generator to power a plurality of blockchain mining processors in the portable building, while a cooling fan moves cooling air across the engine and the plurality of blockchain mining processors to maintain the engine and the plurality of blockchain mining processors within respective operating ranges of temperature.

A portable blockchain mining system is disclosed comprising: a portable building having side walls, a roof, and a floor, collectively defining an interior; an engine mounted to the floor of the portable building within the interior; an engine radiator mounted within the interior and connected to supply and return coolant to and from the engine; a plurality of blockchain mining processors mounted on a rack in a vertical stack within the interior adjacent an air inlet in a side wall of the portable building; one or more controllers connected to operate the plurality of blockchain mining processors; a generator mounted within the interior of the portable building and connected to be driven by the engine and connected to power the plurality of blockchain mining processors; and a cooling fan forming part of the engine radiator and mounted within the interior, the cooling fan oriented to draw air through the air inlet into the portable building, across the plurality of blockchain mining processors, across the radiator, and out the air outlet to cool and maintain, in use, the engine and the plurality of blockchain mining processors within respective operating ranges of temperature.

In some cases the engine may be sped up to generate more power & mutually or correspondingly increase the ASIC load (either by overclocking the computers or adding more computers) in response to more gas availability or when more power is desired and vice versa slowing both down.

A portable blockchain mining system is disclosed comprising: a portable blockchain mining module, having: a) a portable building having side walls, a base, and a roof, which collectively define an interior; b) an air inlet in a first of the side walls; c) an air outlet in a second of the side walls opposite to the first of the side walls; d) a plurality of blockchain mining processors within the interior; and one or both: e) a module mounting mechanism configured to permit respective portable blockchain mining modules that are identical to the portable blockchain mining module to be: stacked above and secured to the roof of the portable blockchain mining module; and stacked below and secured to the base of the portable blockchain mining module; and f) a third of the side walls and a fourth of the side walls, opposite to the third of the side walls with the third and the fourth of the side walls between the first and the second of the side walls, structured to permit respective portable blockchain mining modules that are identical to the portable blockchain mining module to be positioned in contact or close proximity adjacent the third of the side walls or the fourth of the side walls to form a horizontal row of portable blockchain mining modules.

A method is disclosed comprising operating a plurality of portable blockchain mining modules to process mining transactions, the plurality of portable blockchain mining modules being arranged to form a wall of portable blockchain mining modules, with each of the plurality of portable blockchain mining modules having a portable building that contains a plurality of blockchain mining processors and that defines an air inlet and an air outlet, the wall having one or more of: a vertical stack of two or more portable blockchain mining modules, with a base of one portable blockchain mining module secured to a roof of another portable blockchain mining module; and a horizontal row of two or more portable blockchain mining modules, with a side wall of one portable blockchain mining module positioned in contact or close proximity adjacent to a side wall of another portable blockchain mining module.

In various embodiments, there may be included any one or more of the following features: The air inlet is defined in a side wall of the portable building. Each blockchain mining processor has associated with it a processor fan, which is oriented to direct air from the air inlet laterally across the respective blockchain mining processor and toward a center of the interior of the portable building. At least 50%, for example at least 75% of a total external surface area of the side wall forms the air inlet. A roof of the portable building defines an air outlet or a roof air passage to the air outlet. A floor of the portable building defines the air inlet or a floor air passage to the air inlet. At least 50%, for example at least 75% of a total external surface area of the side wall forms the air inlet. The power source comprises: a source of combustible gas produced from an oil production, storage, or processing facility; and a generator connected to the source of combustible gas. The power source comprises a source of power from other than an oil or gas well, for example the power source comprises grid or other utility power. The blockchain mining processor has a network interface; the network interface is connected to receive and transmit data through the internet to a network that stores or has access to a blockchain database; and the mining processor is connected to the network interface and adapted to mine transactions into blocks associated with the blockchain database and to communicate with the blockchain database. The network is a peer to peer network; the blockchain database is a distributed database stored on plural nodes in the peer to peer network; and the blockchain database stores transactional information for a digital currency. A controller is connected to operate a ventilation, heating and cooling system to maintain the blockchain mining processor within a predetermined operating range of temperature. The blockchain mining system is mounted on a skid or trailer. The skid or trailer comprises a generator driven by an engine, which is connected to the source of combustible gas. The engine comprises a turbine. The generator and engine may be mounted integral to the skid, trailer, or blockchain mining system. Operating the blockchain mining system to: mine transactions with the blockchain mining system, for example by mining the most recent block on the blockchain with the blockchain mining system; and communicate wirelessly through the internet to communicate with a blockchain database. The network interfaces comprise one or more of a satellite, cellular, or radio antenna, connected to a modem. Successfully mining a block by a mining processor provides a reward of the digital currency, and the reward is assigned to a digital wallet or address stored on a computer readable medium. The system runs on polyphase (three phase) power or single-phase power. The engine, plurality of blockchain mining processors, and cooling fan are oriented in line with one another along an axis defined by the portable building. The plurality of blockchain mining processors are located upstream of the engine or an engine radiator connected to supply and return coolant to and from the engine, along a cooling air path defined by the portable building and the cooling fan. Components are ordered as follows along the cooling air path—the plurality of blockchain mining processors, the generator, the engine, the cooling fan, and the engine radiator connected to supply and return coolant to and from the engine. A radiator is mounted across a cooling air path defined by the portable building and the cooling fan, the engine connected to supply and return coolant to and from the engine. An engine radiator forms part of the engine, with the cooling fan forming part of the engine radiator, the engine radiator connected to supply and return coolant to and from the engine, and the engine radiator mounted across a cooling air path defined by the portable building and the cooling fan. One or more controllers for example connected to operate one or more of the plurality of blockchain mining processors, the engine, the generator, and the cooling fan. The one or more controllers are configured to modulate a speed of the engine to respectively modulate a current frequency and power created by the generator to respectively modulate a mining activity level of the plurality of blockchain mining processors. The one or more controllers are configured to modulate the speed of the engine in response to a production rate of a combustible gas that is connected to power the engine. The one or more controllers are configured to respectively modulate the mining activity by a) modulating a number of, or b) a current frequency of power sent to, active blockchain mining processors in the plurality of blockchain mining processors. A vent that is structured to regulate a flux of air flow moving through the portable building along the cooling air path across the plurality of blockchain mining processors. The cooling fan defines or is adjacent to an air inlet or air outlet in the portable building, and the vent is adjacent the air inlet or air outlet to, when open, recirculate air flow across the cooling fan through the air inlet or air outlet. The vent comprises adjustable louvers. The portable building has side walls, a roof, and a floor. The engine is mounted on the floor. External surfaces of the portable building define an air inlet and an air outlet along a cooling air path defined by the portable building and the cooling fan. The air inlet and the air outlet are defined by side walls of the portable building. The air inlet and the air outlet are defined by opposed end walls of the side walls. Louvers are at one or both the air inlet and air outlet. The plurality of blockchain mining processors are mounted on a rack in a vertical stack, adjacent the air inlet. The portable building comprises an intermodal transport container. The portable building has length, width, and height dimensions of each between three and nine feet. The portable building forms a ground engaging skid. The cooling fan is structured and oriented to provide sufficient cooling such that, in use, the plurality of blockchain mining processors do not require respective dedicated processor fans. The generator is structured to produce alternating current above 60 Hz, for example while the engine is running above 1800 RPM (revolutions per minute). The generator is structured to produce alternating current at or above 80 Hz, for example while the engine is running at or above 2400 RPM (revolutions per minute). The portable building encloses the engine, the generator, the cooling fan, and the plurality of blockchain mining processors; and the plurality of blockchain mining processors are located upstream of the engine or an engine radiator connected to supply and return coolant to and from the engine, along a cooling air path defined by the portable building and the cooling fan. Adjusting a vent to regulate a flux of air flow moving through the portable building along the cooling air path across the plurality of blockchain mining processors. The generator is operated to produce alternating current above 60 Hz to the plurality of blockchain mining processors, for example while the engine is running at or above 1800 RPM (revolutions per minute). The portable building is located at, and the engine is powered by a source of combustible gas produced at, a hydrocarbon production well, storage, or processing facility. Increasing a speed of the engine to increase one or both a current frequency and power generated by the generator to increase a mining activity level of the plurality of blockchain mining processors. Decreasing the speed of the engine to decrease one or both a current frequency and power generated by the generator to decrease a mining activity level of the plurality of blockchain mining processors. The speed of the engine is increased or decreased in response to a production rate of the combustible gas. The mining activity level is increased or decreased, respectively, by increasing or decreasing a) a number of, or b) a current frequency and power sent to, active blockchain mining processors in the plurality of blockchain mining processors. The module mounting mechanism comprises cooperating mounting parts on the roof and the base that cooperate to secure to cooperating mounting parts on the base or roof, respectively, of the respective portable blockchain mining modules that are identical to the portable blockchain mining module to permit the respective portable blockchain mining modules to be stacked above or below the portable blockchain mining module. The cooperating mounting parts comprise respective apertures that align during stacking to receive respective fasteners to secure vertically adjacent portable blockchain mining modules together. The cooperating mounting parts comprise mounting rails on the base of the portable blockchain mining module. The cooperating mounting parts comprise lifting lugs on the roof of the portable blockchain mining module. The cooperating mounting parts are accessible from one or both the first and the second of the side walls. At least 50%, for example at least 75% of a total external surface area of the first of the side walls forms the air inlet. At least 50%, for example at least 75% of a total external surface area of the second of the side walls forms the air outlet. An air filter across the air inlet. A cooling fan mounted within the interior and oriented to draw air from the air inlet to the air outlet across the plurality of blockchain mining processors. The plurality of blockchain mining processors are mounted on a rack within the interior in a vertical stack. The plurality of blockchain mining processors are connected to receive power from a power source external to the portable building. The portable blockchain mining module further comprises one or more of: a variable frequency drive (VFD); a power distribution unit; and a load controller configured to adjust operation of the plurality of blockchain mining processors depending on input power. The portable building is a cube. The portable building has length, width, and height dimensions of about four feet. The portable blockchain mining system is structured to permit respective portable blockchain mining modules that are identical to the portable blockchain mining module to be secured to a third and a fourth of the side walls, opposite one another and located between the first and second of the side walls, to form a horizontal row of portable blockchain mining modules. Two or more portable blockchain mining modules secured together to form a wall of portable blockchain mining modules. Two or more of the portable blockchain mining modules are stacked in a vertical stack one on top of the other and secured together using respective module mounting mechanisms. Two or more of the portable blockchain mining modules are arranged in a horizontal row and secured together using respective module mounting mechanisms. The portable blockchain mining modules are aligned such that the air inlets are located on a first side of the wall, and the air outlets are located on a second side of the wall. The portable blockchain mining modules are connected to receive power from a central power source. Before operating, stacking the plurality of portable blockchain mining modules in the vertical stack by securing the base of the first portable blockchain mining module to the roof of the second portable blockchain mining module. The wall has a horizontal row of two or more portable blockchain mining modules, with a side wall of one portable blockchain mining module secured to a side wall of another portable blockchain mining module.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 1-7 are front perspective (FIG. 1), top plan (FIG. 2), rear elevation (FIG. 3, radiator and cooling fan removed for illustration), side elevation (FIG. 4), front elevation (FIG. 5), opposite side elevation (FIG. 6), and base plan (FIG. 7) views of a skid-mounted engine and generator combination

FIGS. 9-10 are side elevation (FIG. 9) and front perspective (FIG. 10) views of a portable blockchain mining system that houses the engine/generator combination of FIG. 1.

FIG. 11 is a rear perspective view of the system of FIG. 9.

FIGS. 27-29 are rear perspective views of a wall comprising a plurality of portable blockchain mining modules arranged in various configurations, including a single vertical stack (FIG. 27), two rows of four modules stacked vertically on one another (FIG. 28), and two rows of two modules stacked vertically on one another (FIG. 29), with the air inlets and air outlets of each module oriented to form an inlet side and an outlet side of the wall of modules.

FIG. 27A is a close-up exploded view of cooperating module mounting parts mating with one another view a fastener to secure the stack together.

FIG. 30 is a front perspective view of a portable blockchain mining module with a wider base than a height.

FIGS. 31-33 are front perspective views of another embodiment of a portable blockchain mining module, in a vertical stack (FIG. 31) and a single module (FIG. 32), with the front access door removed for illustration.

FIG. 33 is a front perspective view of a plurality of the portable blockchain mining modules of FIG. 32 arranged in a vertical stack laterally adjacent a third module nearby.

DETAILED DESCRIPTION

Figure 1:
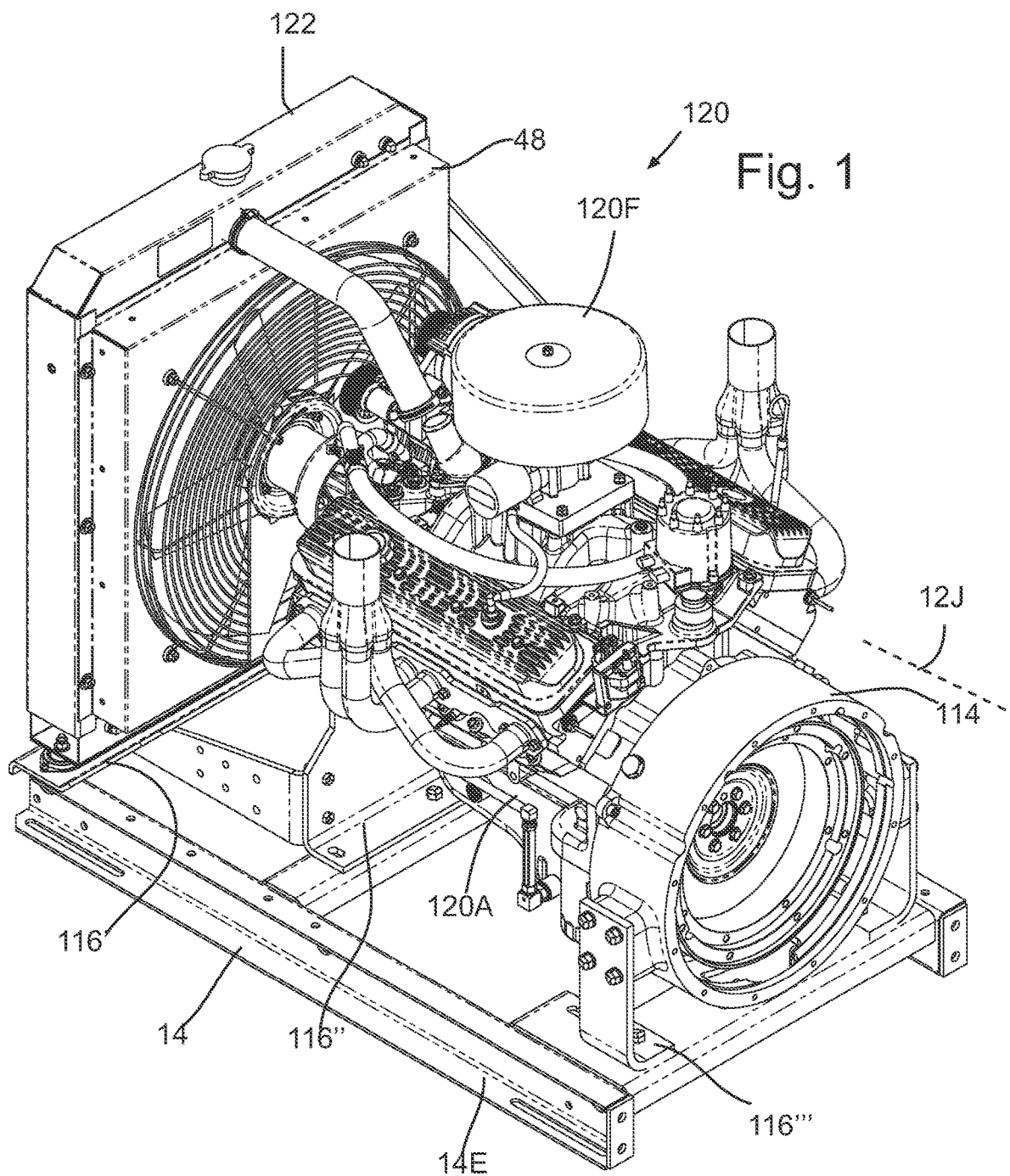

Immaterial modifications may be made to the embodiments described here without departing from what is covered by the claims.

A cryptocurrency (or crypto currency) is a digital asset designed to work as a medium of exchange that uses strong cryptography to secure financial transactions, control the creation of additional units, and verify the transfer of assets. Cryptocurrencies use decentralized control as opposed to centralized digital currency and central banking systems. The decentralized control of each cryptocurrency works through distributed ledger technology, typically a blockchain that serves as a public financial transaction database.

A blockchain is a form of database, which may be saved as a distributed ledger in a network of nodes that maintains a continuously growing list of records called blocks. Each block contains a timestamp and a link to a previous block. The data in a block cannot be altered retrospectively without significant computational effort and majority consensus of the network. The first blockchain was conceptualized by Satoshi Nakamoto in 2008 and implemented the following year as a core component of the digital currency Bitcoin, where it serves as the public ledger for all transactions. Through the use of a peer-to-peer network and a distributed timestamping server, a blockchain database is managed autonomously. The administration of Bitcoin currency is currently the primary use for blockchain technology, but there are other use cases for blockchain technology to maintain accurate, tamper-proof databases. Examples include maintaining records of land titles and historical events. While the potential in blockchain technology is vast, Bitcoin remains the most widely used today.

By design blockchains are inherently resistant (and assumed to be effectively impervious) to modification of the data—once recorded, the data in a block cannot be altered retroactively without network consensus. Blockchains are an open, distributed ledger that can record transactions between two parties efficiently and in a verifiable and permanent way. The ledger itself can also be programmed to trigger transactions automatically. Blockchains are secure by design and an example of a distributed computing system with high byzantine fault tolerance. Decentralized consensus can therefore be achieved with a blockchain. This makes the blockchain model suitable for the recording of events, medical records, and other records management activities, identity management, transaction processing and proving provenance. This offers the potential of mass disintermediation and vast repercussions for how global trade is conducted.

A blockchain facilitates secure online transactions. A blockchain is a decentralized digital ledger that records transactions on thousands of computers globally in such a way that the registered transactions cannot be altered retrospectively. This allows the participants to verify and audit transactions in an inexpensive manner. Transactions are authenticated by mass collaboration powered by collective self-interests. The result is a robust workflow where participants' uncertainty regarding data security is marginal. The use of a blockchain removes the characteristic of infinite reproducibility from a digital asset. It confirms that each unit of digital cash was spent only once, solving the long-standing problem of double spending. Blockchains have been described as a value-exchange protocol. This exchange of value can be completed more quickly, more safely and more cheaply with a blockchain. A blockchain can assign title rights because it provides a record that compels offer and acceptance. From the technical point of view a blockchain is a hash chain inside another hash chain.

A blockchain database may comprise two kinds of records: transactions and blocks. Blocks may hold batches of valid transactions that are hashed and encoded into a Merkle tree. Each block may include the hash of the prior block in the blockchain, linking the two. Variants of this format were used previously, for example in Git, and may not by itself be sufficient to qualify as a blockchain. The linked blocks form a chain. This iterative process confirms the integrity of the previous block, all the way back to the original genesis block. Some blockchains create a new block as frequently as every five or fewer seconds. As blockchains age they are said to grow in height. Blocks are structured by division into layers.

Sometimes separate blocks may be validated concurrently, creating a temporary fork. In addition to a secure hash-based history, each blockchain has a specified algorithm for scoring different versions of the history so that one with a higher value can be selected over others. Blocks that are not selected for inclusion in the chain are called orphan blocks. Peers supporting the database don't have exactly the same version of the history at all times, rather they keep the highest scoring version of the database that they currently know of. Whenever a peer receives a higher scoring version (usually the old version with a single new block added) they extend or overwrite their own database and retransmit the improvement to their peers. There is never an absolute guarantee that any particular entry will remain in the best version of the history forever, but because blockchains are typically built to add the score of new blocks onto old blocks and there are incentives to only work on extending with new blocks rather than overwriting old blocks, the probability of an entry becoming superseded goes down exponentially as more blocks are built on top of it, eventually becoming very low. For example, in a blockchain using the proof-of-work system, the chain with the most cumulative proof-of-work is always considered the valid one by the network. In practice there are a number of methods that can demonstrate a sufficient level of computation. Within a blockchain the computation is carried out redundantly rather than in the traditional segregated and parallel manner.

Maintaining a blockchain database is referred to as mining, which refers to the distributed computational review process performed on each block of data in a block-chain. This allows for achievement of consensus in an environment where neither party knows or trusts each other. Those engaged in Bitcoin mining are rewarded for their effort with newly created Bitcoins and transaction fees, which may be transferred to a digital wallet of a user upon completion of a designated task. Bitcoin miners may be located anywhere globally and may be operated by anyone. The mining hardware is tied to the blockchain network via an internet connection. Thus, little infrastructure is needed to operate and contribute to the system. All that is required to become a Bitcoin miner is the appropriate computer hardware, an internet connection and low-cost electricity. The cheaper the electricity the more reward the miner will receive relative to competition, other miners.

Mining also includes the process of adding transaction records to Bitcoin's public ledger of past transactions. This ledger of past transactions is referred to as the blockchain as it is essentially a chain of blocks. The blockchain serves to confirm transactions to the rest of the network as having taken place. Bitcoin nodes use the blockchain to distinguish legitimate Bitcoin transactions from attempts to re-spend coins that have already been spent elsewhere Mining may be intentionally designed to be resource-intensive and difficult so that the number of blocks found each day by miners remains steady. Individual blocks may be required to contain a proof-of-work to be considered valid. This proof-of-work is verified by other Bitcoin nodes each time they receive a block. Bitcoin presently uses the hash cash proof-of-work function.

One purpose of mining is to allow Bitcoin nodes to reach a secure, tamper-resistant consensus. Mining may also be the mechanism used to introduce Bitcoins into the system: Miners are paid any transaction fees as well as a subsidy of newly created coins. This both serves the purpose of disseminating new coins in a decentralized manner as well as motivating people to provide security for the system. Bitcoin mining is so called because it resembles the mining of other commodities: it requires exertion and it slowly makes new currency available at a rate that resembles the rate at which commodities like gold are mined from the ground.

Mining requires computational effort in the form of CPU cycles (CPU=central processing unit or central processor) to run a cryptographic hashing algorithm associated with the particular blockchain protocol. For a given mining processor, one can modify the computational effort through changing the core voltage or the clock rate of the processor. Doing so may result in more or less power consumed by the mining processor, and in some embodiments within this document such changes are described as changing the mining activity, or hash rate.

As the total network computational effort (or hash rate) increases on a blockchain over time, the probability for an individual miner to find a block and receive a reward diminishes. Today the Bitcoin network is so large that most individuals engaged in mining Bitcoin typically mine in pools using protocols such as the Stratum Mining Protocol. Pooling resources allows individual miners to increase their reward frequency as a trade-off for splitting the block reward with the rest of the pool. Miners who are pool mining do not need the associated equipment needed to run a mining node as they only need compute and submit proof-of-work shares issued by the mining pool.

Since the energy cost of running blockchain mining equipment is its primary operating cost, a trend towards mining on low-cost hydroelectric power has become prevalent. This trend has promoted the centralization of blockchain miners in specific countries with abundant hydroelectric power, as miners who do not have access to cheap hydroelectricity cannot mine profitably because they are competing with the miners who do have access. Bitcoin mining centralization has been occurring in China where there is abundant low-cost hydroelectric power. Centralization in blockchain mining is undesirable because the premise behind the blockchain innovation is not to have to trust a third party and to have inherent confidence and security through a decentralized, distributed network. Thus, there exists a need to further decentralize Bitcoin and other blockchain mining through a more decentralized source of low-cost power.

An intermodal transport container is a large standardized shipping container, designed and built for intermodal freight transport, meaning these containers can be used across different modes of transport—from ship to rail to truck—without unloading and reloading their cargo. Intermodal containers are primarily used to store and transport materials and products efficiently and securely in the global containerized intermodal freight transport system, but smaller numbers are in regional use as well. These containers are known under a number of names, such as simply container, cargo or freight container, ISO container, shipping, sea or ocean container, sea van or (Conex) box, sea can or C can.

Intermodal transport containers exist in many types and a number of standardized sizes, but ninety percent of the global container fleet are so-called "dry freight" or "general purpose" containers, durable closed steel boxes, mostly of either twenty or forty feet standard length, although other lengths may be used. In some cases, transport containers have a range of lengths from eight to sixty feet. Common heights are eight feet six inches and nine feet six inches, with the latter often referred to as High Cube or Hi-Cube containers, although other heights may be used. Common widths are eight feet, although other widths may be used such as six foot three inches, eight foot six inches, or larger or smaller. Transport containers are a means to bundle cargo and goods into larger, unitized loads, that can be easily handled, moved, and stacked, and that will pack tightly in a ship or yard. Intermodal containers share a number of key construction features to withstand the stresses of intermodal shipping, to facilitate their handling and to allow stacking, as well as being identifiable through their individual, unique ISO 6346 reporting mark.

Transport containers may be transferred between rail, truck, and ship by container cranes at container terminals. Forklifts, reach stackers, straddle carriers, and cranes may be used to load and unload trucks or trains outside of container terminals. Swap bodies, side lifters, tilt deck trucks, and hook trucks may allow transfer to and from trucks with no extra equipment. ISO-standard containers can be handled and lifted in a variety of ways by their corner fixtures, but the structure and strength of forty five-foot (type E) containers limits their tolerance of side-lifting, nor can they be forklifted, based on ISO 3874 (1997).

Transport containers can be transported by container ship, truck and freight trains as part of a single journey without unpacking. Transport containers often include corrugated walls for strength. Each corner of the container may include a twist lock fitting or other fitting for securing the container to other containers and to various transportation devices such as a container trailer for a road-based tractor unit. Reinforcing beams may span the edges of the container, for example the vertical columns that make up the four corners between sidewalls, and the horizontal beams that make up the longitudinal and lateral side edges of the base of the container.

Half the containers that enter the United States are believed to leave empty. The value of such containers in the U.S. is thus lower than in China, and such containers are thus available for use with non-freight-related purposes. For example, the U.S. military often used its Conex containers as on-site storage, or easily transportable housing for command staff and medical clinics. Repurposing used shipping containers offers a practical solution to both social and ecological problems.

A transport container may be used to provide a modular data center system, which is a portable method of deploying data center capacity at a remote location. A modular data center may be placed anywhere data capacity is needed. A modular data center system may include purpose-engineered modules and components to offer scalable data center capacity with multiple power and cooling options. Modules may be shipped to be added, integrated or retrofitted into an existing data center or combined into a system of modules. Modular data centers typically consist of standardized components. A modular data center may fit data center equipment (servers, storage and networking equipment) into a standard shipping container, which is then transported to a desired location. A containerized data center may come outfitted with its own cooling system.

Referring to FIGS. 1-16 and FIG. 18, a portable blockchain mining system 10 is disclosed, comprising a portable building, such as a transport container 12, an air inlet 13, an air outlet 15. A cooling fan 48 or fans may be provided. The portable building/portable system 10 may be a self-contained unit that can be moved by truck, trailer, railcar, forklift, container lifter, or other suitable method of lifting an intermodal shipping container, and placed on a ground surface at a suitable remote location, with the ability to operate fully self-contained or only requiring a source of power to be connected (although other connections may be made such as connections to internet lines, utility lines, and others). Referring to FIG. 16, system 10, a plurality of mounts (such as racks 26) suitable for blockchain mining processors 72 may be structured within interior 12F. In some embodiments the racks 26 or other mounts are vacant, and in some cases a plurality of processors 72 may themselves be mounted within an interior 12F of the transport container 12. The transport container 12 may have a front end wall 12A, a rear end wall 12B, side walls 12C, a roof 12D, and a base 12E, which may collectively define interior 12F. The container 12/building may create an air tight seal, meaning that the only air flow through the building or container is through the intake and outlet. For example, air flow may flow from the intake, radiator exhaust or from the adjustable recirculating louver/vent. In this document, the suffixes ' and " may be appended to reference characters to indicate that there are more than one of the respective part, for example there are two side walls 12C' and 12C" (FIG. 12), and it should be understood that a reference to a part name without the suffix in one of the description or drawings may refer to a part name with the respective suffix in the other of the description or drawings. The air inlet 13 and air outlet 15 may be defined in the transport container 12. For example inlet 13 may be defined by side walls 12C, and the outlet 15 may be defined by roof 12D. Referring to FIG. 16, the cooling fan 48 may be connected to convey air through the air inlet 13 (for example into interior 12F), across the plurality of blockchain mining processors 72 and out the air outlet 15. The air outlet 15 may be defined above the air inlet 13 (when the base 12E is resting on a horizontal ground surface as shown) and oriented to direct exhaust air in an upward direction out of the transport container 12.

Referring to FIGS. 9-16, the container 12 may be formed by a structural frame 14. Frame 14 may have a front end wall, a rear end wall, side walls, a roof, and a base (floor), which may collectively define interior 12F of container 12. References to characteristics of frame walls, roofs, or bases (floors) may be applicable to the other of side and end walls 12A-C, roof 12D, and base 12E, respectively. The frame 14 may be formed by a network of beams and columns, for example horizontal beams and vertical columns as shown. Beams and columns may support a suitable cladding, such as doors, metal gratings (such as steel grating panels discussed further below) and panels (such as corrugated rear end panels) that may collectively define the exterior 12G of the container 12. Columns and beams may be formed by suitable structural components, such as metal planks, box-beams, I-beams, angle-beams, or C-beams, made of sufficient rigidity and strength to support the frame 14 and parts mounted thereon in use.

The transport container 12 may be an intermodal transport container, or may be a modified intermodal transport container, or may have the dimensions of an intermodal transport container. Referring to FIGS. 9-16 and 18, container 12 may provide a suitable mechanism to access the interior of the container 12. Container 12 may mount a door or doors 28. Doors 28 secure open rear end 12A to selectively permit or restrict access to the interior 12F. Doors 28 may include a suitable lock 30 (FIG. 9) to secure the interior 12F from unwanted intrusion. Other surfaces, such as end wall 12B may themselves form part of the cladding envelope of the container (such as if end wall 12B was one of the corrugated steel walls of a transport container as shown) or be covered by cladding panels.

Referring to FIGS. 12-14 and 16, suitable racks 26 or other mounts may be provided to mount processors 72 (FIG. 16) within interior 12F of container 12. In the example shown one or more racks 26 may be used to mount the processors 72. Each rack 26 may have a suitable structural frame, for example made of shelves 26A and columns. Beams (not shown) may be used for each rack 26. Suitable computing infrastructure may be provided, such as power distribution units (PDUs) 70 that may be used to bus cabling between electrical and network equipment. Processors 72 may be mounted in a suitable fashion, such as fastened by fasteners to racks 26, or may rest by gravity upon shelves 26A. Shelves 26A and other processor mounts may be stacked horizontally and vertically to efficiently populate the interior 12F of container 12, for example shelves 26A may run substantially or entirely from end 12A to end wall 12B (FIG. 9), and from floor 14E to roof 12D (FIG. 16).

Referring to FIGS. 12-14 and 16, processors 72 may be arranged in a suitable fashion within interior 12F. A plurality of blockchain mining processors 72 may be mounted adjacent a first wall, such as side wall 12C'. Processors 72 in each rack 26 may be mounted in a suitable series of rows, such as a vertical stack of plural rows each a single processor 72 deep laterally between aisle 34 and respective wall 12C. Racks 26 may be designed to maximize air flow laterally across each shelf 26A for maximum cooling of each processor 72.

Figure 5:
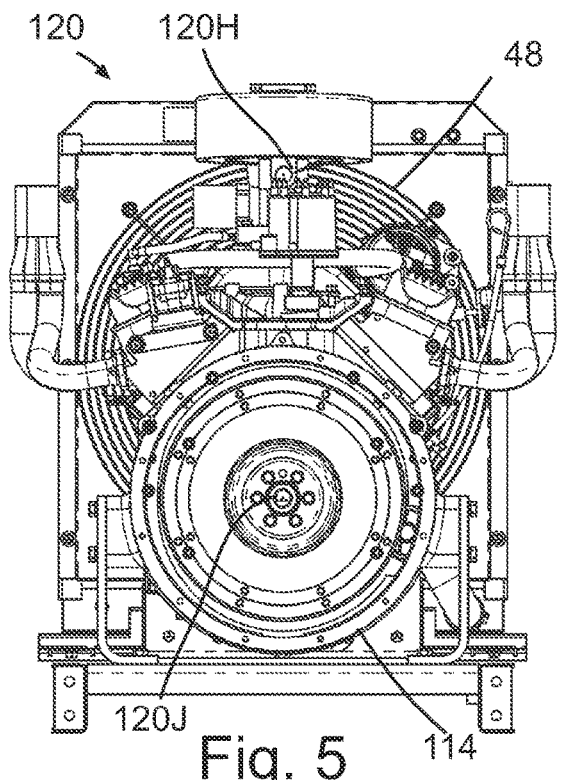
Figure 6:
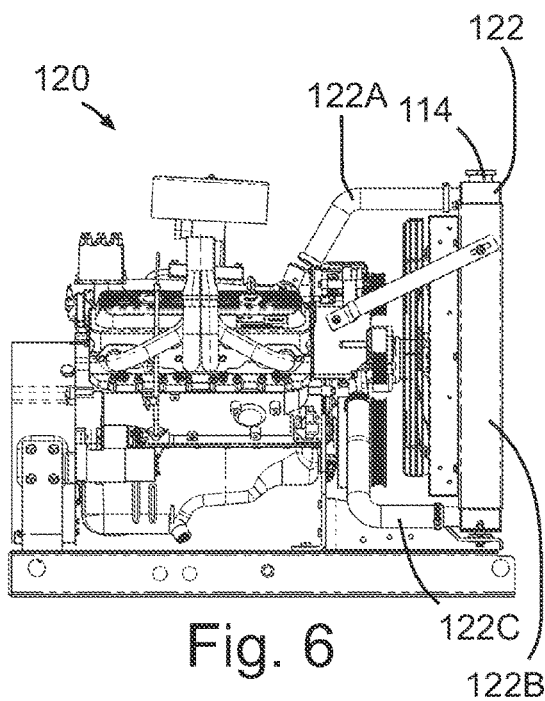
Figure 7:
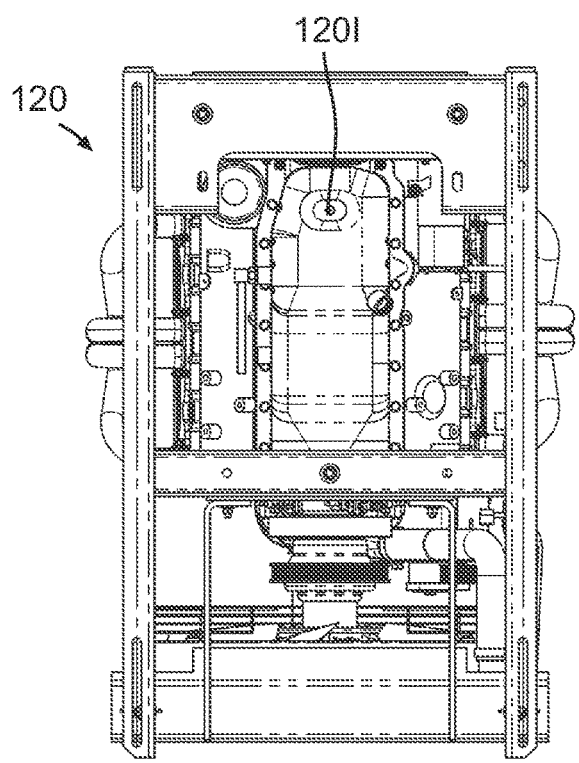
Figure 8:
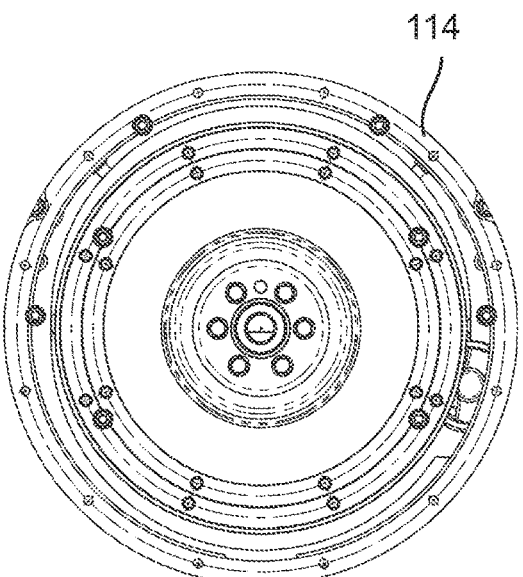
FIG. 8 is an end elevation view of a generator used in the combination of FIG. 1.

Referring to FIGS. 1-16, an embodiment of a portable blockchain mining system 10 is illustrated. System 10 may comprise a structure frame (for example a portable building such as a transport container 12), an engine 120, a plurality of blockchain mining processors 72 or mounts thereof, a generator 114 (FIGS. 5-6 and 8), and a cooling fan 48 (FIG. 5). The structural frame 14 of the building may form a ground engaging skid, for example having ground engaging elements such as rails and beams as shown, and in other cases wheels or tracks. The skid may be structured to be moved by tractor trailer, rail car, crane, picker, or other intermodal transport. The generator 114 may be connected to be driven by the engine 120, for example in the case of a genset. The generator 114 may be connected to power the plurality of blockchain mining processors 72. The cooling fan 48 may be oriented to draw air through the container 12 to cool and maintain, in use, both the engine 120 and the plurality of blockchain mining processors 72 within respective operating ranges of temperature. Referring to FIGS. 1, 4, 11, 16, and 18, a radiator, such as an engine radiator 122 may be mounted across a cooling air path (container end to end axis 12J) defined by the portable building and the cooling fan 48, for example extending from an air inlet 13 to an air outlet 15. The engine 120 may be connected to supply and return coolant to and from the engine 120, for example using supply and return lines 122A and 122C, respectively. More generally, the engine radiator 122 may form part of the engine 120, with the cooling fan 48 forming part of the engine radiator 122. The cooling fan 48 may be structured and oriented to provide sufficient cooling such that, in use, the plurality of blockchain mining processors 72 do not require respective dedicated processor fans 74 (see FIGS. 19 and 34-35 and the discussion above regarding processor fans 74). In use, the engine 120 may be operated to power the generator 114 to power processors 72 while the cooling fan 48 moves a sufficient flux of cooling air across the engine 120 and processors 72 to maintain the engine 120 and the processors 72 within each unit's respective operating range of temperature. Components in container 12 may be in relatively close proximity, such that the fan and mining processors are adjacent the engine.

Referring to FIGS. 9-16 the system 10 may have a suitable structural frame 14, for example a portable building (container 12). The building may have side walls 12A-C, a roof 12D, and a floor or base 12E. The container 12 may form an intermodal transport container. The container 12 may have suitable dimensions, for example the portable building may have a length, a width, and a height dimension of each between three and nine feet. Other dimensions larger or smaller may be used. Container 12 may have any of the features disclosed elsewhere in this document. The processors 72 may be mounted on a rack 26, for example in a vertical stack on shelves 26A or another suitable framework. Processors 72 may be located adjacent an air inlet 13. Various or all of the components may be mounted to the building, for example mounted within an interior 12F of the container 12. Referring to FIG. 16, for example, engine 120 and generator 114 may be mounted on the base 12E, using one or more mounts 116. Rack 26 may be mounted to walls 12C, for example by shelves 26A extending between and spanning opposing side walls 12C. Cooling fan 48 may be mounted directly or indirectly to wall 12B, for example adjacent air outlet 15. Referring to FIGS. 9-16, one or more doors 28 may be provided to permit access to interior 12F. Doors 28 may be mounted in a suitable fashion such as via hinge, rails, or other mechanisms, with or without handles and locks.

Figure 18:
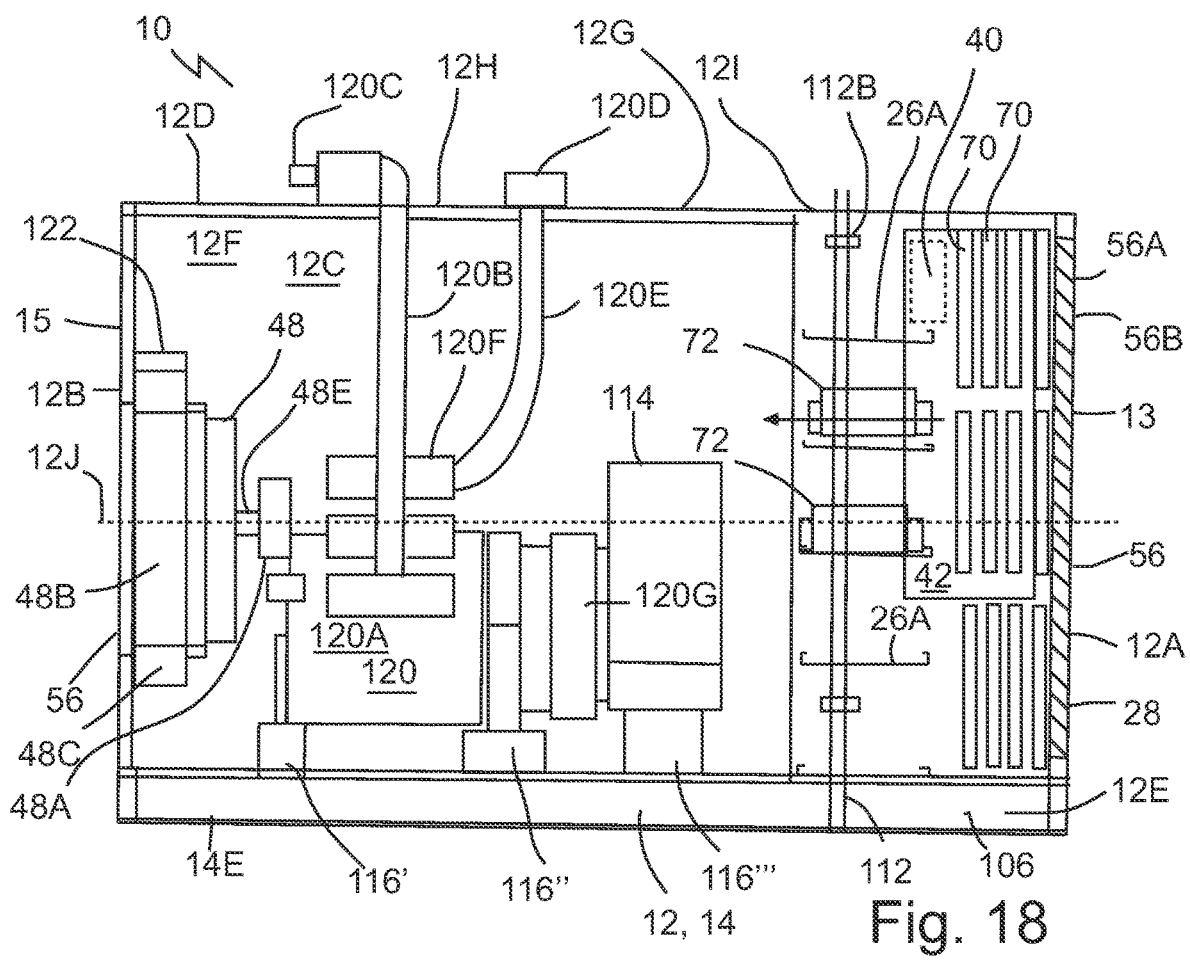
FIG. 18 is a cross-sectional view of the embodiment of FIG. 17 of the portable blockchain mining system showing the interior components.

Referring to FIGS. 11, 16, and 18, components may be arranged in a suitable fashion along the cooling air path or axis 12J. The plurality of blockchain mining processors 72 may be located upstream of the engine 120, the radiator 122, or the engine 120 and radiator 122, along axis 12J. Thus, the cooling fan may be oriented to draw air through the structural frame in a direction from the plurality of blockchain mining processors to the engine. Components may be ordered as follows along axis 12J—inlet 13, the plurality of blockchain mining processors 72, the generator 114, the engine 120, the cooling fan 48, radiator 122, and outlet 15. Referring to FIGS. 1 and 16, one or both of engine 120 and generator 114 may be located on the cooling air path, for example as shown where generator 114 and engine 120 are ordered as such between processors 72 and fan 48. Various or all of the components within interior 12F may be oriented in line with one another, for example engine 120, plurality of blockchain mining processors 72, and cooling fan 48 may be oriented in line with one another, along an axis 12J. In other cases, the cooling air path may take a circuitous or non-linear path, for example if ducting or redirection is used when channeling air from an exterior of the container 12 into the interior 12F and along the cooling air path. The engine 120 and generator 114 need not be on the cooling air path or exposed to flowing air through the system, although it may be efficient to dispose such components along the cooling air path.

Figure 12:
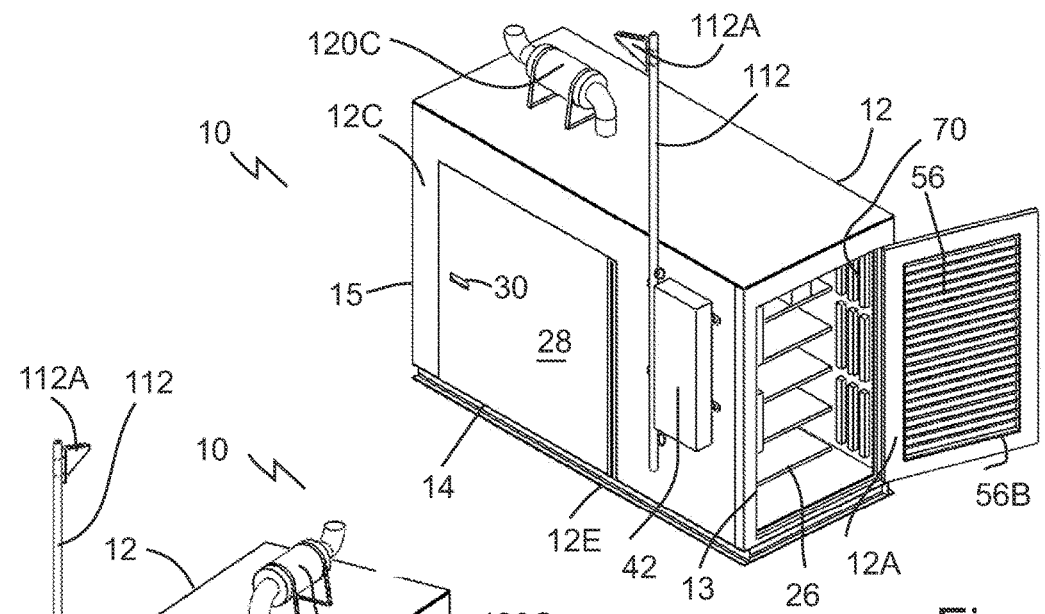
FIG. 12 is a front perspective view of the system of FIG. 9 with the access door open to reveal the interior components of the system.
Figure 13:
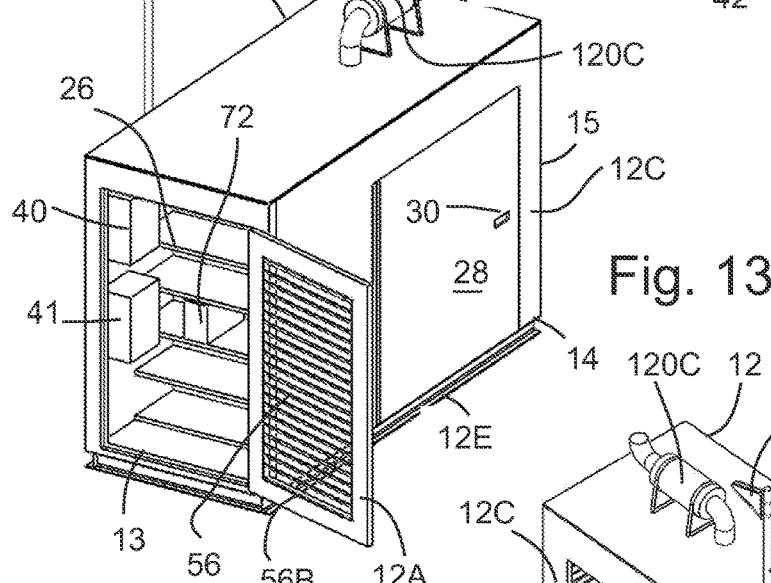
FIG. 13 is a front perspective view of the system of FIG. 9 with the access door open to reveal the interior components of the system.

Referring to FIGS. 9-16, the air inlet 13 and air outlet 15 may be defined by the building (for example container 12) in a suitable fashion. External surfaces of the container 12 may define the air inlet 13 and air outlet 15 along a cooling air path (axis 12J in the example shown). The air inlet 13 and the air outlet 15, or one of them, may be defined by side walls of the portable building, for example opposed side walls, for further example opposed end walls 12A and 12B. Louvers, such as located on a louver panel 56, may be located at one or both the air inlet 13 and air outlet 15, in this case the air inlet 13. The louvers may or may not be adjustable, and may include screens, filters, and other components as described elsewhere in this document. Referring to FIGS. 12 and 16, one or both the inlet 13 and outlet 15 may be defined on more than just one part of the container 12, for example, inlet 13 may incorporate louvers 56B on a louver panel 56, as well as slits (or other apertures) in portions of side walls 12C to improve air flow. In the example shown at least 50%, for example at least 75%, for example 100%, of a total external surface area of the end wall 12A defines the air inlet 13.

Referring to FIGS. 1-8, the engine 120 and generator 114 may have suitable characteristics. The engine 120, which may be an internal combustion engine, such as a two or four stroke engine, may operate on a suitable fuel such as natural gas, propane, gasoline, diesel, or other forms of fuel. The engine 120 may have an engine block 120A, and a suitable exhaust or exhausts 120B. Referring to FIG. 16, the engine 120 may have suitable structure for intake and exhaust gases. In the example shown the exhaust 120B extends as a conduit through roof 12D of container 12, discharging heated exhausts gases from an exterior outlet 120C. The engine 120 may have a suitable air intake, such as an intake 120E, for example in the form of a conduit as shown, extending through roof 12D of container 12 from an exterior inlet 120E. The inlet 120E may be sufficiently spaced from outlet 120C to avoid recirculation of exhaust gases. In some cases, intake air may come from cooling air flow through the interior 12F. In some cases, exhaust gas may be expelled within the interior 12F, for example into the cooling air path downstream of the processors 72 and carried out of container 12 via the outlet 15. Referring to FIGS. 1-8, one or more other suitable parts may be present such as an air filter 120F, a bell housing flywheel 120F, fuel inlet 120H, oil drain 120I, and crank 120J. The engine 120, radiator 122, generator 114, and fan 48 may be mounted on a sub frame, such as a metal pallet base as shown. A removable panel (not shown) may be provided in wall 12B to permit access to radiator 122 and fan 48. The radiator 122 may have a suitable heat exchanger 122B, such as a network of fluid piping disposed across the cooling air path for maximizing heat exchange from the relatively warm coolant fluids flowing within the exchanger 122B to the relatively cooler air flowing from inlet 13 to outlet 15. A port 122D may be provided to top up radiator fluids or to provide a radiator pressure cap.

Referring to FIG. 16, in some cases the engine 120 and generator 114 may be oversped to output relatively higher power. A conventional genset will output alternating current (A/C) power at a constant 60 Hz. In some cases, the engine 120 may only be powering the datacenter, thus permitting such to be oversped to a relatively higher revolutions per minute (RPM)/frequency to output more power. The datacenter may be configured to be able to handle a relatively higher frequency of power since the generator 114 may not be feeding into a 60 Hz system or running other components that require 60 Hz power. The generator 114 may thus be structured to produce alternating current above 60 Hz, for example at or above 80 Hz. To provide power at 60 Hz or 80 Hz the engine 120 may run at or above 1800 RPM (revolutions per minute) or 2400 RPM, respectively. Alternating current power above 60 Hz may be provided to the plurality of blockchain mining processors. By running the processors 72 with relatively higher power, computational power of processors 72 may be increased, leading to a relatively greater hash rate or operating power as measured by other suitable metrics.

Referring to FIG. 16, during use the system 10 may be operated to power processors 72 in a suitable fashion. One or more controllers 40 may be provided to operate the processors 72. The portable building may be located at, and the engine connected to be powered by a source of combustible gas produced at, a hydrocarbon production well 124, or at a hydrocarbon storage or processing facility. Fuel enters the engine 120, along with air from intake 120E, into the engine block 120A where combustion occurs to drive flywheel 120G and turn generator 114. Generator 114 in turn provides power to one or more processors 72, arrayed in a vertical stack across incoming air flow from air inlet 13. The generator 114 also powers cooling fan 48 to draw air into the building through louvers 56B at air inlet 13. The incoming cool air from the exterior of the container 12 passes over processors 72, maintaining the processors 72 within a suitable range of operating temperature, and in some cases obviating any need for dedicated processor fans. The one or more controllers 40 may be connected to operate the cooling fan, for example in response to operating temperatures detected at the plurality of blockchain mining processors, with the cooling fan speed and/or air flux through the building being modulated to maintain the range of operating temperature for each processor 72. The incoming air then passes over generator 114 and engine 120, where nominal or substantial heat exchange occurs. The fan 48 then draws such incoming air across radiator 122, absorbing heat from coolant cycling through engine 120, thus cooling the engine 120 to within a suitable range of operating temperature. Air is then expelled from the container 12 via outlet 15.

Figure 19:
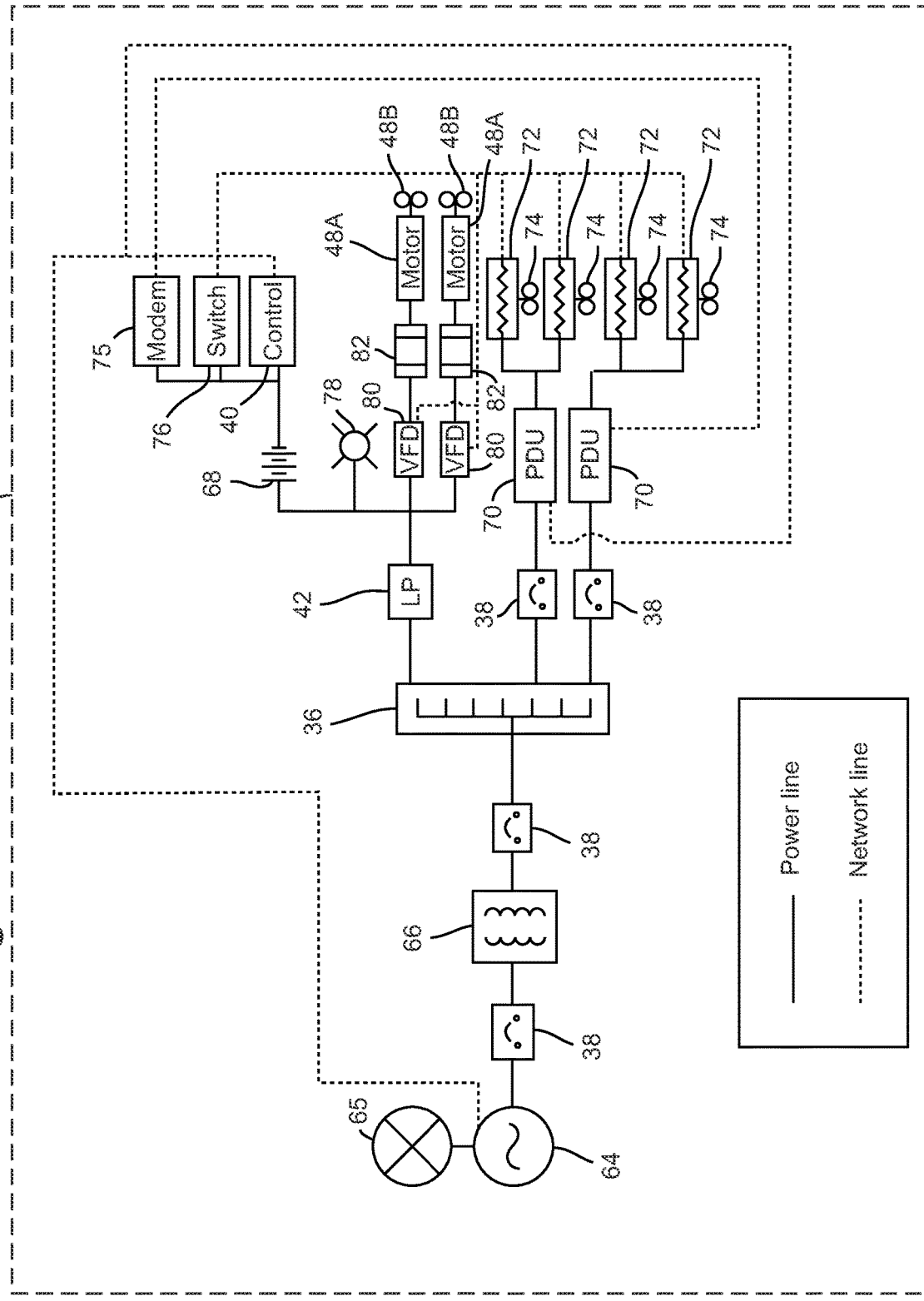
FIG. 19 is a schematic of electrical and network components of a portable blockchain mining system.
Figure 19A:
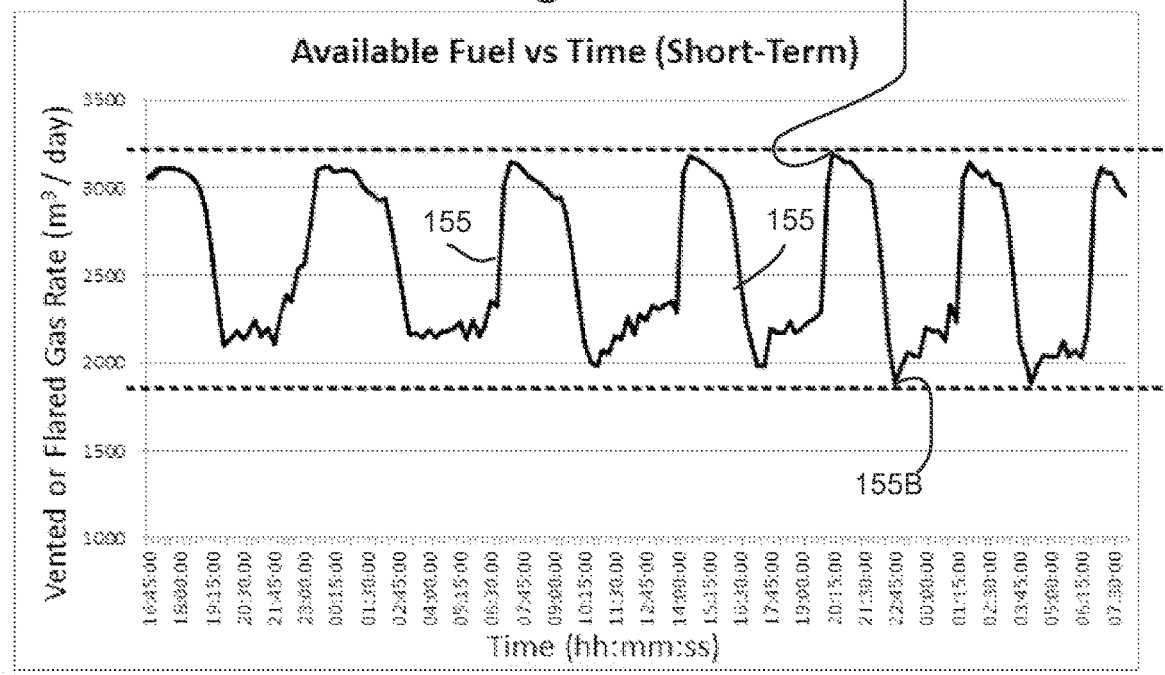
FIG. 19A is a graph that illustrates short-term changes in available natural gas produced over time by an oil production, storage, or processing facility.
Figure 19B:
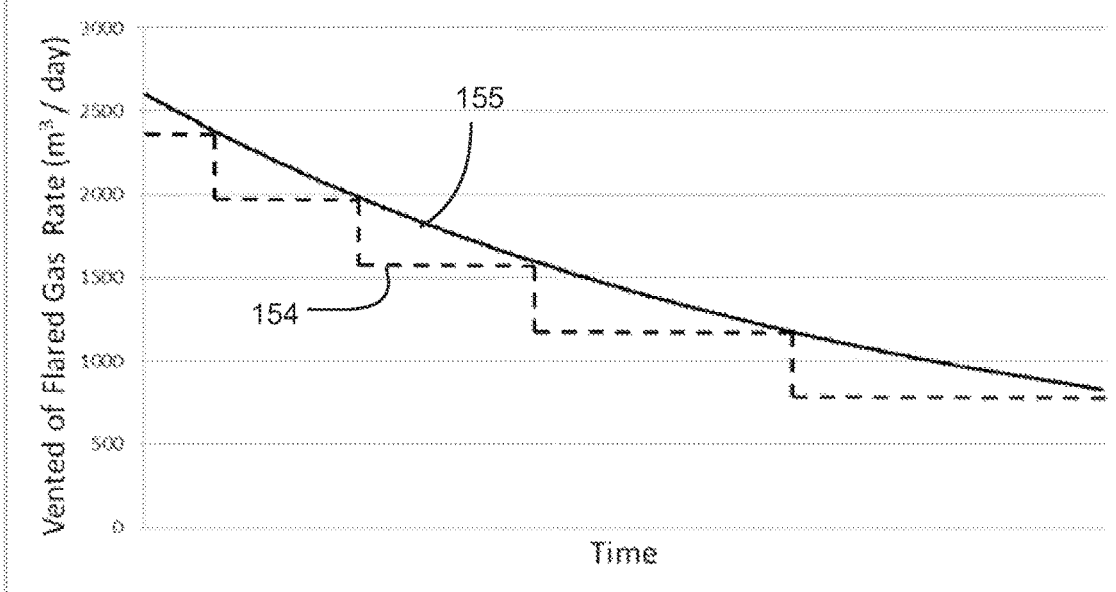
FIG. 19B is a graph that illustrates long-term changes in available natural gas produced over time by an oil production, storage, or processing facility.

Referring to FIGS. 16 and 19A-B, processor load control may be carried out dependent on incoming fuel, for example to cycle up or down when gas supply (production rate 155) is higher or lower, respectively, depending on gas production and equipment needs at the site. In the graphs of FIGS. 19A-B a production rate 155 of combustible natural gas at a well site is shown. In a typical well, natural gas production may vary between a daily maximum 155A and a daily minimum 155B. Gas production rates 155 may decline over time as a reservoir is depleted. Referring to FIGS. 16 and 19A-B load control may be carried out using the one or more controllers 40 to modulate operation of the engine 120 and hence the generator 114, and further the processors 72. Processors 72 may be operated to mine transactions with a blockchain, for example by mining the most recent block on the blockchain with the blockchain mining system. The one or more controllers 40 may be configured to modulate (increase or decrease) a speed of the engine 120 to respectively modulate (increase or decrease) a current frequency and power (watts) created by the generator 114 to respectively modulate (increase or decrease) a mining activity level of the plurality of blockchain mining processors 72. As above, modulation may be in response to a production rate 155 of a combustible gas that is connected to power the engine 120. The one or more controllers 40 may be configured to respectively modulate the mining activity by a) modulating a number of, or a current frequency and power sent to, active blockchain mining processors in the plurality of blockchain mining processors. It may be useful to speed the motor (engine) up so it can provide more power to a larger load based on fuel availability. One advantage of doing so may be to consume as much as possible or all available fuel as opposed to allowing the excess to be released, or to minimize the amount released (wasted for example in a vent or flare). The controller 40 may monitor fuel availability directly, for example via a fuel pressure transmitter on a continuous flow of combustible gas produced by the well or supplied to the engine 120, or indirectly, for example by monitoring engine RPM. In one case engine RPM is maintained at its maximum setpoint, as the engine cannot speed up if there is insufficient fuel to feed an increase—if fuel is available the engine may speed up and the load may be increased (for example the processors may overclock or more processors circuits may be turned on). The controller may be monitoring engine RPM so the controller can respond if there is something unexpected, for example if the RPM sags (drops) then the controller may reduce the load (underclocks the processors or turns off processor circuits), which reduces fuel consumption. In such a fashion the engine speed may be controlled in sync with the processor load on the engine to consume all available fuel. Normal operation may be set at a predetermined setpoint, such as 1800 rpm, with the engine cycling up to 2400 rpm or down to 1500 rpm, or to other suitable values in an operating range, based on fuel availability that is sensed by a suitable method such as trying to speed up (the engine won't if the fuel is not there) or by a pressure transmitter on the fuel supply. In some cases the operator may simply increase or decrease the normal operating speed if the operator knows there will be more or less fuel available. Under or over clocking the processors 72 may mean supplying relatively lower or higher, respectively, frequency power to those processors 72.

Referring to FIG. 16, other features may be present in the system. Processors 72 may communicate through the internet to communicate with a blockchain database, for example by sending signals through a cellular antenna 112A, for example located on a mast 112. Struts 112B may secure the mast 112 to the container 12. The network interface may comprise one or more of a satellite, cellular, or radio antenna, connected to a modem (not shown). In some cases, the computing power is used for other than blockchain calculations. Power may be supplied to panel 42, which may power various components of the system 10, including processors 72 and lighting (not shown). In the example shown the two boxes on the side wall are the PLC controller 40 enclosure and the power relay/contactor enclosure 41. Power distribution units 70 may be mounted along the interior 12F of the container 12, for example in strips as shown.

The system 10 may operate as a portable data center, efficiently leveraging the cooling capacity of a fan 48 to simultaneously cool both processors 72 and engine 120, which are in close proximity with one another in a compact arrangement. Referring to FIG. 9, the container 12 may define an engine enclosure 12H (containing engine 120 and generator 114) and a datacenter enclosure 12I (containing processors 72). The engine radiator fan 48 may perform the work of moving and displacing the heated air from the ASICs. The ASICs and enclosure/air intake may be located near the generator end of the skid, with such arrangement being a practical one as the electrical connection between processors 72, fan 48, and generator 114 may be the shortest in such arrangement. The air intake (data center end) and discharge (radiator end) may be opposing each other, so airflow is in one direction which allows multiple units to be placed adjacent to each other with no loss of cooling efficiency from hot air recirculating into the intake of an adjacent unit. Such leveraging and dedication of the genset to powering processors 72 and fan 48, in contrast with external or other equipment, may provide an efficient system that more effectively converts energy from fuel (such as waste natural gas at a remote well site) to computational power. Exhaust gas from the engine 120 may be expelled in the same direction as the exhaust heat from the radiator 122.

Referring to FIGS. 11 and 16, the system 10 may incorporate a vent 140 for regulating air flow across the plurality of blockchain mining processors 72. The vent 140 may be structured to regulate a flux of air flow moving through the portable building along the cooling air path across the plurality of blockchain mining processors 72. The cooling fan 48 may define or be adjacent to an air inlet 13 or air outlet 15 (latter shown) in the portable building. The vent 140 may be adjacent the air inlet or air outlet to, when open, recirculate air flow across the cooling fan 48 through the air inlet or air outlet. Directional arrows are used in FIG. 16 to illustrate such recirculation, which acts to regulate air pressure in the building. In the example shown the fan 48 is arranged as a pusher or exhaust fan, which creates a vacuum (reduced pressure) in the interior during use. The vacuum acts to draw air into the building via the inlet 13, and out the outlet 15, which as shown may be defined by the radiator discharge. The vent 140 may be throttled, for example opened to a selected position in a range of positions along a spectrum from fully closed to partially open to fully open, to increase the pressure in the interior and reduce the flux of air across the processors 72. The vent 140 may comprise adjustable louvers 56. The louvers 56 may be mounted above the engine radiator fan discharge (outlet 15). This louver may be adjustable from open to closed. In the summer when it is warm out the vent 140 may remain closed or mostly closed. In the winter the vent 140 may be relatively or fully opened so that there is less of a vacuum on the interior of the building, which would reduce the air flow velocity (and air flux) from the intake door and across the ASICs. The position of opening may be selected automatically by a controller in response to various factors, such as ambient temperature, interior building temperature, and processor 72 temperature. In other cases the vent 140 may also function as a radiator bypass that is structured to divert at least a portion of air flow, which is moving through the portable building along the cooling air path, through the portable building without crossing the engine radiator.

In some cases, a blockchain mining system is built into an engine skid. The radiator fan of the engine may be configured as a pusher fan, which does the work of moving air through the system. The example shown is mounted on a 4'×8.5' skid. A conventional genset may run at 1800 rpm to get 50-60 Hz A/C power. In the example shown the engine may be run at 2000-2200 rpm, to get more power out of the engine, because when you are dedicating power to a blockchain mine and nothing else, a user may be able to increase the power, for example to 80 Hz. Higher power operation may run the engine hotter, and may require a relatively larger radiator. Not having a second fan, for example dedicated processor fans, and not having any tertiary equipment allows the engine to be oversped. The inlet and outlets may be located at suitable points in the system 10, for example on the roof or side walls or floor of the building.

Figure 20:
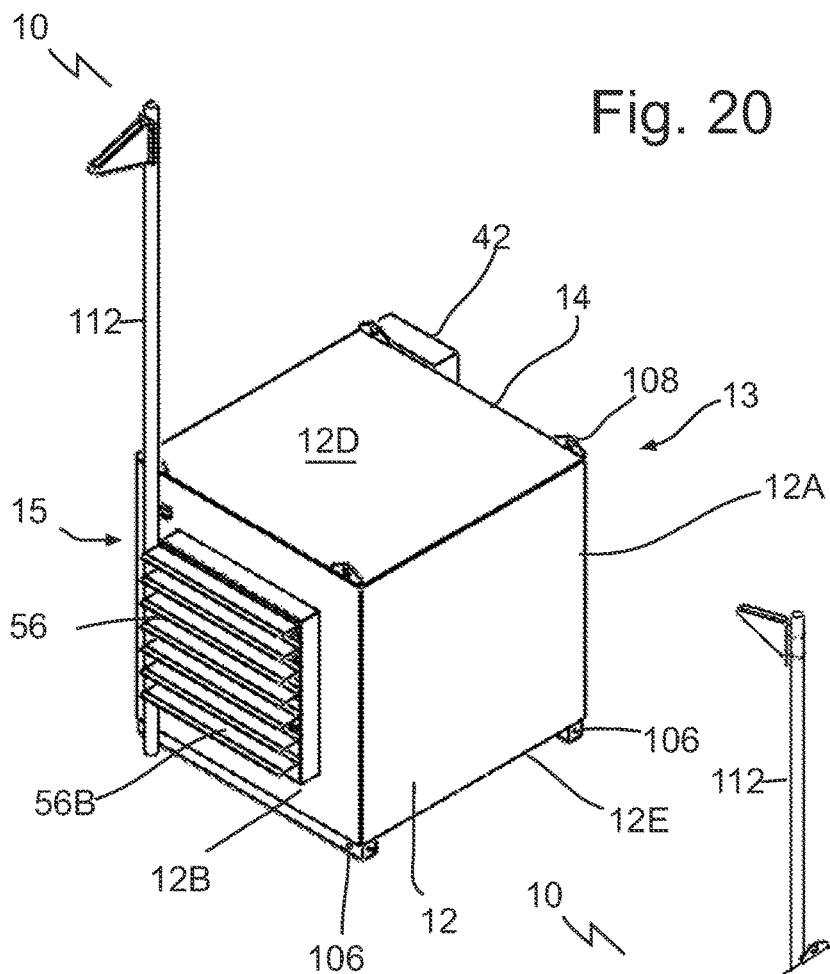
FIGS. 20-21 are rear and front perspective views, respectively, of a portable blockchain mining module, with a mast, and with module mounting parts accessible from the front and rear ends.
Figure 21:
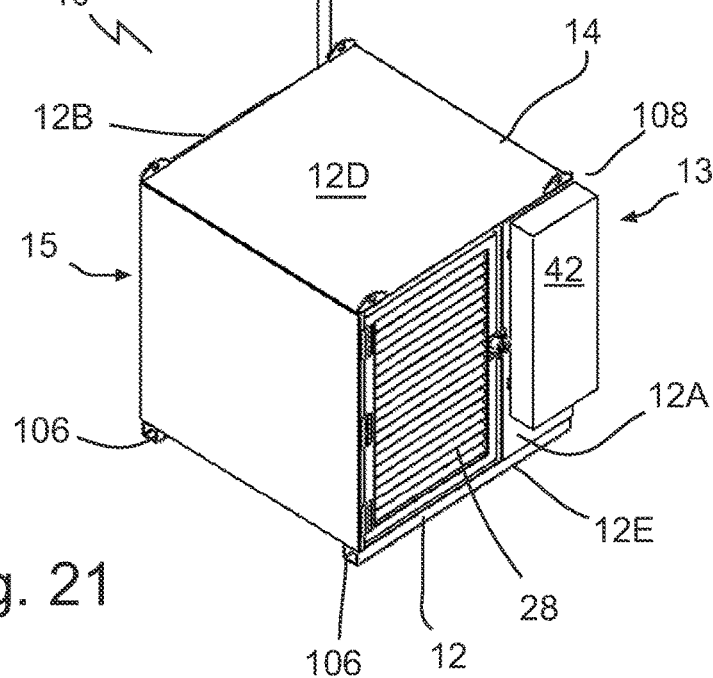
Figure 22:
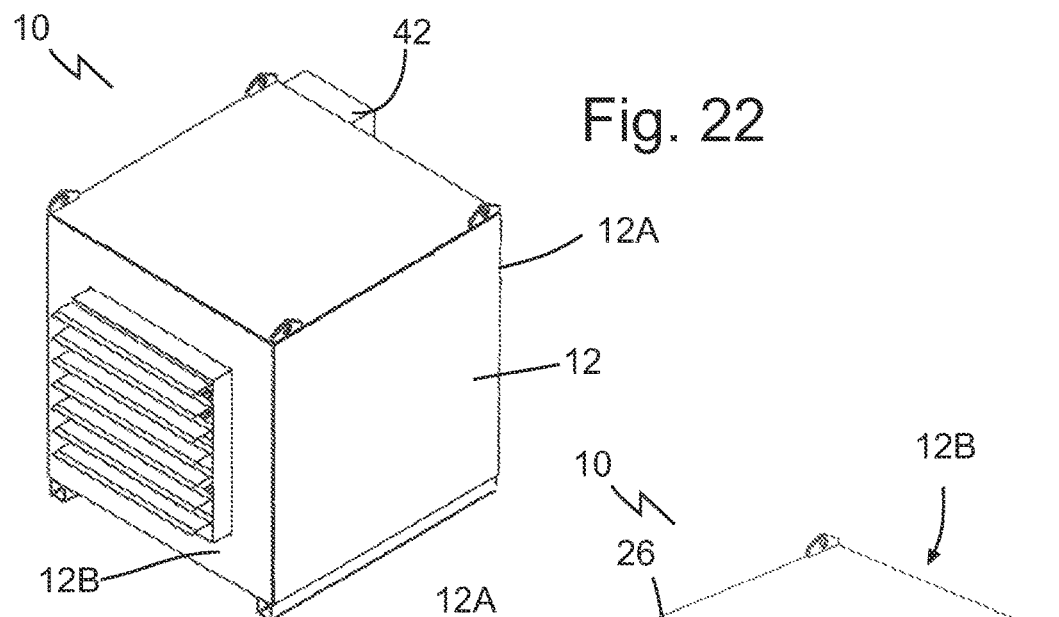
FIGS. 22-24 are rear, front (with access door open), and rear (with a front access door open and the roof and one side wall removed for illustration) perspective views, respectively, of a portable blockchain mining module.
Figure 23:
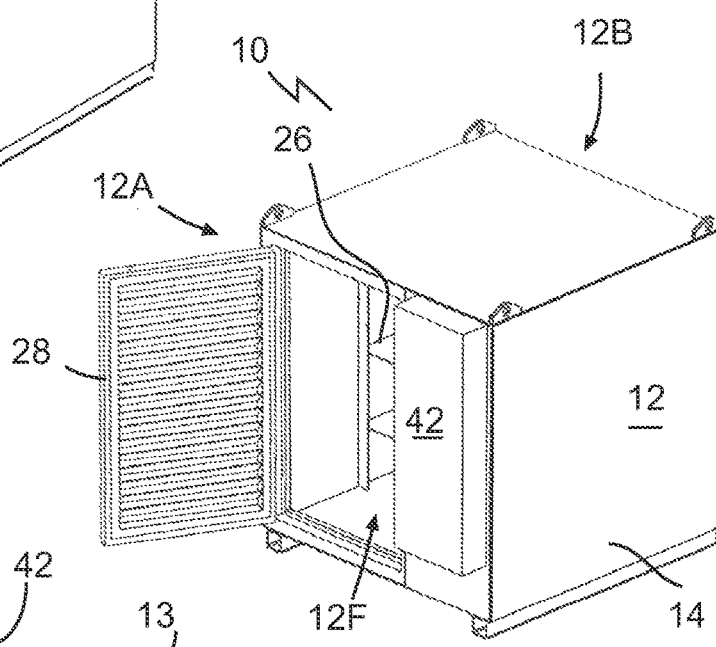
Figure 24:
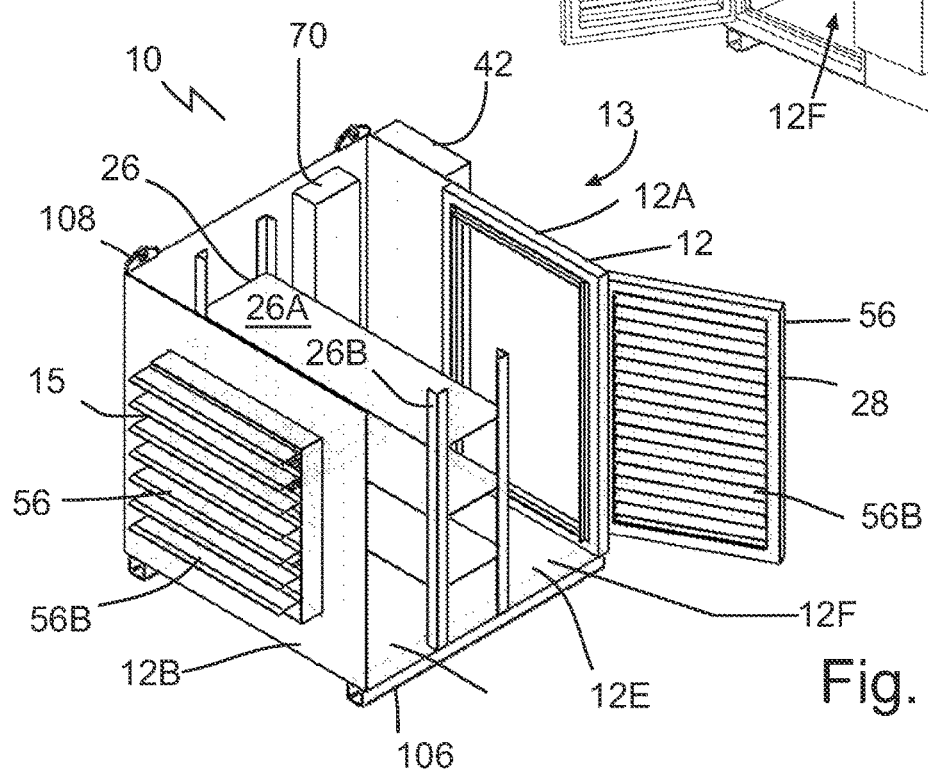

Referring to FIGS. 20-35, embodiments of a stackable, re-configurable portable blockchain mining system 10 are illustrated made up of portable blockchain mining modules. Referring to FIGS. 20-21, a portable blockchain mining system 10 may comprise a module having a portable building such as container 12, an air inlet 13, and air outlet 15, a plurality of blockchain mining processors 72. The system 10 may have a module mounting mechanism. The portable building may have side walls 12A-C, a base 12E, and a roof 12D, which collectively define an interior 12F. The air inlet 13 may be defined in a first of the side walls, such as side wall 12A. The air outlet 15 may be defined in a second of the side walls, such as side wall 12B, opposite to side wall 12A. Processors 72 may be located within the interior 12F.

The module mounting mechanism may be configured to permit respective portable blockchain mining modules that are identical to the portable blockchain mining module to be one or more of stacked above or below the module, and stacked in rows to the left or right of the module. For example, the module mounting mechanism may permit identical modules to be stacked above and secured to the roof 12D of the portable blockchain mining module. The module mounting mechanism may permit identical modules to be stacked below and secured to the base 12E of the portable blockchain mining module. The side walls 12B may be structured to permit respective portable blockchain mining modules that are identical to the portable blockchain mining module to be positioned in contact or close proximity adjacent the side walls 12B to form a horizontal row of portable blockchain mining modules. Side by side stacking in horizontal rows may be permitted without spaces between adjacent modules (wall to wall), for example by having no equipment mounted on the exterior side walls 12B. Each module may be operated in use to process mining transactions, with the plurality of portable blockchain mining modules arranged to form a wall of modules, the wall having one or both a vertical stack of two or more portable blockchain mining modules, and a horizontal row of two or more abutting modules. Before operating, the plurality of portable blockchain mining modules may be secured in the vertical stack by securing the base of the first portable blockchain mining module to the roof of the second portable blockchain mining module.

Referring to FIGS. 27-29, various configurations of vertically and horizontally stacked arrangements of modules is illustrated. Each module can be understood as referenced as a transport container 12, with the suffix "-#" used to delineate vertical stacks where there is more than one vertical stacks, and the suffixes ', ", ''', and '''' used to indicate modules in different horizontal rows where there is at least one vertical stack. When stacked or arranged in horizontally abutting relationship, the modules collectively form a wall 126 of modules, delineated as system 10 in the figures. Thus, as shown, two or more portable blockchain mining modules may be secured together to form a wall 126 of portable blockchain mining modules. Referring to FIG. 27, two or more of the portable blockchain mining modules may be stacked in a vertical stack one on top of the other and secured together using respective module mounting mechanisms (two modules are shown in the form of containers 12' and 12"). Referring to FIGS. 28 and 29, two or more of the portable blockchain mining modules are arranged in a horizontal row and secured together using respective module mounting mechanisms. In the example of FIG. 28, each horizontal row has four modules, delineated by containers 12, 12-1, 12-2, and 12-3. In the example of FIG. 29, each row has two modules, delineated by containers 12 and 12-1. The portable blockchain mining modules may be aligned such that the air inlets 13 are located on a first side 126A of the wall 126, and the air outlets 15 are located on a second side 126B of the wall 126. Thus, the modules cooperate together to draw air in and out of each module in the same direction, avoiding recirculation and permitting increased power density within a minimized footprint of space.

Referring to FIGS. 27 and 27A, the module mounting mechanism may comprise parts that secure modules to one another when vertically stacked one on the other. The module mounting mechanism may comprise cooperating mounting parts on the roof 12D and the base 12E (for example lifting lugs 108 and rails 106, respectively), that cooperate to secure to cooperating mounting parts on the base or roof, respectively, of the respective portable blockchain mining modules that are identical to the portable blockchain mining module to permit the respective portable blockchain mining modules to be stacked above or below the portable blockchain mining module. Thus, in the example shown, lugs 108' of the lower container 12' may be secured to rails 106" of the upper container 12". Referring to FIG. 27A, the cooperating mounting parts may comprise respective apertures, such as aperture 106A" of rails 106" and aperture 108A' or lug 108', that align during stacking to receive respective fasteners 110 to secure vertically adjacent portable blockchain mining modules together. Lugs and rails may be used or one or both may be substituted with other suitable mechanisms. Rails may comprise beams, such as square tubing as shown, although other beams and structures may be used, including I-beams or C-beams.

Referring to FIGS. 28 and 29, the module mounting mechanism may comprise parts that secure modules to one another when arranged in horizontal rows adjacent one another in abutting relationship. Each module may be structured to permit respective portable blockchain mining modules that are identical to the portable blockchain mining module to be secured to a third and a fourth of the side walls, such as side walls 12C, opposite one another and located between the first and second of the side walls, to form a horizontal row of portable blockchain mining modules. By securing the modules side by side, a more stable wall 126 structure may be created relative to one of a series of disconnected, abutting or close proximity vertical stacks of modules without interconnection.

Referring to FIGS. 20-21, the containers 12 that make up each module may have a suitable size and shape. In the example shown the portable building is a cube. The portable building may have length, width, and height dimensions of about four feet. Walls and other structural frame components may be made from suitable materials such as steel. In FIGS. 27-29, such "mini-cube" containers may provide a suitable modular size to permit a user to add or remove modules from a wall 126 at a suitable location, to tailor the size and computational power of the wall 126 depending on energy flux and constraints at the site. A cubic structure may be practical for transport as any face can be directly adjacent to each other during transport—such allows the cubes to be stacked close together during shipping/transport. Compact modules may be used in any mining application, for example pairing with gensets at oil facilities, as such enables a small footprint and high-power density. The shape and concept allows such modules to be highly adaptable to site constraints. One module may be paired with one genset or one genset may be paired to power multiple modules. Modules may be redeployed elsewhere if gas volumes diminish, or if production increases (for example due to a successful fracturing operation), modules may be added. Referring to FIGS. 9-10, non-cubic structures may be used, such as ones with rectangular faces (sides walls 12A and 12B).

Referring to FIGS. 16 and 28, in some cases the side walls 12C are free of components, to facilitate stacking above, below, or to the sides of each module. No access points, inlets, or outlets may be provided in side walls 12C. Components may be recessed, to avoid conflicting with the modular structure and ability of the modules to stack without obstruction of any such components. Module components may be recessed within (for example the fan 48 may be recessed instead of jutting out, or all the electrical equipment is mounted inside the interior 12F). Exterior side walls and top/bottom walls (roof 12D and base 12E) may be free of components or access points that would be obstructed in a stacking or row configuration. Thus, the modules may be stacked side by side and on top of each other, with full component access from two faces—fan and intake faces. In some cases, one or more fans 48 are located on one face (for example side walls 12B as shown), with one or more intakes/access points on the opposite face (for example side wall 12A as shown). Although an exhaust fan scenario is illustrated, a pusher fan may be used such as a fan located on side wall 12A at inlet 13. Electrical and networking input may be located on either the intake or fan wall face.

Referring to FIGS. 20 and 21, an embodiment is illustrated where the cooperating mounting parts are accessible from one or both the first and the second of the side walls 12A and 12B. The embodiment differs from that of FIGS. 27-29 in such respect, by rotating the rails 106 and lugs 108 ninety degrees between the embodiments of FIGS. 27-29 and FIGS. 20-21, to achieve the configuration shown. When the modules shown in FIGS. 20-21 are placed in close or abutting proximity to other modules in a horizontal row, the lugs 108 remain accessible, permitting modules already in a horizontal row to be connected to modules vertically above such module. Thus, modules may be vertically stacked even when the side walls 12C of such modules are blocked by laterally adjacent modules or other equipment in close proximity.

Referring to FIGS. 20-21, each module may have suitable components to facilitate air flow therethrough. The portable blockchain mining module may comprise louvers 56B at one or both of the air inlet 13 and the air outlet 15, for example in the form of louver panels 56 with or without filter panels. Louvers may also function as gravity dampers for the exhaust fan. In some cases, at least 50%, for example at least 75% of a total external surface area of the first of the side walls forms the air inlet 13. In some cases, at least 50%, for example at least 75% of a total external surface area of the second of the side walls forms the air outlet 15.

Figure 25:
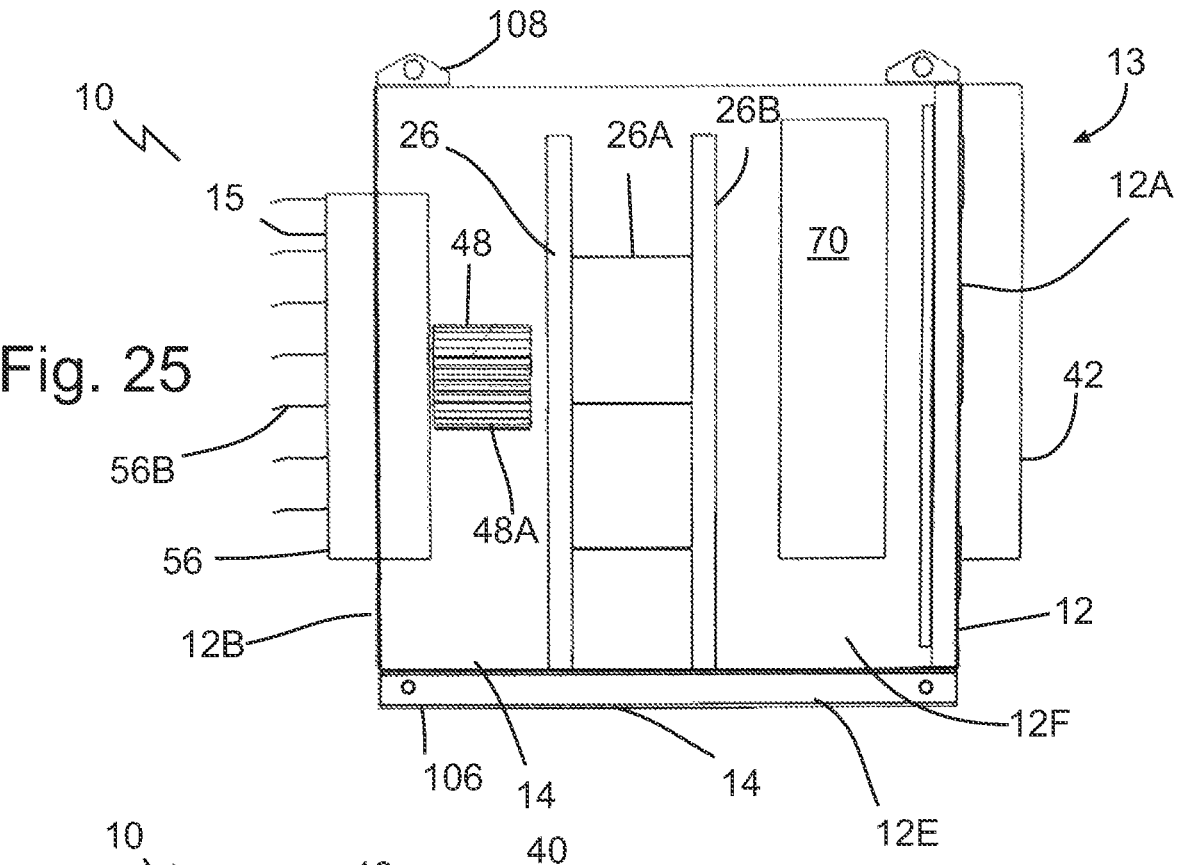
FIG. 25 is a side elevation view of the module of FIG. 22 with the roof and one side wall removed for illustration.

Referring to FIG. 25, each module may have various components. The module may comprise a cooling fan 48 mounted within the interior 12F and oriented to draw air from the air inlet 13 to the air outlet 15 across the plurality of blockchain mining processors 72 (only the processor mounts (shelves 26A) are shown). The processors 72 may be mounted on a rack 26 within the interior 12F in a vertical stack. Power distribution units 70 may be provided within interior 12F. Distribution panels 42 or disconnects may be provided, for example to control lighting and processor operation. A controller may be provided to modulate the operation of the system 10 depending on user input and external power supply.

Figure 34:
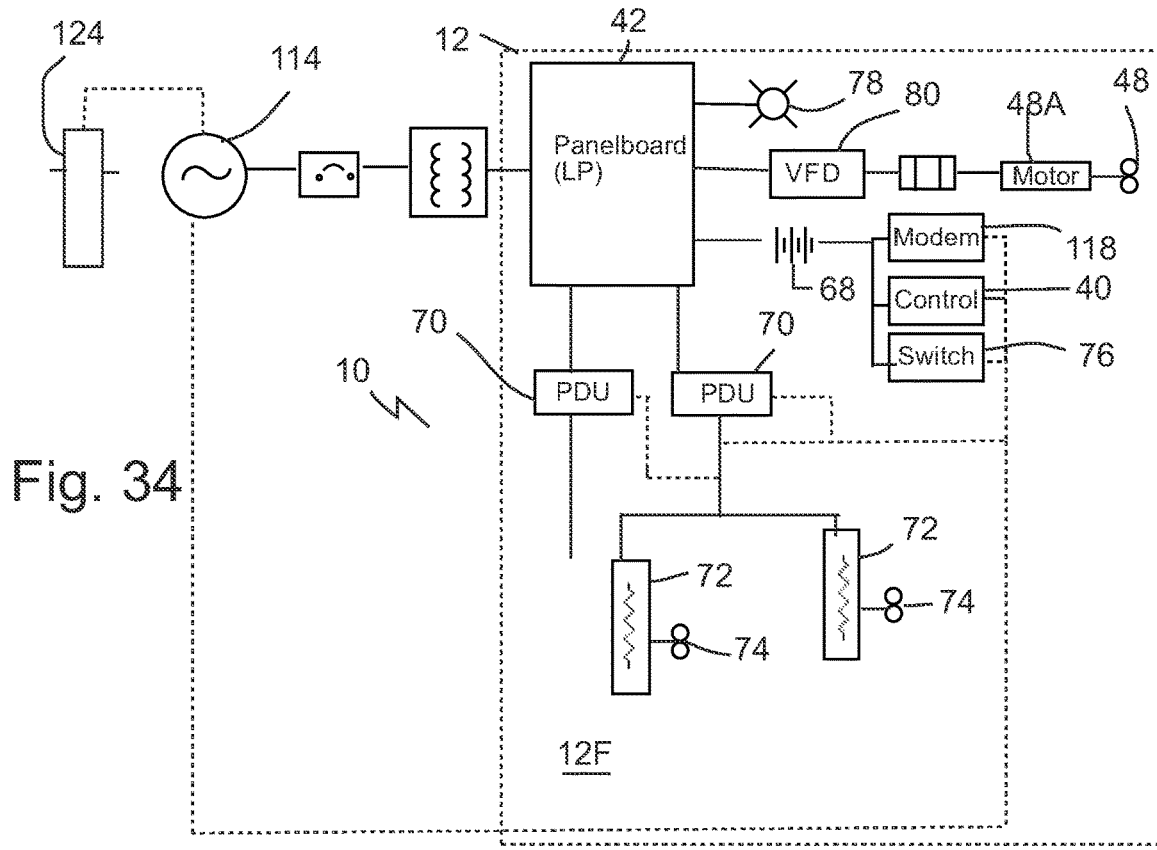
FIG. 34 is a schematic of an example arrangement of electrical and network components of a portable blockchain mining system with an engine and mining processors in a single container with a common cooling fan.
Figure 35:
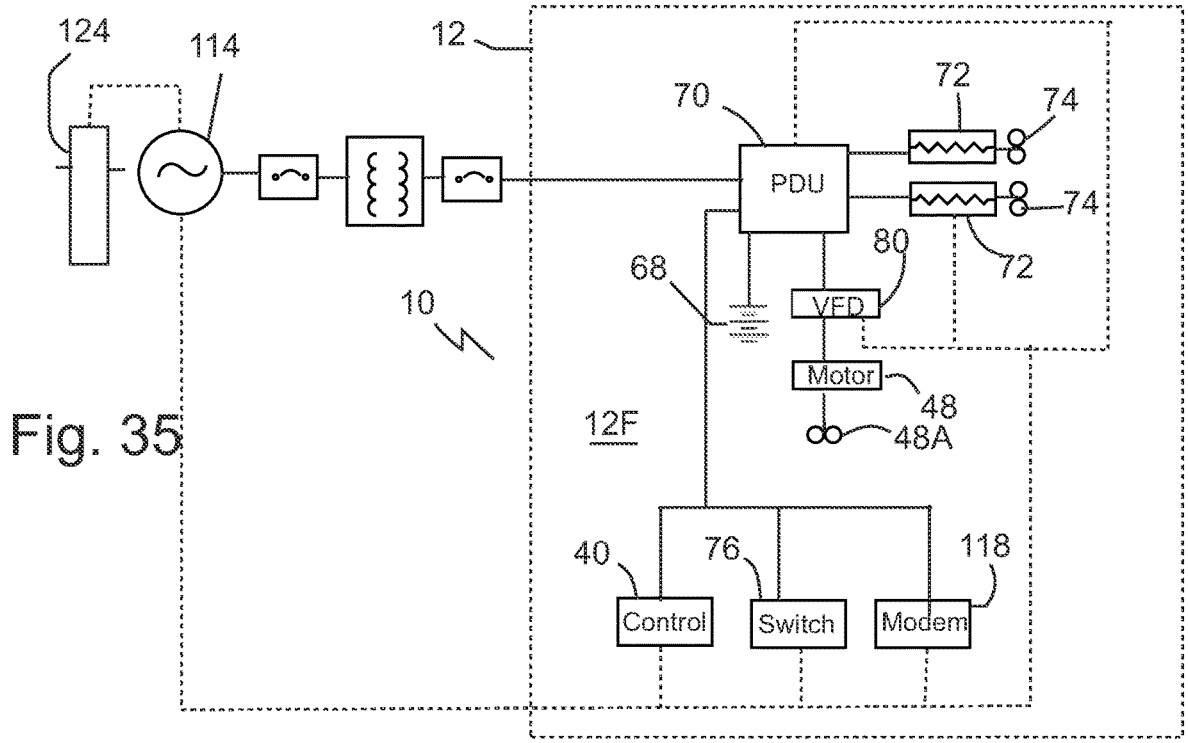
FIG. 35 is a schematic of a second example arrangement of electrical and network components of a portable blockchain mining system with an engine and mining processors in a single container with a common cooling fan.

Referring to FIGS. 34-35, several example schematics are illustrated for the components of each module (container 12). In both cases a well 124 may be used to supply natural gas to a genset/generator 114, which produces power that is supplied to the container 12. Each module may be located at, and powered by a source of combustible gas produced at, a hydrocarbon production well, storage, or processing facility. The processors 72 may be connected to receive power from a central power source, such as a power source external to the portable building, and a well 124 is one non-limiting example of such a power source. Referring to FIGS. 22-26 and 34, in the example shown power enters the container 12 and reaches a panelboard or panel 42, which provides power to lights or lighting system 78, a variable frequency drive (VFD) 80 (for example to control fan 48), and several PDUs

70. The variable frequency drive (VFD) may be connected to receive and convert alternating current to power any of the components of the container 12, such as the fan motor 48A and fan 48 (propeller rotating about fan crank/axle 48E), or in other cases the plurality of blockchain mining processors 72. In the example shown the PDUs 70 each power one or more processors 72, which each may have its own dedicated processor fan 74. Referring to FIG. 35, an example is shown lacking a panelboard. In the example shown a primary PDU 70 feeds power to processors 72 and a VFD 80. In both of FIGS. 34 and 35, network communications are made possible by a network interface, in this case in the form of a battery 68 powering a modem 118, a load controller 40, and a switch 76. Referring to FIG. 28, each module in the wall 126 may be connected together, for example tethered to share or distribute power amongst modules. Power may be split to each module. Modules may be tethered together to share the network, so that one modem can give internet to all the modules in a daisy chain.

Figure 14:
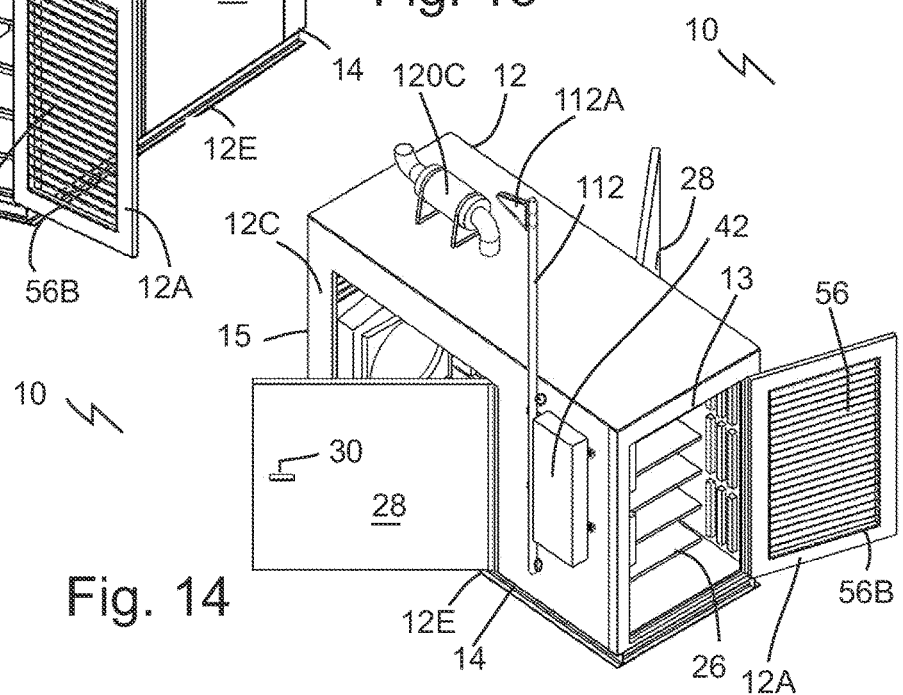
FIG. 14 is a front perspective view of the system of FIG. 9 with three access doors open.
Figure 15:
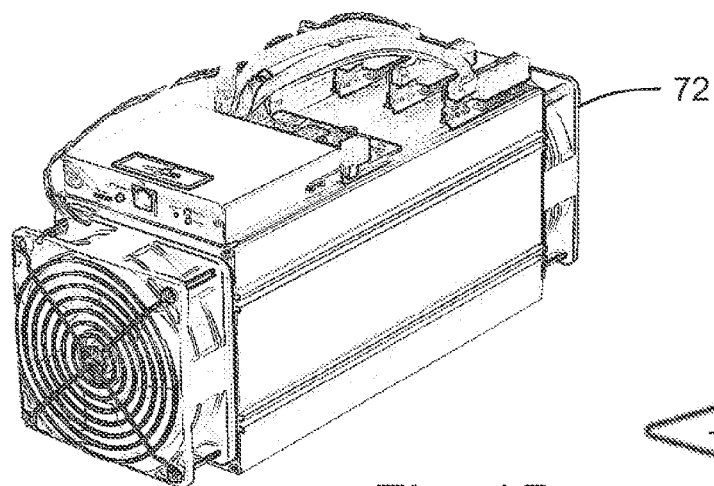
FIG. 15 is a front perspective view of a typical ASIC processor.
Figure 16:
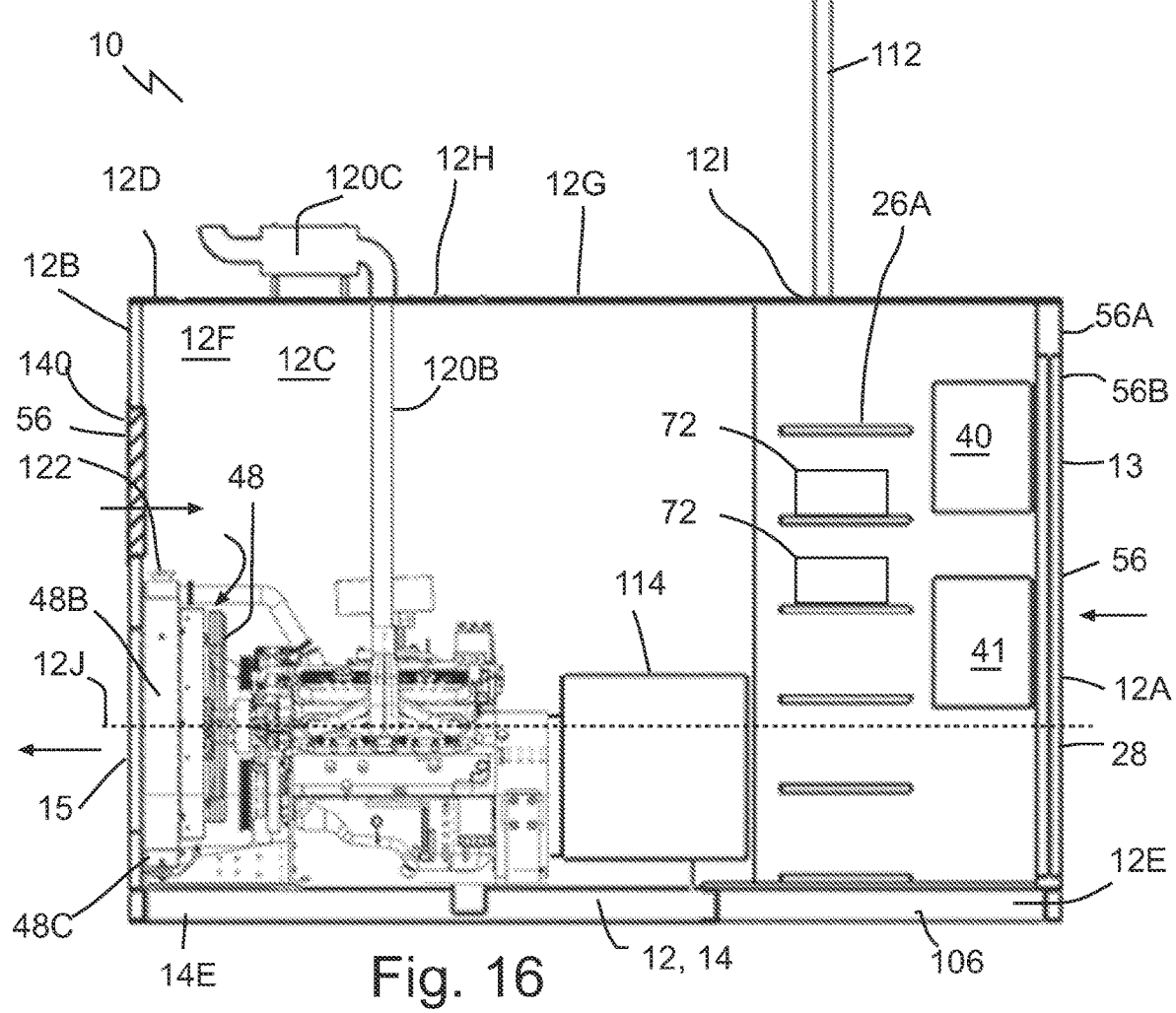
FIG. 16 is a cross-sectional view of the portable blockchain mining system of FIG. 9 showing the interior components.
Figure 17:
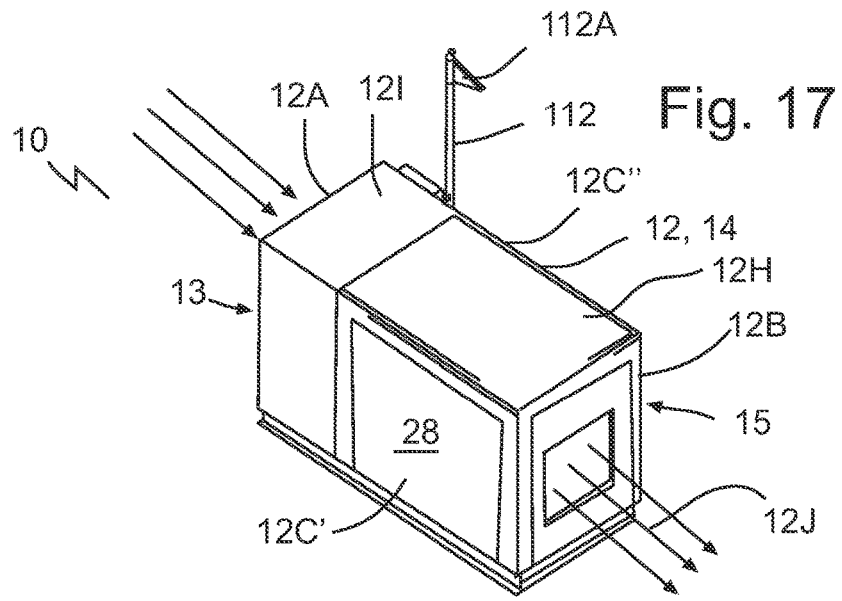
FIG. 17 is a rear perspective view of a variation of the portable blockchain mining system of FIG. 9 with arrows used to delineate the flow of air through the portable building.

Referring to FIGS. 15-16, the air inlet 13 may be defined in a wall, such as wall 12A, of the transport container 12. By forming the inlet 13 in a wall, airflow may travel from exterior of container 12, through the wall, and laterally across processors 72, absorbing heat from processors 72 in the process. Referring to FIG. 14, each blockchain mining processor 72 may have associated with it a processor fan 74, which is oriented to direct air from the air inlet 13 laterally (for example horizontally) across the respective blockchain mining processor 72 and toward a center aisle of the interior 12F of the transport container 12.

Referring to FIGS. 10-16, the system 10 may incorporate a mechanism for securing the air inlet 13 in the wall or walls from unwanted intrusion, whilst permitting sufficient airflow therethrough. A security grating panel (not shown) may define the air inlet 13 in the wall 12A. The security grating panel may be one of a plurality of metal security grating panels that collectively define the air inlet 13 as shown. The plurality of metal security grating panels may be mounted across gaps between a lattice of beams and columns of frame 14. Suitable metal grating panels may comprise chain link fence panels, forming air gaps structured to have maximum lateral dimensions of insufficient size to permit unwanted entry into interior 12F of a limb of a potential thief.

Referring to FIGS. 9-16, the air inlet 13 may be defined in more than one side surface of container 12, for example the air inlet 13 may be defined in one or both opposed side walls (not shown), and in some cases in one or both end walls 12A and 12B. The air inlet 13 may be structured to provide sufficient breathability to adequately cool the processors 72 operating within interior 12F. For example, at least 50%, for example at least 75%, for example 90% or higher, of a total external surface area of a wall 12A, may form the air inlet 13. In some cases, the only part of the total external surface area of each wall that is not breathable are the portions attributable to beams and columns, respectively, of the frame 14. The inlet 13 may be structured with uniform porosity or pressure drop across the breathable surface area of the inlet 13 to maximize the chance of uniform and consistent air flow across each processor 72 regardless of location of the processor 72 adjacent the inlet 13.

Referring to FIGS. 9-16, air inlet 13 may be provided with a suitable air filter (not shown) to remove unwanted contaminants from incoming air flow. Unwanted contaminants include dirt, oil, smoke, debris, and some chemicals, all of which may otherwise damage over time processors 72 or other network or electrical equipment operating within container 12. A suitable air filter may comprise a porous foam filter, such as comparable to a cabin air filter in a vehicle, or a furnace filter for a home or commercial furnace. In some cases, a fiberglass or hair filter may be used, such as a blue hogs hair style filter roll (synthetic). The filter may be cut to fit and breathable. The air filter may be positioned across the security grating panel (not shown), for example in use a plurality of filters may be positioned across the plurality of panels.

Referring to FIG. 16, each air filter may be mounted to permit access to the air filter from outside the portable blockchain mining system 10. Each air filter may be mounted adjacent a security grating panel, for example adjacent an exterior face of the security grating panel. A gate, such as a louver panel 56, may secure the air filter adjacent the exterior face of the security grating panel. A louver panel 56 may comprise a suitable frame 56A mounting rows of louvers 56B, which in some cases are adjustable as to pitch (for example if the louvers are mounted to pivot about axial hinges—in some cases an actuator is provided to control all or groups of louvers). In other cases, a grating panel, an open perimeter frame, or another suitable securing mechanism may be used to secure the air filter to the container 12. A lock (not shown) may be provided on each such gate to secure same in the closed position to prevent unwanted removal of the air filter. By permitting access to air filter from outside the system 10, maintenance can be carried out on the system 10 (i.e. filter replacement), without requiring access to the interior 12F. Referring to FIGS. 11-14, each gate, such as louver panels 56, may be mounted to open and close, for example to swing about a hinge (not shown), or to be removable for example by sliding out of a retainer frame (not shown) on side wall 12C to gain access to filters. Louver panels may form rain guards (for example when louvers 56B are pointed downward in a direction moving away from the container 12) that keep moisture and other elements out of contact with grating panels.

Referring to FIGS. 3 and 16 the fan 48 (or some or all such fans if more than one is present) may have a suitable structure. In the examples shown the fan 48 is an axial fan, with a motor 48A and a propeller 48B attached thereto. The propeller 48B is mounted to rotate within a suitable frame 48C (or cage), which may define a circular axial opening 48D. A grating may be provided across the opening 48D for safety or to otherwise protect the fan 48 and prevent inadvertent contact with the operating fan 48. The propeller 48B rotates around an axle 48E. Other types of fans 48 may be used, such as a centrifugal fan (not shown).

Referring to FIG. 19, a schematic is illustrated for carrying out a method of mining a blockchain. A power source 64, such as a generator (or generator set or grid/utility power source) is connected to provide electricity to plurality of blockchain mining processors 72. One example of a power source 64 is provided by a generator connected to use a source of fuel, such as combustible gas produced from an oil production, storage, or processing facility, such as a production well 65, to supply generator (power source 64). Electricity may travel from power source 64 through suitable components, such as overload protection systems such as breakers 38 and/or fusible disconnects. A transformer 66 may be provided to modify the incoming voltage and current as desired. The incoming current may pass through a splitter 36, for example a bus gutter that splits power along various busbars. The incoming electricity may be used for various functions. For example, electricity passes from splitter 36 into processors 72, optionally passing through breakers 38 and power distribution units 70 (PDU) as desired. Each processor 72, such as an ASIC (application specific integrated circuit) or GPU (graphic processing unit) unit, may have an onboard fan 74 associated with the processor 72 for cooling the processor 72. Each PDU 70 may power one or a group of more than one processor 72. Each processor 72 carries out a mining-related calculation or other suitable process, and communicates with the internet via a suitable system, such as a modem 75. Suitable componentry such as a transmitter/receiver (satellite or otherwise, including components that are connected to the internet via wireless or wired methods) may be provided to permit communication between the modem 75 and internet.

Referring to FIG. 19, various control or monitoring devices may be used, such as switch 76 and controller 40, to regulate operation of processors 72, PDUs 70, power source 64, breakers, fans, and/or to permit remote or on-site operation and control of each processor 72. The splitter 36 may power such components, including modem 75, in a suitable fashion. Power (electricity) may travel to a lighting panel 42 (such as a panelboard or contactor panel), and provide power to various components. Power may travel from panel 42 to a battery 68 (which may form an uninterrupted power supply) that powers modem 75, switch(es) 76 and controller 40 as needed, to maintain operations even in the event of a power outage. Other backup power sources may be provided, such as a secondary generator, which may be programmed or controlled to start up in the event of an outage. Panel 42 may also control various basic functions in container 12, such as operation of lighting systems 78 or heating or cooling systems. Fan or fans 48 may be controlled, for example by passing power to one or more variable frequency drives 80 to control fan speed, with such drives 80 each being connected, for example via a fuse or fuse box, to a respective fan motor 48A, to operate and rotate a respective set of fan propeller 48B.

Figure 26:
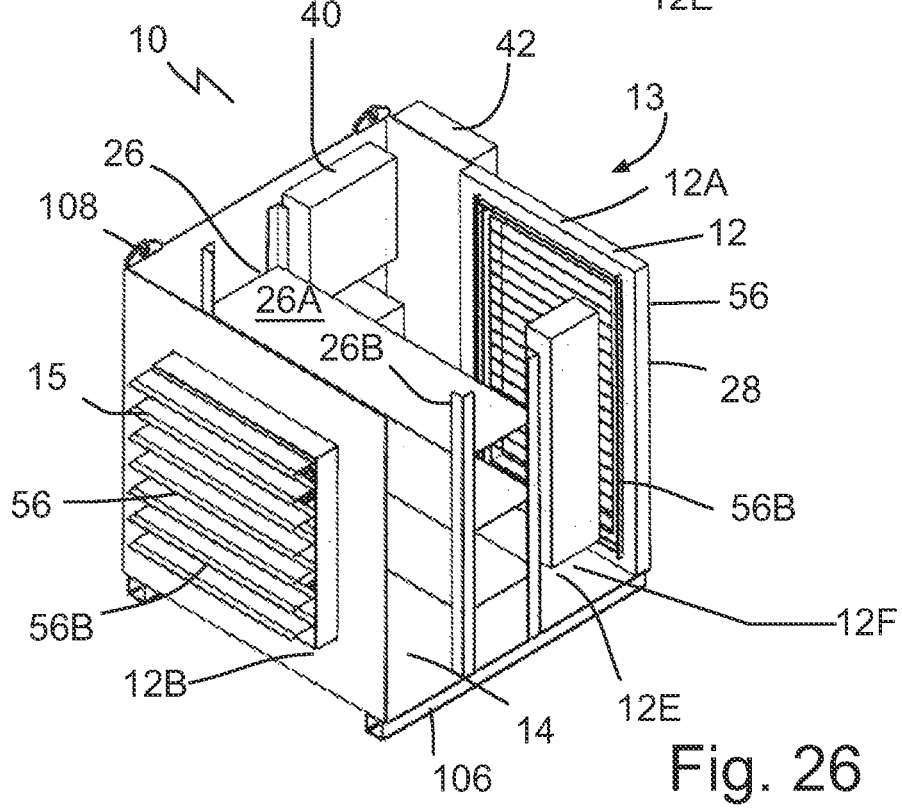
FIG. 26 is a rear perspective view of a variation of the embodiment of FIG. 22 with one side wall removed for illustration.

Referring to FIGS. 16, 19, and 26, electrical and network components may be mounted at suitable locations on or in the container 12. For example, referring to FIG. 26, controller 40 and lighting panel 42 may be mounted to front end wall 12B in interior 12F, to be accessible only within interior 12F. Referring to FIGS. 9-10 and 19, various other components may be suitable to mount to the exterior of the container 12. For example, referring to FIG. 19, splitter 36 and fuses or breakers 38 may be mounted to front end wall 12B of container 12. Referring to FIGS. 9-10, power and network cables may be run about the interior 12F and exterior of the container 12 as is required to make the container 12 operational and connect the device to an external power source. In some cases, a power source is provided on board, for example a generator mounted on the container 12 (not shown).

The network equipment used may provide a source of internet connection. A satellite/cellular/and/or radio antenna or other network communication equipment may be fitted on the mining system and connected to a modem. The modem may feed a network switch that has Ethernet ports. Each mining processor controller may have one Ethernet port. The network connection may also feed a controller, which may be a programmable logic controller (PLC), or other, which may be accessed remotely. The controller may be connected to at least a thermocouple (temperature sensor) within the mining system, to allow the controller to control the ventilation and chilling loads within the enclosure. The controller may control the contactor panel switches to open and close circuits to add or remove mining processors from operation. Each mining processor may have a variety of configurations, but generally may include at least a power supply, a controller board and mining circuitry, such as an ASIC circuit.

Various mining circuitry examples include CPU (central processing unit), GPU (graphics processing unit), FPGA (Field-Programmable Gate Array), and ASIC (application specific integrated circuit). The components of an ASIC mining processor include the hash boards (each board has numerous chips that is doing the hashing), a controller (to communicate with the network and optimize the mining processors chip frequency and fans for cooling), and a power supply (typically converts AC input power to DC power for the ASIC). Each mining processor may be positioned on racks or shelving units.

The blockchain mining system may comprise a controller connected to operate one or more aspects of the blockchain mining processor. The controller may be connected to operate a cooling system, for example having a ventilation fan and a chiller, to maintain the mining processors within a predetermined operating range of temperature. For example, if the internal temperature within the mining system spikes above a predetermined maximum predetermined temperature, the air ventilation system may initiate or ramp up, and if the temperature contains past a second, relatively higher maximum predetermined temperature, the chilling unit may initiate or ramp up to achieve an air-conditioning effect. Similarly, if the temperature drops below a minimum predetermined temperature, a heating system (not shown) or recirculation system may initiate that may or may not leverage the air ventilation infrastructure to distribute heat. Plural controllers may be incorporated, for example to carry out different tasks, for example one controller for temperature control and another for mining processor control. The enclosure (interior 12F) may be structured to insulate its contents from the elements. The container may have a back-up heating device such as a space heater (not shown), for example to be used to heat the enclosure in case of shut down in cold weather.

In some embodiments disclosed here, air moves laterally across processors either into or out of adjacent side walls of the container. Also, in some embodiments, air flow changes direction from vertical to horizontal, thus permitting the outlet to be located above the inlet to avoid recirculation of warmed exhaust gases (unless same is desired, for example as described above). Such bidirectional flow may more efficiently cool processors 72 within the context that the processors 72 are located (processors 72 mounted horizontally within racks, with processors 72 vertically stacked one above the other), than would unidirectional flow, particularly in an embodiment where plural racks of processors 72 are located within interior 12F.

Relative words such as front and rear, sides, left and right, up and down are arbitrary and do not refer to absolute orientations unless context dictates otherwise. For example, although the description refers to rear and front ends, it should be understood that this orientation could be reversed. Similarly, side walls need not be the walls with the longest lateral dimensions (although in many cases they will be), for example in the case of a cube container. Features in various embodiments may be interchanged, for example to provide an air inlet in the floor and an outlet in the roof. The system 10 may form a skid, or may form a wheeled or tracked unit, such as a trailer. In some cases, system 10 may incorporate a motor to drive the system 10 to different locations. A reference to a floor may refer to a base of a component, or it may refer to a floor above a base. Stairs may lead up to the double doors and on the opposite end to the Splitter and Breakers/Disconnects. Each embodiment discussed here may incorporate parts from each other embodiment disclosed here. In some cases, the systems 10 or modules may come with processor mounts (such as shelves 26A) without the processors 72 themselves. The datacenters disclosed herein do not need to be operated to mine in a blockchain context, and can be used as other forms of datacenters or computational processors. The use of the systems 10 disclosed here may reduce natural gas vent rates at remote well sites to less than 500 m3/day. A louver or louvre includes a window blind or shutter with horizontal slats that are angled to admit light and air, but to keep out rain and direct sunshine. The angle of the slats may be fixed (shown) or adjustable, usually in blinds and windows, or fixed. Air flow may be reversed so as to pass from engine radiator to the processors. An engine-generator or portable generator may include the combination of an electrical generator and an engine (prime mover) mounted together to form a single piece of equipment. This combination is also called an engine-generator set or a gen-set. In many contexts, the engine is taken for granted and the combined unit is simply called a generator.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A portable blockchain mining system comprising:
    a compact portable blockchain mining module structured to be stackable, re-configurable and scalable, and having:
        a portable building having side walls, a base, and a roof, which collectively define an interior;
        an air inlet in a first of the side walls;
        an air outlet in a second of the side walls opposite to the first of the side walls, in which the portable building defines a cooling path between the air inlet and the air outlet;
        a plurality of blockchain mining processors mounted on one or more racks within the interior, with the one or more racks extended between a third of the side walls and a fourth of the side walls, opposite to the third of the side walls and with the third and the fourth of the side walls between the first and the second of the side walls, to array the plurality of blockchain mining processors across the cooling air path;
        an access door mounted to the first or second of the side walls and defining the air inlet or air outlet, respectively, to selectively permit or restrict access to the plurality of blockchain mining processors within the interior;
        in which the roof and the base are configured to permit respective compact portable blockchain mining modules that are identical to the compact portable blockchain mining module to be:
            stacked above and secured above the roof of the compact portable blockchain mining module; and
            stacked below and secured below the base of the compact portable blockchain mining module;
        to form a vertical stack of compact portable blockchain mining modules;
        in which the third of the side walls and the fourth of the side walls are structured to permit a respective compact portable blockchain mining module of the respective compact portable blockchain mining modules, which are identical to the compact portable blockchain mining module, to be positioned in contact or close proximity adjacent the third of the side walls or the fourth of the side walls to form a horizontal row of compact portable blockchain mining modules; and
    in which all exterior surfaces of the roof, the base, and the third and fourth of the side walls, are structured either:
        a) to be free of electrical and network components, and access points, or
        b) to locate the electrical and network components, and access points, thereon to be accessible from one or both the first and the second of the side walls, and such that the electrical and network components and access points are not obstructed by, and do not conflict with, the compact portable blockchain mining module being vertically and horizontally stacked with respective compact portable blockchain mining modules of the respective compact portable blockchain mining modules, which are identical to the compact portable blockchain mining module;
    to permit vertical and horizontal stacking of the compact portable blockchain mining module with respective compact portable blockchain mining modules of the respective compact portable blockchain mining modules, which are identical to the compact portable blockchain mining modules, without obstruction; and
    in which the air inlet, the air outlet, and the interior of the portable building are structured to provide self-contained cooling with sufficient breathability to adequately cool the plurality of blockchain mining processors during operation while the compact portable blockchain mining module is arranged in a vertical stack, and a horizontal row, with the respective compact portable blockchain mining modules identical to the compact portable blockchain mining module.

2. The portable blockchain mining system of claim 1 in which the compact portable blockchain mining module further has a module mounting mechanism that comprises cooperating mounting parts on the roof and the base that cooperate to secure to cooperating mounting parts on the base or roof, respectively, of the respective compact portable blockchain mining modules that are identical to the compact portable blockchain mining module to permit the respective compact portable blockchain mining modules to be stacked above or below the compact portable blockchain mining module.

3. The portable blockchain mining system of claim 2 in which the cooperating mounting parts comprise respective apertures that align during stacking to receive respective fasteners to secure vertically adjacent compact portable blockchain mining modules together.

4. The portable blockchain mining system of claim 2 in which the module mounting mechanism comprises mounting rails on the base of the compact portable blockchain mining module.

5. The portable blockchain mining system of claim 2 in which the cooperating mounting parts comprise lifting lugs on the roof of the compact portable blockchain mining module.

6. The portable blockchain mining system of claim 2 in which the cooperating mounting parts are accessible from one or both the first and the second of the side walls.

7. The portable blockchain mining system of claim 2 in which the compact portable blockchain mining module further comprises louvers at one or both of the air inlet and the air outlet.

8. The portable blockchain mining system of claim 2 in which one or more of:
   at least 50% of a total external surface area of the first of the side walls forms the air inlet; and
   at least 50% of a total external surface area of the second of the side walls forms the air outlet.

9. The portable blockchain mining system of claim 1 in which the compact portable blockchain mining module further comprises a cooling fan mounted within the interior and oriented to draw air from the air inlet to the air outlet across the plurality of blockchain mining processors.

10. The portable blockchain mining system of claim 1 in which one or both:
    the plurality of blockchain mining processors are connected to receive power from a power source external to the portable building; and
    the portable blockchain mining system is located at, and powered by a source of combustible gas produced at, a hydrocarbon production well, storage, or processing facility.

11. The portable blockchain mining system of claim 1 in which the compact portable blockchain mining module further comprises one or more of:
    a variable frequency drive (VFD);
    a power distribution unit; and
    a load controller configured to adjust operation of the plurality of blockchain mining processors depending on input power.

12. The portable blockchain mining system of claim 1 in which the portable building is a cube.

13. The portable blockchain mining system of claim 12 in which the portable building has length, width, and height dimensions of about four feet.

14. The portable blockchain mining system of claim 1 structured to permit the respective compact portable blockchain mining modules that are identical to the compact portable blockchain mining module, to be secured to the third and the fourth of the side walls to form the horizontal row of compact portable blockchain mining modules.

15. The portable blockchain mining system of claim 1 further comprising two or more compact portable blockchain mining modules, comprising the compact portable blockchain mining module and the respective compact portable blockchain mining modules that are identical to the compact portable blockchain mining module, secured together to form a wall of compact portable blockchain mining modules.

16. The portable blockchain mining system of claim 15 in which the two or more of the compact portable blockchain mining modules are stacked in a vertical stack one on top of the other and secured together using respective module mounting mechanisms.

17. The portable blockchain mining system of claim 15 in which two or more of the compact portable blockchain mining modules, comprising the compact portable blockchain mining module and the respective compact portable blockchain mining module that is identical to the compact portable blockchain mining module, are arranged in the horizontal row and secured together using respective module mounting mechanisms.

18. The portable blockchain mining system of claim 15 in which the two or more compact portable blockchain mining modules are aligned such that the air inlets are located on a first side of the wall, and the air outlets are located on a second side of the wall.

19. The portable blockchain mining system of claim 15 in which the two or more compact portable blockchain mining modules are connected to receive power from a central power source.

20. The portable blockchain mining system of claim 19 in which the central power source is an engine and generator located at, and powered by a source of combustible gas produced at, a hydrocarbon production well, storage, or processing facility.

21. The portable blockchain mining system of claim 1 in which:
    the plurality of blockchain mining processors are connected to a network interface;
    the network interface is connected to receive and transmit data through the internet to a network that stores or has access to a blockchain database;
    the plurality of blockchain mining processors are connected to the network interface and adapted to mine transactions into blocks associated with the blockchain database and to communicate with the blockchain database;
    the network is a peer to peer network;
    the blockchain database is a distributed database stored on plural nodes in the peer to peer network; and
    the blockchain database stores transactional information for a digital currency.

22. A method comprising:
    operating a plurality of compact portable blockchain mining modules to process mining transactions;
    in which the plurality of compact portable blockchain mining modules are arranged to form a wall of compact portable blockchain mining modules, with each of the plurality of compact portable blockchain mining modules having a portable building that contains a plurality of blockchain mining processors and that defines side walls, a base, a roof, an air inlet in a first of the side walls, and an air outlet in a second of the side walls opposite to the first of the side walls, in which the portable building defines a cooling path between the air inlet and the air outlet, and the plurality of blockchain mining processors are mounted on one or more racks within an interior of the portable building, with the one or more racks extended between a third of the side walls and a fourth of the side walls, opposite to the third of the side walls and with the third and the fourth of the side walls between the first and the second of the side walls, to array the plurality of blockchain mining processors across the cooling air path;
    in which the wall has:
        a vertical stack of two or more compact portable blockchain mining modules, with the base of one compact portable blockchain mining module secured above the roof of another compact portable blockchain mining module; and
        a horizontal row of two or more compact portable blockchain mining modules, with the third of the side walls of one compact portable blockchain mining module positioned in contact or close proximity adjacent to the fourth of the side walls of another compact portable blockchain mining module; and
    in which:

each compact portable blockchain mining module has an access door mounted to the first or second of the side walls and defining the air inlet or air outlet, respectively, to selectively permit or restrict access to the plurality of blockchain mining processors within the interior; and all exterior surfaces of the roof, the base, and the third and fourth of the side walls, of each compact portable blockchain mining module, are structured either:
  a) to be free of electrical and network components, and access points, or
  b) to locate the electrical and network components, or access points, thereon to be accessible from one or both the first and the second of the side walls, and such that the electrical and network components and access points are not obstructed by, and do not conflict with, the compact portable blockchain mining module being vertically or horizontally stacked with respective compact portable blockchain mining modules of the respective compact portable blockchain mining modules, which are identical to the compact portable blockchain mining module:

to permit the wall to be arranged with a vertical stack and horizontal row of the compact portable blockchain mining modules with respective compact portable blockchain mining modules, which are identical to the plurality of compact portable blockchain mining modules, without obstruction; and in which the air inlet, the air outlet, and the interior of the portable building of each of the plurality of compact portable blockchain mining modules are structured to provide self-contained cooling with sufficient breathability to adequately cool the plurality of blockchain mining processors during operation.

23. The method of claim 22 further comprising, before operating, stacking the plurality of compact portable blockchain mining modules in the vertical stack by securing the base of the one compact portable blockchain mining module to the roof of the other compact portable blockchain mining module.

24. The method of claim 22 further comprising, before operating, arranging the plurality of compact portable blockchain mining modules in a horizontal row of two or more compact portable blockchain mining modules, with the third of the side walls of the one compact portable blockchain mining module secured to the fourth of the side walls of the other compact portable blockchain mining module.

25. The method of claim 22 in which:
  the plurality of blockchain mining processors are connected to a network interface:
  the network interface is connected to receive and transmit data through the internet to a network that stores or has access to a blockchain database;
  the plurality of blockchain mining processors are connected to the network interface and adapted to mine transactions into blocks associated with the blockchain database and to communicate with the blockchain database:
  the network is a peer to peer network:
  the blockchain database is a distributed database stored on plural nodes in the peer to peer network; and
  the blockchain database stores transactional information for a digital currency.

\* \* \* \* \*